US011386730B2

(12) United States Patent
Scalisi

(10) Patent No.: US 11,386,730 B2
(45) Date of Patent: Jul. 12, 2022

(54) SMART LOCK SYSTEMS AND METHODS

(71) Applicant: SkyBell Technologies IP, LLC, Irvine, CA (US)

(72) Inventor: Joseph Frank Scalisi, Yorba Linda, CA (US)

(73) Assignee: SkyBell Technologies IP, LLC, Irvine, CA (US)

(*) Notice: Subject to any disclaimer, the term of this patent is extended or adjusted under 35 U.S.C. 154(b) by 0 days.

(21) Appl. No.: 16/883,594

(22) Filed: May 26, 2020

(65) Prior Publication Data

US 2020/0286313 A1  Sep. 10, 2020

Related U.S. Application Data

(63) Continuation of application No. 15/608,825, filed on May 30, 2017, now abandoned, which is a continuation of application No. 15/130,883, filed on Apr. 15, 2016, now Pat. No. 10,204,467, which is a continuation of application No. 14/801,718, filed on Jul. 16, 2015, now Pat. No. 9,342,936, which is a continuation-in-part of application No. 14/572,852,
(Continued)

(51) Int. Cl.
*G07C 9/00* (2020.01)
*H04N 7/18* (2006.01)
*G07C 9/25* (2020.01)

(52) U.S. Cl.
CPC ..... *G07C 9/00563* (2013.01); *G07C 9/00174* (2013.01); *G07C 9/25* (2020.01); *H04N 7/186* (2013.01); *G07C 9/00571* (2013.01); *G07C 2009/00769* (2013.01); *G07C 2209/63* (2013.01)

(58) Field of Classification Search
CPC ...... G07C 9/00309; G07C 2009/00769; G07C 9/00111; G07C 9/00071; H04W 12/08; G06K 9/00228; G08B 13/00; E05B 39/00; H04N 7/186
See application file for complete search history.

(56) References Cited

U.S. PATENT DOCUMENTS 1,647,558 A  11/1927  Best
1,647,708 A  11/1927  Monica
(Continued)

FOREIGN PATENT DOCUMENTS

CN  1902609 B  5/2010
CN  202872976 U  4/2013
(Continued)

OTHER PUBLICATIONS

Craig & Comapny—Home Tech: Doorbot—Downloaded on Nov. 18, 2013 from http://www.craigncompany.com/home-tech-doorbot/; prior art publication at least as of Jun. 10, 2013.
(Continued)

*Primary Examiner* — Jared Walker
(74) *Attorney, Agent, or Firm* — Gallium Law; Wesley Schwie, Esq.; Justin Schwechter

(57) ABSTRACT

A door lock system can comprise a door lock movable between a locked state and an unlocked state. The door lock system can detect a first indication suggestive of a presence of a visitor. The door lock system can also detect a second indication suggestive of an identity of the visitor. As well, the door lock can validate that the first indication and the second indication are associated with a first identity.

20 Claims, 30 Drawing Sheets

Related U.S. Application Data filed on Dec. 17, 2014, now Pat. No. 9,109,378, which is a continuation of application No. 14/469,583, filed on Aug. 27, 2014, now Pat. No. 8,947,530, which is a continuation-in-part of application No. 14/275,811, filed on May 12, 2014, now Pat. No. 8,872,915, which is a continuation-in-part of application No. 14/142,839, filed on Dec. 28, 2013, now Pat. No. 8,842,180, which is a continuation-in-part of application No. 14/099,888, filed on Dec. 6, 2013, now Pat. No. 8,823,795.

(60) Provisional application No. 62/026,639, filed on Jul. 19, 2014, provisional application No. 62/018,606, filed on Jun. 29, 2014, provisional application No. 61/872,439, filed on Aug. 30, 2013, provisional application No. 61/859,070, filed on Jul. 26, 2013.

(56) References Cited

U.S. PATENT DOCUMENTS

| | | |
|---|---|---|
| 3,240,113 A | 3/1966 | Stechemesser |
| 3,708,742 A | 1/1973 | Gunn |
| 4,523,193 A | 6/1985 | Levinson |
| D283,130 S | 3/1986 | Boenning |
| D297,222 S | 8/1988 | Rauch |
| 4,843,461 A | 6/1989 | Tatsumi |
| 4,982,092 A | 1/1991 | Jehle |
| 5,210,520 A | 5/1993 | Housley |
| 5,428,388 A | 6/1995 | Von Bauer |
| 5,493,618 A | 2/1996 | Stevens |
| 5,521,578 A | 5/1996 | Delvalle |
| D371,086 S | 6/1996 | Collins |
| 5,602,580 A | 2/1997 | Tseng |
| D381,638 S | 7/1997 | Kruse |
| 5,774,569 A | 6/1998 | Waldenmaier |
| 5,781,108 A | 7/1998 | Jacob |
| 5,784,446 A | 7/1998 | Stuart |
| D404,673 S | 1/1999 | Gordon |
| 5,907,352 A | 5/1999 | Gilley |
| 5,995,139 A | 11/1999 | Lee |
| 6,028,626 A | 2/2000 | Aviv |
| D421,727 S | 3/2000 | Pierson |
| D422,521 S | 4/2000 | Morrow |
| 6,073,192 A | 6/2000 | Clapp |
| 6,094,213 A | 7/2000 | Mun |
| 6,185,294 B1 | 2/2001 | Chornenky |
| 6,226,031 B1 | 5/2001 | Barraclough |
| 6,313,743 B1 | 11/2001 | Abraham-Fuchs |
| 6,375,366 B1 | 4/2002 | Kato |
| 6,429,893 B1 | 8/2002 | Xin |
| 6,535,243 B1 | 3/2003 | Tullis |
| 6,542,078 B2 | 4/2003 | Script |
| 6,590,604 B1 | 7/2003 | Tucker |
| 6,661,340 B1 | 12/2003 | Saylor |
| 6,727,811 B1 | 4/2004 | Fendis |
| 6,753,899 B2 | 6/2004 | Lapalme |
| 6,778,084 B2 | 8/2004 | Chang |
| 6,812,970 B1 | 11/2004 | McBride |
| 6,828,909 B2 | 12/2004 | Script |
| D500,751 S | 1/2005 | Yukikado |
| D501,652 S | 2/2005 | Pierson |
| 6,870,488 B1 | 3/2005 | Compton |
| 6,928,461 B2 | 8/2005 | Tuli |
| 6,930,599 B2 | 8/2005 | Naidoo |
| 6,993,123 B1 | 1/2006 | Allen |
| 7,015,943 B2 | 3/2006 | Chiang |
| D519,100 S | 4/2006 | Shioya |
| D522,490 S | 6/2006 | Yukikado |
| D525,963 S | 8/2006 | Yukikado |
| 7,113,578 B2 | 9/2006 | Unger |
| D531,160 S | 10/2006 | Yukikado |
| 7,154,531 B2 | 12/2006 | Laird |
| 7,193,644 B2 | 3/2007 | Carter |
| D562,306 S | 2/2008 | Jeong |
| 7,330,112 B1 | 2/2008 | Emigh |
| 7,330,649 B2 | 2/2008 | Finizio |
| 7,375,492 B2 | 5/2008 | Calhoon |
| D577,301 S | 9/2008 | Johnson |
| 7,429,924 B2 | 9/2008 | Langer |
| 7,440,025 B2 | 10/2008 | Cheng |
| 7,460,149 B1 | 12/2008 | Donovan |
| 7,477,134 B2 | 1/2009 | Langer |
| 7,486,271 B2 | 2/2009 | Hershkovitz |
| 7,492,303 B1 | 2/2009 | Levitan |
| D588,574 S | 3/2009 | Takahata |
| 7,526,102 B2 | 4/2009 | Ozer |
| D595,260 S | 6/2009 | Takahata |
| 7,583,191 B2 | 9/2009 | Zinser |
| 7,701,171 B2 | 4/2010 | Defant |
| 7,738,917 B2 | 6/2010 | Ryley |
| 7,746,223 B2 | 6/2010 | Howarter |
| 7,751,285 B1 | 7/2010 | Cain |
| 7,752,070 B2 | 7/2010 | Hatcher |
| 7,809,966 B2 | 10/2010 | Imao |
| 7,826,729 B2 | 11/2010 | Cullen |
| 7,956,576 B2 | 6/2011 | Neu |
| 7,991,381 B1 | 8/2011 | Dunne |
| 7,991,575 B2 | 8/2011 | Vogel |
| 8,016,676 B2 | 9/2011 | Carter |
| 8,125,329 B1 | 2/2012 | Hirou |
| 8,139,098 B2 | 3/2012 | Carter |
| 8,144,183 B2 | 3/2012 | Carter |
| 8,144,184 B2 | 3/2012 | Carter |
| 8,154,581 B2 | 4/2012 | Carter |
| 8,164,614 B2 | 4/2012 | Carter |
| D660,819 S | 5/2012 | Chen |
| 8,193,919 B2 | 6/2012 | Langer |
| 8,224,311 B2 | 7/2012 | Majmundar |
| 8,237,574 B2 | 8/2012 | Anderson |
| 8,334,656 B2 | 12/2012 | Weiss |
| 8,354,914 B2 | 1/2013 | Buckingham |
| 8,504,103 B2 | 8/2013 | Ficquette |
| D689,828 S | 9/2013 | Pierson |
| 8,562,158 B2 | 10/2013 | Chien |
| 8,565,399 B2 | 10/2013 | Siminoff |
| D692,847 S | 11/2013 | Barley |
| 8,630,452 B2 | 1/2014 | Mardirossian |
| 8,665,333 B1 | 3/2014 | Sharma |
| 8,669,876 B2 | 3/2014 | Anderson |
| D707,147 S | 6/2014 | Crippa |
| 8,780,201 B1 | 7/2014 | Scalisi |
| D710,727 S | 8/2014 | Siminoff |
| D710,728 S | 8/2014 | Siminoff |
| D711,275 S | 8/2014 | Scalisi |
| 8,823,795 B1 | 9/2014 | Scalisi |
| 8,842,180 B1 | 9/2014 | Kasmir |
| 8,866,598 B2 | 10/2014 | Collins |
| 8,872,915 B1 | 10/2014 | Scalisi |
| 8,875,208 B1 | 10/2014 | Abkairov |
| 8,937,659 B1 | 1/2015 | Scalisi |
| 8,941,736 B1 | 1/2015 | Scalisi |
| 8,947,530 B1 | 2/2015 | Scalisi |
| 8,953,040 B1 | 2/2015 | Scalisi |
| 8,976,244 B2 | 3/2015 | Felt |
| 9,013,575 B2 | 4/2015 | Scalisi |
| 9,021,134 B1 | 4/2015 | Patel |
| 9,049,352 B2 | 6/2015 | Scalisi |
| 9,053,622 B2 | 6/2015 | Scalisi |
| 9,055,202 B1 | 6/2015 | Scalisi |
| 9,057,210 B2 | 6/2015 | Dumas |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir |
| 9,071,923 B2 | 6/2015 | Zhang |
| 9,113,051 B1 | 8/2015 | Scalisi |
| 9,142,214 B2 | 9/2015 | Scalisi |
| 9,172,922 B1 | 10/2015 | Kasmir |
| 9,196,104 B2 | 11/2015 | Dumas |
| 9,218,696 B2 | 12/2015 | Dumas |
| 9,230,424 B1 | 1/2016 | Scalisi |
| 9,282,665 B1 | 3/2016 | Ladanyi |

(56) References Cited

U.S. PATENT DOCUMENTS

| | | |
|---|---|---|
| 9,336,637 B2 | 5/2016 | Neil |
| 9,338,594 B1 | 5/2016 | Onnen |
| 9,584,775 B2 | 2/2017 | Siminoff |
| 9,615,199 B1 | 4/2017 | Haney |
| D788,061 S | 5/2017 | Siminoff |
| D789,404 S | 6/2017 | Modestine |
| D789,820 S | 6/2017 | Siminoff |
| 9,674,433 B1 | 6/2017 | De La Cruz |
| D791,165 S | 7/2017 | Modestine |
| D791,240 S | 7/2017 | Lemberger |
| D791,241 S | 7/2017 | Lemberger |
| D791,243 S | 7/2017 | Loew |
| D791,878 S | 7/2017 | Loew |
| 9,734,675 B2 | 8/2017 | Siminoff |
| D798,177 S | 9/2017 | Siminoff |
| 9,761,092 B2 | 9/2017 | Chen |
| 9,810,887 B1 | 11/2017 | Abdala |
| 9,978,260 B2 | 5/2018 | Lee |
| 10,289,917 B1 | 5/2019 | Fu |
| 10,367,814 B2 | 7/2019 | Walker |
| 2001/0010555 A1 | 8/2001 | Driscoll |
| 2001/0022627 A1 | 9/2001 | Bernhardt |
| 2002/0097161 A1 | 7/2002 | Deeds |
| 2003/0009364 A1 | 1/2003 | Miyoshi |
| 2003/0025599 A1 | 2/2003 | Monroe |
| 2003/0081952 A1 | 5/2003 | Geng |
| 2004/0085205 A1 | 5/2004 | Yeh |
| 2004/0085449 A1 | 5/2004 | Millet |
| 2004/0086093 A1 | 5/2004 | Schranz |
| 2004/0095254 A1 | 5/2004 | Maruszczak |
| 2004/0117039 A1 | 6/2004 | Hantke |
| 2004/0178889 A1 | 9/2004 | Buckingham |
| 2004/0229569 A1 | 11/2004 | Franz |
| 2004/0257336 A1 | 12/2004 | Hershkovitz |
| 2005/0006528 A1 | 1/2005 | Movsesian |
| 2005/0007451 A1 | 1/2005 | Chiang |
| 2005/0040954 A1 | 2/2005 | McNally |
| 2005/0046584 A1 | 3/2005 | Breed |
| 2005/0057361 A1 | 3/2005 | Giraldo |
| 2005/0071879 A1 | 3/2005 | Haldavnekar |
| 2005/0097248 A1 | 5/2005 | Kelley |
| 2005/0116480 A1 | 6/2005 | Deng |
| 2005/0237208 A1 | 10/2005 | Wojcik |
| 2005/0259641 A1 | 11/2005 | Beninato |
| 2005/0267605 A1 | 12/2005 | Lee |
| 2005/0285934 A1 | 12/2005 | Carter |
| 2005/0285944 A1 | 12/2005 | Watanabe |
| 2006/0010504 A1 | 1/2006 | Sharma |
| 2006/0038663 A1 | 2/2006 | Steinetz |
| 2006/0063517 A1 | 3/2006 | Oh |
| 2006/0093187 A1 | 5/2006 | Mittal |
| 2006/0100002 A1 | 5/2006 | Luebke |
| 2006/0139449 A1 | 6/2006 | Cheng |
| 2006/0152365 A1 | 7/2006 | Kim |
| 2006/0156361 A1 | 7/2006 | Wang |
| 2006/0187034 A1 | 8/2006 | Styers |
| 2006/0195872 A1 | 8/2006 | Seo |
| 2006/0271678 A1 | 11/2006 | Jessup |
| 2006/0273895 A1 | 12/2006 | Kollin |
| 2007/0008081 A1 | 1/2007 | Tylicki |
| 2007/0012602 A1 | 1/2007 | Baldassari |
| 2007/0025712 A1 | 2/2007 | Jezierski |
| 2007/0029486 A1 | 2/2007 | Zhevelev |
| 2007/0046442 A1 | 3/2007 | Bartorelli |
| 2007/0052531 A1 | 3/2007 | Matthews |
| 2007/0066316 A1 | 3/2007 | Hoover |
| 2007/0103541 A1 | 5/2007 | Carter |
| 2007/0109441 A1 | 5/2007 | Cheng |
| 2007/0118831 A1 | 5/2007 | Kondo |
| 2007/0126574 A1 | 6/2007 | Langer |
| 2007/0132413 A1 | 6/2007 | Mays |
| 2007/0146115 A1 | 6/2007 | Roosli |
| 2007/0146122 A1 | 6/2007 | Ratner |
| 2007/0176778 A1 | 8/2007 | Ando |
| 2007/0194945 A1 | 8/2007 | Atkinson |
| 2007/0206510 A1 | 9/2007 | Morris |
| 2007/0216764 A1 | 9/2007 | Kwak |
| 2007/0237358 A1 | 10/2007 | Tseng |
| 2008/0004995 A1 | 1/2008 | Klingenberg |
| 2008/0028063 A1 | 1/2008 | Holmes |
| 2008/0036862 A1 | 2/2008 | Lang |
| 2008/0047287 A1 | 2/2008 | Ruppert |
| 2008/0128586 A1 | 6/2008 | Johnson |
| 2008/0129498 A1 | 6/2008 | Howarter |
| 2008/0129825 A1 | 6/2008 | DeAngelis |
| 2008/0136915 A1 | 6/2008 | Iwamura |
| 2008/0145050 A1 | 6/2008 | Mayer |
| 2008/0157936 A1 | 7/2008 | Ebrom |
| 2008/0157956 A1 | 7/2008 | Radivojevic |
| 2008/0167072 A1 | 7/2008 | Berstis |
| 2008/0198225 A1 | 8/2008 | Gal |
| 2008/0297339 A1 | 12/2008 | Mathews |
| 2009/0059002 A1 | 3/2009 | Kim |
| 2009/0072963 A1 | 3/2009 | Langer |
| 2009/0093235 A1 | 4/2009 | Grealish |
| 2009/0141939 A1 | 6/2009 | Chambers |
| 2009/0167862 A1 | 7/2009 | Jentoft |
| 2009/0207249 A1 | 8/2009 | Erel |
| 2009/0213208 A1 | 8/2009 | Glatt |
| 2009/0243852 A1 | 10/2009 | Haupt |
| 2009/0273670 A1 | 11/2009 | Tamayo |
| 2009/0284578 A1 | 11/2009 | Carter |
| 2009/0296641 A1 | 12/2009 | Bienas |
| 2009/0302995 A1 | 12/2009 | Park |
| 2009/0308116 A1 | 12/2009 | Lambrou |
| 2010/0087161 A1 | 4/2010 | Young |
| 2010/0103300 A1 | 4/2010 | Jones |
| 2010/0109903 A1 | 5/2010 | Carrick |
| 2010/0134072 A1 | 6/2010 | Neu |
| 2010/0141761 A1 | 6/2010 | McCormack |
| 2010/0195810 A1 | 8/2010 | Mota |
| 2010/0225455 A1 | 9/2010 | Claiborne |
| 2010/0245060 A1 | 9/2010 | Tylicki |
| 2010/0276570 A1 | 11/2010 | Moser |
| 2010/0289661 A1 | 11/2010 | Styers |
| 2011/0025852 A1 | 2/2011 | Tanaka |
| 2011/0028118 A1 | 2/2011 | Thomas |
| 2011/0074570 A1 | 3/2011 | Feldstein |
| 2011/0090085 A1 | 4/2011 | Belz |
| 2011/0121940 A1 | 5/2011 | Jones |
| 2011/0140845 A1 | 6/2011 | Sanders |
| 2011/0156566 A1 | 6/2011 | Chen |
| 2011/0207509 A1 | 8/2011 | Crawford |
| 2011/0221582 A1 | 9/2011 | Chuey |
| 2011/0260880 A1 | 10/2011 | Dean |
| 2011/0264405 A1 | 10/2011 | Vogel |
| 2011/0287718 A1 | 11/2011 | Abel |
| 2011/0313775 A1 | 12/2011 | Laligand |
| 2012/0011559 A1 | 1/2012 | Miettinen |
| 2012/0027248 A1 | 2/2012 | Feris |
| 2012/0030133 A1 | 2/2012 | Rademaker |
| 2012/0044049 A1 | 2/2012 | Vig |
| 2012/0044050 A1 | 2/2012 | Vig |
| 2012/0044085 A1 | 2/2012 | Hung |
| 2012/0085824 A1 | 4/2012 | Handshaw |
| 2012/0098439 A1 | 4/2012 | Recker |
| 2012/0105631 A1 | 5/2012 | Hutchings |
| 2012/0108215 A1 | 5/2012 | Kameli |
| 2012/0113253 A1 | 5/2012 | Slater |
| 2012/0127308 A1 | 5/2012 | Eldershaw |
| 2012/0162416 A1 | 6/2012 | Su |
| 2012/0182427 A1 | 7/2012 | Marshall |
| 2012/0200942 A1 | 8/2012 | Schmidt |
| 2012/0229282 A1 | 9/2012 | Zagami |
| 2012/0230203 A1 | 9/2012 | Casey |
| 2012/0230696 A1 | 9/2012 | Pederson |
| 2012/0262581 A1 | 10/2012 | Carter |
| 2012/0267962 A1 | 10/2012 | Hanchett |
| 2012/0280783 A1 | 11/2012 | Gerhardt |
| 2012/0280789 A1 | 11/2012 | Gerhardt |
| 2012/0280790 A1 | 11/2012 | Gerhardt |
| 2012/0287123 A1 | 11/2012 | Starner |
| 2012/0293310 A1 | 11/2012 | Fitzgibbon |
| 2012/0320150 A1 | 12/2012 | Montgomery |

(56) References Cited

U.S. PATENT DOCUMENTS

| | | |
|---|---|---|
| 2012/0327225 A1 | 12/2012 | Barley |
| 2012/0327246 A1 | 12/2012 | Senior |
| 2013/0017812 A1 | 1/2013 | Foster |
| 2013/0020875 A1 | 1/2013 | Wozniak |
| 2013/0039499 A1 | 2/2013 | Patenaude |
| 2013/0045763 A1 | 2/2013 | Ruiz |
| 2013/0057695 A1 | 3/2013 | Huisking |
| 2013/0057696 A1 | 3/2013 | Felt |
| 2013/0091213 A1 | 4/2013 | Diab |
| 2013/0094444 A1 | 4/2013 | Lai |
| 2013/0128050 A1 | 5/2013 | Aghdasi |
| 2013/0130749 A1 | 5/2013 | Andersen |
| 2013/0136033 A1 | 5/2013 | Patil |
| 2013/0147616 A1 | 6/2013 | Lambert |
| 2013/0147964 A1 | 6/2013 | Frank |
| 2013/0169809 A1 | 7/2013 | Grignan |
| 2013/0169814 A1 | 7/2013 | Liu |
| 2013/0173477 A1 | 7/2013 | Cairns |
| 2013/0208123 A1 | 8/2013 | Lakhani |
| 2013/0223279 A1 | 8/2013 | Tinnakornsrisuphap |
| 2013/0223833 A1 | 8/2013 | Tenenbaum |
| 2013/0286211 A1 | 10/2013 | Cao |
| 2013/0293722 A1 | 11/2013 | Chen |
| 2013/0328522 A1 | 12/2013 | Brockman |
| 2013/0335219 A1 | 12/2013 | Malkowski |
| 2014/0009609 A1 | 1/2014 | Webster |
| 2014/0015967 A1 | 1/2014 | Moore |
| 2014/0070922 A1 | 3/2014 | Davis |
| 2014/0077929 A1 | 3/2014 | Dumas |
| 2014/0087780 A1 | 3/2014 | Abhyanker |
| 2014/0088761 A1 | 3/2014 | Shamlian |
| 2014/0118600 A1 | 5/2014 | Son |
| 2014/0125754 A1 | 5/2014 | Haywood |
| 2014/0149706 A1 | 5/2014 | Shim |
| 2014/0167676 A1 | 6/2014 | Mack |
| 2014/0188643 A1 | 7/2014 | Murphy |
| 2014/0210590 A1 | 7/2014 | Castro |
| 2014/0253725 A1 | 9/2014 | Hsu |
| 2014/0260449 A1 | 9/2014 | Uyeda |
| 2014/0265359 A1 | 9/2014 | Cheng |
| 2014/0266669 A1 | 9/2014 | Fadell |
| 2014/0266767 A1 | 9/2014 | Huang |
| 2014/0267716 A1 | 9/2014 | Child |
| 2014/0267740 A1 | 9/2014 | Almomani |
| 2014/0285672 A1 | 9/2014 | Hogasten |
| 2014/0292194 A1 | 10/2014 | Sagal |
| 2014/0292481 A1 | 10/2014 | Dumas |
| 2014/0320663 A1 | 10/2014 | Chien |
| 2014/0334684 A1 | 11/2014 | Strimling |
| 2014/0340894 A1 | 11/2014 | Chien |
| 2014/0368643 A1 | 12/2014 | Siegel |
| 2015/0022319 A1 | 1/2015 | Chutorash |
| 2015/0022618 A1 | 1/2015 | Siminoff |
| 2015/0022620 A1 | 1/2015 | Siminoff |
| 2015/0027178 A1 | 1/2015 | Scalisi |
| 2015/0029335 A1 | 1/2015 | Kasmir |
| 2015/0035987 A1 | 2/2015 | Fernandez |
| 2015/0049191 A1 | 2/2015 | Scalisi |
| 2015/0054949 A1 | 2/2015 | Scalisi |
| 2015/0061859 A1 | 3/2015 | Matsuoka |
| 2015/0063559 A1 | 3/2015 | Siminoff |
| 2015/0070495 A1 | 3/2015 | Scalisi |
| 2015/0077220 A1 | 3/2015 | Davis |
| 2015/0084779 A1 | 3/2015 | Saladin |
| 2015/0092055 A1 | 4/2015 | Scalisi |
| 2015/0109104 A1 | 4/2015 | Fadell |
| 2015/0109111 A1 | 4/2015 | Lee |
| 2015/0109112 A1 | 4/2015 | Fadell |
| 2015/0112885 A1 | 4/2015 | Fadell |
| 2015/0120015 A1 | 4/2015 | Fadell |
| 2015/0120598 A1 | 4/2015 | Fadell |
| 2015/0127712 A1 | 5/2015 | Fadell |
| 2015/0145991 A1 | 5/2015 | Russell |
| 2015/0156030 A1 | 6/2015 | Fadell |
| 2015/0156031 A1 | 6/2015 | Fadell |
| 2015/0161856 A1 | 6/2015 | Wilson |
| 2015/0163463 A1 | 6/2015 | Hwang |
| 2015/0179031 A1 | 6/2015 | Wallace |
| 2015/0185964 A1 | 7/2015 | Stout |
| 2015/0194839 A1 | 7/2015 | Wojcik |
| 2015/0208032 A1 | 7/2015 | Gavney |
| 2015/0211259 A1 | 7/2015 | Dumas |
| 2015/0213658 A1 | 7/2015 | Dumas |
| 2015/0228281 A1 | 8/2015 | Raniere |
| 2015/0236966 A1 | 8/2015 | Francini |
| 2015/0275564 A1 | 10/2015 | Rosenthal |
| 2015/0276266 A1 | 10/2015 | Warren |
| 2015/0309487 A1 | 10/2015 | Lyman |
| 2015/0310381 A1 | 10/2015 | Lyman |
| 2015/0312531 A1 | 10/2015 | Samad |
| 2015/0338812 A1 | 11/2015 | Miura |
| 2015/0339895 A1 | 11/2015 | Chen |
| 2015/0347910 A1 | 12/2015 | Fadell |
| 2016/0001719 A1 | 1/2016 | Frost |
| 2016/0019495 A1 | 1/2016 | Kolchin |
| 2016/0057199 A1 | 2/2016 | Aziz |
| 2016/0058181 A1 | 3/2016 | Han |
| 2016/0073479 A1 | 3/2016 | Erchak |
| 2016/0078699 A1 | 3/2016 | Kalb |
| 2016/0104061 A1 | 4/2016 | McGill |
| 2016/0105644 A1 | 4/2016 | Smith |
| 2016/0125357 A1 | 5/2016 | Hall |
| 2016/0171435 A1 | 6/2016 | Newton |
| 2016/0171439 A1 | 6/2016 | Ladden |
| 2016/0191864 A1 | 6/2016 | Siminoff |
| 2016/0219254 A1 | 7/2016 | Hu |
| 2016/0235236 A1 | 8/2016 | Byers |
| 2016/0247344 A1 | 8/2016 | Eichenblatt |
| 2016/0261425 A1 | 9/2016 | Horton |
| 2016/0292936 A1 | 10/2016 | Palmer |
| 2016/0300187 A1 | 10/2016 | Kashi |
| 2016/0307380 A1 | 10/2016 | Ho |
| 2016/0330403 A1 | 11/2016 | Siminoff |
| 2016/0366373 A1 | 12/2016 | Siminoff |
| 2017/0023780 A1 | 1/2017 | Braker |
| 2017/0064504 A1 | 3/2017 | Jose |
| 2017/0109984 A1 | 4/2017 | Child |
| 2017/0124510 A1 | 5/2017 | Catering |
| 2017/0149855 A1 | 5/2017 | Doshi |
| 2017/0160137 A1 | 6/2017 | Jeong |
| 2017/0160138 A1 | 6/2017 | Jeong |
| 2017/0160144 A1 | 6/2017 | Jeong |
| 2017/0162225 A1 | 6/2017 | Jeong |
| 2017/0163944 A1 | 6/2017 | Jeong |
| 2017/0220872 A1 | 8/2017 | Child |
| 2017/0251035 A1 | 8/2017 | Siminoff |
| 2017/0251173 A1 | 8/2017 | Siminoff |
| 2017/0251182 A1 | 8/2017 | Siminoff |
| 2017/0272706 A1 | 9/2017 | Jeong |
| 2017/0280112 A1 | 9/2017 | Siminoff |
| 2017/0280565 A1 | 9/2017 | Tso |
| 2017/0293883 A1 | 10/2017 | Li |
| 2017/0294694 A1 | 10/2017 | Tso |
| 2018/0019889 A1 | 1/2018 | Burns |

FOREIGN PATENT DOCUMENTS

| | | |
|---|---|---|
| CN | 202939738 U | 5/2013 |
| EP | 0684743 B1 | 11/1995 |
| GB | 2400958 B | 7/2005 |
| WO | 2001093220 A1 | 12/2001 |
| WO | 2007111802 A2 | 10/2007 |
| WO | 2014062321 A1 | 4/2014 |
| WO | 2014107196 A1 | 7/2014 |
| WO | 2014144628 A2 | 9/2014 |
| WO | 2015023737 A1 | 2/2015 |
| WO | 2016032217 A1 | 3/2016 |

OTHER PUBLICATIONS

The Next Web—Hardware renaissance: A look at the Christie Street platform and doorbot video streaming doorbell—Downloaded on Nov. 18, 2013 from http://thenextweb.com/insider/2012/12/10/

(56) References Cited

OTHER PUBLICATIONS satisfaction-lies-in-hardware-for-siminoffs-christie-street-platform-and-doorbot-video-streaming-doorbell/; prior art publication at least as of Dec. 10, 2012.
Digital Trends—Doorbot wi-fi doorbell camera lets you see visitors on your smartphone—Downloaded on Nov. 18, 2013 from http://www.digitaltrends.com/lifestyle/doorbot-camera-see-visitors-smartphone/; prior art publication at least as of Dec. 9, 2012.
Doorbot website—Downloaded on Jul. 26, 2013 from http://www.getdoorbot.com.
Doorbot users manual—Downloaded on Nov. 18, 2013 from http://static.mydoorbot.com/DoorBot%20Users%20Manual%201.0.pdf.
Doorbot "fact sheet"—Downloaded on Nov. 18, 2013 from http://cdn.shopify.com/s/files/1/0247/6501/files/DoorBotMediaKit.pdf?17037.
CellNock—Index page—Originally downloaded on Sep. 23, 2013 from http://cellnock.com/index.html; The website says CellNock is "patent pending".
CellNock website—downloaded on Nov. 18, 2013 from http://cellnock.com/; The website says CellNock is "patent pending".
Philips InSight Baby Monitor—Originally downloaded on Jul. 24, 2013 from http://www.amazon.com/Philips-B120-37-InSight-Wireless/dp/B00AALO9Z6/ref=sr_1_3?ie=UTF8&qid=1384808431&sr=8-3&keywords=philips+insight.
SkyBell—MySkyBell.com (previously iDoorCam.com)—Downloaded on Nov. 18, 2013 from http://www.myskybell.com/.
Squaritz IDS Doorbell System—Downloaded on Aug. 15, 2013 from http://www.indiegogo.com/projects/squaritz-ids-intelligent-doorbell-system.
MyBells—Downloaded on Nov. 18, 2013 from http://www.indiegogo.com/projects/mybells-the-smart-bells.
Wireless Video Doorbell Pager—Downloaded on Aug. 9, 2013 from http://www.indiegogo.com/projects/wireless-video-doorbell-pager--4.
Lockitron—Downloaded on Jul. 24, 2013 from https://lockitron.com/preorder.
EyeTalk for Home—Downloaded May 24, 2013 from http://www.revolutionaryconceptsinc.com/forhome.html.
SmartBell—Downloaded on Dec. 5, 2013 from http://smartbell.co/.
SmartBell—A Doorbell for Smartphones, published by Scrambled Brains Tech, LLC., Oct. 1, 2013.
August Smart Lock—Downloaded on Jun. 10, 2014 from www.August.com.
August Smart Lock—Downloaded on Oct. 10, 2014 from www.August.com.
Kevo Lock—User guide—Downloaded on Jun. 10, 2014 from http://s7d5.scene7.com/is/content/BDHHI/Kwikset/Website%20Content/Kevo/kevo-userguide-kwikset_eng.pdf.
Kevo Lock—Installation guide—Downloaded on Oct. 10, 2014 from http://s7d5.scene7.com/is/content/BDHHI/Kwikset/Website%20Content/Kevo/installation_guide.pdf.
Schlage Electronic Lock—User guide—Downloaded on Jun. 10, 2014 from www.schlage.com.
AdaFruit—Lock-Style Solenoid—Downloaded on Aug. 22, 2014 from www.AdaFruit.com.
Wikipedia—Power Matters Alliance—Downloaded on Aug. 23, 2014 from www.wikipedia.com.
AdaFruit—Push-Pull Solenoid—Technical Details—Downloaded on Aug. 22, 2014 from www.AdaFruit.com.
Wikipedia—Qi—Downloaded on Aug. 23, 2014 from www.wikipedia.com.
TP-Link—Website—Downloaded on Jul. 15, 2014 from www.tp-link.us.
A HD Cameras—AC Adapter Spy Camera—Downloaded on Jun. 24, 2014 from ahdcameras.com.
Fanfare Chime—Downloaded on Oct. 10, 2014 from https://www.kickstarter.com/projects/1040187373/1919517395?token=47099d90.
Ring Video Doorbell—Downloaded on Oct. 10, 2014 from www.ring.com.
Tech Crunch—Doorboot becomes Ring—Downloaded on Oct. 10, 2014 from http://techcrunch.com/2014/09/29/doorbot-ring-home-security-doorbell/?ncid=rss&utm_source=feedburner&utm_medium=feed&utm_campaign=Feed.
iChime—iChime Customizable Digital Chime System—Downloaded on Nov. 7, 2014 from http://www.ichime.com/.
Christie Street—Doorbot—Downloaded on Jun. 14, 2013 from https://christiestreet.com/products/doorbot.
IDOORCAM—A Wi-Fi Enabled, Webcam Doorbell—Downloaded on Sep. 3, 2013 from http://www.idoorcam.com/.
Langer—Langer Doorbell Button Sized Light—Downloaded on Sep. 16, 2013 from http://www.youtube.com/watch?v=u9nNCm4tSYI.
Langer—Langer Doorbell Light—Downloaded on Sep. 16, 2013 from http://www.youtube.com/watch?v=6dbU-Gyjgx8.
SmartBell—SmartBell on Kickstarter—Downloaded on Feb. 28, 2014 from http://www.kickstarter.com/projects/1256599792/smartbell-wi-fi-doorbell-for-video-chats-to-ios-an.
DefenDoor—DefenDoor by date LLC—Downloaded on Dec. 11, 2014 from https://www.kickstarter.com/projects/85455040/defendoor-a-home-security-system-that-syncs-with-y.
CNET—Notifi by Chamberlain—Downloaded on Jan. 9, 2015 from http://www.cnet.com/products/chamberlain-notifi-video-door-chime/.
I-Bell—Downloaded on Jan. 13, 2015 from https://www.kickstarter.com/projects/729057054/i-bell.
Dropcam—Downloaded on Jan. 19, 2015 from https://www.dropcam.com/dropcam-pro.
Doorbird—Downloaded on Jan. 23, 2015 from http://www.doorbird.com/.
Chui Doorbell—Downloaded on Jan. 23, 2015 from http://www.getchui.com/.
Tech Crunch—Chui Doorbell—Downloaded on Jan. 23, 2015 from http://techcrunch.com/2014/04/18/214-technologies-is-crowdfunding-a-smart-doorbell-called-chui/.
Giz Mag—Downloaded on Jan. 23, 2015 from http://www.gizmag.com/gopano-micro-captures-360-degree-video-on-iphone/18542/.
Sengled Snap Light Camera—Downloaded on Mar. 9, 2015 from http://www.sengled.com/product/snap.
CNET—Alarm.com Garage Door Camera—Downloaded on Mar. 9, 2015 from http://www.cnet.com/au/products/alarm-com-for-apple-watch/.
Rollup iHome Peephole Doorbell—Downloaded on May 7, 2015 from http://www.rollupcn.com.
Tech Crunch—Ring Chime—Smart Chime—Downloaded on May 13, 2015 from http://techcrunch.com/2015/05/13/rings-smart-doorbell-gets-a-smart-speaker/#y0xlqx:SpqY.
Peeple—Peephole Camera—Downloaded on May 14, 2015 from https://www.kickstarter.com/projects/1544392549/peeple-caller-id-for-your-front-door/video_share.
Vivant Doorbell Camera—Downloaded on May 20, 2015 from http://www.vivint.com/company/newsroom/press/Vivint-Introduces-Wi-Fi-Enabled-Doorbell-Camera-into-Its-Smart-Home-Platform.
MyIntercom Video System—Downloaded on Jun. 8, 2015 from http://myintercom.de/en/funktionsweise.
Kocchi's Cobell Wi-Fi Doorbell—Downloaded on Sep. 14, 2015 from http://www.kocchis.com/Cobell_Manual.pdf.
August Doorbell Cam—Downloaded on Nov. 12, 2015 from http://august.com/products/august-doorbell/.
Nest Home Index—Downloaded on Nov. 12, 2015 from https://nest.com/blog/2015/11/09/the-first-nest-home-index/?utm_medium=paid%20social&utm_source=Facebook&utm_campaign=Nest%20Home%20Index&utm_content=Launch%20post.
Engadget—Amazon partners are reportedly exploring in-home deliveries—Downloaded on Oct. 19, 2017 from https://www.engadget.com/2016/09/27/amazon-august-garageio-inhome/; prior art publication at least as of Sep. 27, 2016.
Logittech—Logitech Circle 2—Downloaded on Oct. 19, 2017 from from https://www.logitech.com/en-us/product/circle-2-home-security-camera; prior art publication at least as of Jul. 26, 2017.
NY Times—Was That an Intruder or a Pet? The Security Cams That Can Tell—Downloaded on Oct. 19, 2017 from https://www.nytimes.

(56) References Cited

OTHER PUBLICATIONS com/2017/08/09/technology/personaltech/internet-connected-security-cameras-wirecutter.html?ref=collection%2Fsectioncollection%2Fpersonaltech; prior art publication at least as of Aug. 10, 2017.
Wisenet—SmartCam D1—Downloaded on Oct. 19, 2017 from http://www.wisenetlife.com/en-us/product/SmartCam/SNH-V6435DN;jsessionid=023065D418C9E9CA7335F6D9B4E2C8DC/faq/?currtPg=4; prior art publication at least as of Sep. 23, 2017.
Nortek Control—Go Control: Smart Doorbell Camera—Downloaded on Oct. 19, 2017 from https://www.nortekcontrol.com/pdf/literature/GC-DBC-1-GoControl-Smart-Doorbell-Camera-Spec-Sheet.pdf; prior art publication at least as of Dec. 18, 2016.
HSN—Samsung SmartCam High-Definition Video Doorbell—Downloaded on Oct. 25, 2017 from https://www.hsn.com/products/samsung-smartcam-high-definition-video-doorbell/8534791; prior art publication at least as of Oct. 22, 2017.
Wirecutter—The Best Smart Doorbell Camera—Downloaded on Oct. 25, 2017 from https://thewirecutter.com/reviews/best-smart-doorbell-camera/; prior art publication at least as of Oct. 19, 2017.
Newsday—Google's Nest launches video doorbell, new security system—Downloaded on Oct. 25, 2017 from https://www.newsday.com/lifestyle/google-s-nest-launches-video-doorbell-new-security-system-1.14498694; prior art publication at least as of Oct. 18, 2017.
ZD Net—Amazon to develop a smart doorbell to deliver packages inside your home—Downloaded on Oct. 25, 2017 from http://www.zdnet.com/article/amazon-plans-to-develop-smart-doorbell-to-deliver-packages-inside-your-home/; prior art publication at least as of Oct. 11, 2017.
DealerScope—Petra Named Exclusive Distributor for New Uniden U-Bell DB1 Wireless Video Doorbell—Downloaded on Oct. 25, 2017 from http://www.dealerscope.com/article/petra-named-exclusive-distributor-new-uniden-u-bell-db1-wireless-video-doorbell/; prior art publication at least as of Oct. 3, 2017.
Nest—Say hello to Nest Hello—Downloaded on Oct. 25, 2017 from https://nest.com/blog/2017/09/20/say-hello-to-nest-hello/?utm_campaign=nest%20hello%20preannounce&utm_source=nest%20customers&utm_medium=m-email&utm_content=learn%20more; prior art publication at least as of Sep. 27, 2017.
Gate: Your Personal Doorman—Downloaded on Oct. 25, 2017 from https://www.indiegogo.com/projects/gate-your-personal-doorman#/; prior art publication at least as of Sep. 25, 2017.
Washable—Walmart is teaming with a smart lock startup to deliver food straight to your fridge—Downloaded on Oct. 25, 2017 from http://mashable.com/2017/09/24/walmart-smart-lock-grocery-delivery/#7b0i0W4L_mqf; prior art publication at least as of Sep. 24, 2017.
Wired—Review: August Smart Lock—Downloaded on Oct. 25, 2017 from https://www.wired.com/2017/09/review-august-smart-lock/; prior art publication at least as of Sep. 24, 2017.
Amazon—Amazon Key—Downloaded on Oct. 25, 2017 from https://www.amazon.com/b?ie=UTF8&node=17285120011.
Amazon—Amazon Key In-Home Kit includes: Amazon Cloud Cam (Key Edition) indoor security camera and compatible smart lock—Downloaded on Oct. 25, 2017 from https://www.amazon.com/dp/B00KCYQGXE?locationCheckInvoked=1.
Amazon—Amazon Cloud Cam Indoor Security Camera, works with Alexa—Downloaded on Oct. 25, 2017 from https://www.amazon.com/Amazon-Cloud-Indoor-Security-Camera/dp/B01C4UY0JK/ref=sr_tr_1?s=amazon-devices&ie=UTF8&qid=1508945752&sr=1-1&keywords=amazon+cloud+cam.
Best Buy—Vivint Smart Home—Downloaded on Oct. 25, 2017 from https://www.bestbuy.com/site/home-security-solutions/smart-home/pcmcat748302047019.c?id=pcmcat748302047019&ref=P30T29R169&loc=BODY&CampaignID=860152&eut=2387920889; prior art publication at least as of Aug. 25, 2017.
Ring—Chime Pro—Downloaded on Oct. 25, 2017 from https://ring.com/chime-pro; prior art publication at least as of Aug. 23, 2017.
Twice—Samsung Wisenet SmartCam D1 Video Doorbell—Downloaded on Oct. 25, 2017 from http://www.twice.com/news/smart-home/samsung-wisenet-smartcam-d1-video-doorbell/65643; prior art publication at least as of Jul. 31, 2017.
Tech Crunch—Ring adds three connected Spotlight Cams to its Floodlight Cam lineup—Downloaded on Oct. 25, 2017 from https://techcrunch.com/2017/07/31/ring-adds-three-connected-spotlight-cams-to-its-floodlight-cam-lineup/; prior art publication at least as of Aug. 2, 2017.
CNBC—This $200 'smart' doorbell will show you who (or what) is in front of your house at all times—Downloaded on Oct. 25, 2017 from https://www.cnbc.com/2017/07/23/ring-doorbell-2-review.html; prior art publication at least as of Jul. 23, 2017.
Zmodo—Greet Pro with Beam Alert—Downloaded on Oct. 25, 2017 from http://www.zmodo.com/greetpro-1080p-wifi-video-doorbell/.
August—August Doorbell Cam Pro—Downloaded on Oct. 25, 2017 from http://august.com/products/doorbell-camera/?utm_source=Owners+from+Salesforce&utm_campaign=83b33655ed-EMAIL_CAMPAIGN_2017_06_06&utm_medium=email&utm_term=0_15a5cc0eb8-83b33655ed-247286221&mc_cid=83b33655ed&mc_eid=9d1996d140; prior art publication at least as of Jun. 11, 2017.
ATT—August Wi-Fi Doorbell Cam—Downloaded on Oct. 25, 2017 from https://m.att.com/shopmobile/accessories/specialty-items/August_Wi-Fi_Doorbell_Cam/_jcr_content.html?referrer=https%253A%2F%2Fwww.google.com%2F; prior art publication at least as of Jun. 9, 2017.
Ding, a beautifully simple smart doorbell—Downloaded on Oct. 25, 2017 from https://www.indiegogo.com/projects/ding-a-beautifully-simple-smart-doorbell-home-technology#7; prior art publication at least as of Jun. 5, 2017.
Clare Controls—The Clare Video Doorbell—Downloaded on Oct. 25, 2017 from https://www.clarecontrols.com/video-doorbell; prior art publication at least as of Jun. 1, 2017.
Business Insider—The best security cameras you can buy for your home—Downloaded on Oct. 25, 2017 from http://www.businessinsider.com/best-security-camera-home/#the-best-home-security-camera-for-outdoors-and-indoors-2; prior art publication at least as of May 27, 2017.
Smanos—Smart Video Doorbell—Downloaded on Oct. 25, 2017 from http://www.smanos.com/doorbell; prior art publication at least as of May 22, 2017.
Ring—Products—Downloaded on Oct. 30, 2017 from https://ring.com/.
Honeywell RCWL105A1003/N Plug-in Wireless Doorbell / Door Chime and Push Button; Downloaded on Apr. 16, 2019 from https://www.amazon.com/Honeywell-RCWL105A1003-Plug-Wireless-Button/dp/B001G0MATM; Prior art at least as of Sep. 26, 2008.
Sado Tech Model C Wireless Doorbell Operating at over 500-feet Range with Over 50 Chimes, No Batteries Required for Receiver; Downloaded on Apr. 16, 2019 from https://www.amazon.com/SadoTech-Wireless-Doorbell-Operating-Batteries/dp/B00FR4YQYK; Prior art at least as of Oct. 10, 2013.
Zheludev; The life and times of the LED—a 100-year history; Nature Photonics; Apr. 2007, pp. 189-192; vol. 1; Nature Publishing Group; Retrieved Apr. 16, 2019.
Yam; Innovative Advances in LED Technology; Microelectronics journal; Nov. 9, 2004; pp. 129-137; vol. 36; Retrieved Apr. 16, 2019.
Perkin Elmer; LHi968—LHi 968 Dual Element Detector, Top Line; Prior art at least as of Mar. 18, 2007.
Perkin Elmer; Pyroelectric Infrared Detectors; Prior art at least as of Apr. 16, 2009.
Perkin Elmer; Dual Element Detector; Prior art at least as of Mar. 25, 2007.
IEEE Standards Association; IEEE 802.15.1-2002—IEEE Standard for Telecommunications and Information Exchange Between Systems—LAN/MAN—Specific Requirements—Part 15: Wireless Medium Access Control (MAC) and Physical Layer (PHY) Specifications for Wireless Personal Area Networks (WPANs); Downloaded on Apr. 29, 2019 from https://standards.ieee.org/standard/802_15_1-2002.html; Prior art at least as of Jun. 14, 2002.
Bluetooth—Our History; Prior art least as of Oct. 17, 2013.
Nutone—LA600WH Door Chime—Installation & Operating Instructions; Downloaded on Apr. 29, 2019 from http://www.nutone.com/

(56) References Cited

OTHER PUBLICATIONS common/productDigitalAssethandler.ashx?id=5b25a40a-c56f-44bf-99d1-5b0c17f266e9; Prior art at least as of Sep. 18, 2013.
Nutone; LA600WH Universal Wired/Wireless MP3 Doorbell Mechanism, 6"w x 9-1/2"h x 2-1/4"d in White; Downloaded on Apr. 29, 2019 from http://www.nutone.com/products/product/e2562b0e-4fe5-432a-ac70-228953b19875; Prior art at least as of May 30, 2013.
InTune; InTune MP3 Door Chime Manual; Downloaded on Apr. 29, 2019 from https://www.heath-zenith.com/system/spree/documents/attachments/000/000/839/original/205371-02A pdf?1436551434 ; Prior art at least as of 2013.
Nutone; College Pride Mechanism; Prior art at least as of Jun. 8, 2013.
Seco-Larm; Enforcer DP-236Q Wireless Video Door Phone Manual; Downloaded on Apr. 29, 2019 from http://www.seco-larm.com/image/data/A_Documents/02_Manuals/MiDP-236Q_150528.pdf.

570 history

SMART LOCK SYSTEMS AND METHODS

CROSS-REFERENCE TO RELATED APPLICATIONS

The entire contents of the following application are incorporated by reference herein: U.S. Nonprovisional patent application Ser. No. 15/608,825; filed May 30, 2017; and entitled SMART LOCK SYSTEMS AND METHODS.

The entire contents of the following application are incorporated by reference herein: U.S. Nonprovisional patent application Ser. No. 14/801,718; filed Jul. 17, 2016; entitled SMART LOCK SYSTEMS AND METHODS; and issued as U.S. Pat. No. 9,342,936 on May 17, 2016.

The entire contents of the following application are incorporated by reference herein: U.S. Nonprovisional patent application Ser. No. 15/130,883; filed Apr. 15, 2016; and entitled SMART LOCK SYSTEMS AND METHODS.

The entire contents of the following application are incorporated by reference herein: U.S. Nonprovisional patent application Ser. No. 14/572,852; filed Dec. 17, 2014; entitled SMART LOCK SYSTEMS AND METHODS; and issued as U.S. Pat. No. 9,109,378 on Aug. 18, 2015.

The entire contents of the following application are incorporated by reference herein: U.S. Nonprovisional patent application Ser. No. 14/740,199; filed Jun. 15, 2015; and entitled IDENTITY VERIFICATION USING A SOCIAL NETWORK.

The entire contents of the following application are incorporated by reference herein: U.S. Nonprovisional patent application Ser. No. 14/612,376; filed Feb. 3, 2015; and entitled DOORBELL COMMUNICATION SYSTEMS AND METHODS.

The entire contents of the following application are incorporated by reference herein: U.S. Nonprovisional patent application Ser. No. 14/469,583; filed Aug. 27, 2014; entitled SMART LOCK SYSTEMS AND METHODS, and issued as U.S. Pat. No. 8,947,530 on Feb. 3, 2015.

The entire contents of the following application are incorporated by reference herein: U.S. Provisional Patent Application No. 62/026,639; filed Jul. 19, 2014; and entitled WIRED HOME AUTOMATION METHODS AND SYSTEMS.

The entire contents of the following application are incorporated by reference herein: U.S. Provisional Patent Application No. 62/018,606; filed Jun. 29, 2014; and entitled DOOR LOCK CHARGING SYSTEMS AND METHODS.

The entire contents of the following application are incorporated by reference herein: U.S. Nonprovisional patent application Ser. No. 14/275,811; filed May 12, 2014; entitled DOORBELL COMMUNICATION SYSTEMS AND METHODS; and issued as U.S. Pat. No. 8,872,915 on Oct. 28, 2014.

The entire contents of the following application are incorporated by reference herein: U.S. Nonprovisional patent application Ser. No. 14/142,839; filed Dec. 28, 2013; entitled DOORBELL COMMUNICATION SYSTEMS AND METHODS; and issued as U.S. Pat. No. 8,842,180 on Sep. 23, 2014.

The entire contents of the following application are incorporated by reference herein: U.S. Nonprovisional patent application Ser. No. 14/099,888; filed Dec. 6, 2013; entitled DOORBELL COMMUNICATION SYSTEMS AND METHODS; and issued as U.S. Pat. No. 8,823,795 on Sep. 2, 2014.

The entire contents of the following application are incorporated by reference herein: U.S. Nonprovisional patent application Ser. No. 14/098,772; filed Dec. 6, 2013; entitled DOORBELL COMMUNICATION SYSTEMS AND METHODS; and issued as U.S. Pat. No. 8,780,201 on Jul. 15, 2014.

The entire contents of the following application are incorporated by reference herein: U.S. Provisional Patent Application No. 61/872,439; filed Aug. 30, 2013; and entitled DOORBELL COMMUNICATION SYSTEMS AND METHODS.

The entire contents of the following application are incorporated by reference herein: U.S. Provisional Patent Application No. 61/859,070; filed Jul. 26, 2013; and entitled DOORBELL COMMUNICATION SYSTEMS AND METHODS.

BACKGROUND

Field

Various embodiments disclosed herein relate to door locks. Certain embodiments relate to electronic door locks.

Description of Related Art

Doors enable building owners to control access to buildings. Doors often include locks to guard against unwanted entry. Locks can be configured to fasten doors to inhibit unauthorized entry into buildings.

Electronic door locks typically require electricity from batteries. When the batteries run out of power, a user can be locked out of a building. Thus, there is a need to reduce occurrences of people inadvertently being locked out of buildings due to electronic door locks running out of electrical power.

SUMMARY

In some embodiments, a doorbell is attached to a wall of a building. A lock can be attached to the door to help secure the door. The doorbell can be configured to receive electricity from the building. Then, the doorbell can provide electricity to the door lock via various connection systems and methods.

In several embodiments, a lock is configured to receive electricity from a transformer that is electrically coupled to a doorbell chime while the transformer is located inside of the building. The lock can be mounted on a swinging door. Various embodiments provide a means to transmit electricity from a power supply of the building to the lock even though the lock is mounted on a swinging door. Several embodiments transmit electricity from a strike plate assembly to a face plate assembly. Then, the face plate assembly can transmit electricity to the lock.

Several embodiments include near field energy transmission and/or near field communication. The electricity can be transmitted via electrical induction. Direct induction and magnetic induction can be used to transmit electricity from the strike plate assembly to the lock.

In some embodiments, the face plate assembly includes a first set of electrical contacts, and the strike plate assembly includes a second set of electrical contacts. The electricity can be transmitted from a power supply of a building to the lock via the first set and second set of electrical contacts.

Several embodiments include a solenoid-driven bolt. Energizing the solenoid can cause the bolt to extend (i.e., lock the door) and/or can cause the solenoid to retract (i.e., unlock the door). The bolt can be a deadbolt or any suitable latch.

The lock can wirelessly communicate with a remote computing device. In some embodiments, the lock communicates with a remote computing device via power lines of the building. For example, a network connection module can connect the power lines to the Internet.

Locks can include cameras, microphones, speakers, doorbell buttons, and display screens. Locks can be configured to use software to perform various tasks associated with data communication and/or locking the door.

Some embodiments include a lock system that comprises a lock configured to couple to a door. The lock can be configured to receive electricity from a transformer that is located remotely relative to the door. The transformer can be configured to provide electrical energy to a doorbell chime. The lock system can comprise an outer housing. The lock system can also include a bolt configured to protrude from the outer housing and past a face plate to secure the door by entering a hole in a door frame. The bolt can be a metal protrusion that slides in and out of the lock. The bolt comprises a throw distance, which can be measured as the projection of the bolt from the edge of the door. For example, in some embodiments, a bolt can extend between zero and four centimeters from a face plate. Some locks include an electrical control system configured to adjust the throw distance. For example, the electrical control system can cause the bolt to extend and retract relative to the face plate. A remote computing device can control the electrical control system of the lock. Example remote computing devices include cellular phones, smartphones, laptops, tablets, desktop computers, and other computing devices capable of data input (e.g., cars with computer displays and watches capable of wireless communication).

In some embodiments, locks need electricity. A power receiver can enable a lock to receive electrical power wirelessly or via wires. The power receiver can be integrated into at least a portion of the lock.

In several embodiments, the lock system comprises a power receiver coupled to the face plate and/or to a side of the door that faces the door frame. The power receiver can be configured to receive the electricity from a power transmitter. The power transmitter can be coupled to a strike plate and/or to a door frame.

In addition to transmitting electricity between the power transmitter and the power receiver, the lock system can communicate via the power receiver and the power transmitter. In some embodiments, the lock includes a wireless data transmitter (e.g., for Wi-Fi or Bluetooth communication).

The strike plate can be configured to be coupled to the door frame. The power transmitter can be configured to receive the electricity from the transformer. The power receiver can be electrically coupled to the electrical control system such that the power receiver is configured to provide the electricity to the electrical control system such that the electrical control system is capable of operating the bolt. The electrical control system can govern the position of a solenoid that is mechanically coupled to the bolt such that the solenoid can move the bolt to locked and unlocked positions.

In several embodiments, the power receiver is a wireless power receiver and the power transmitter is a wireless power transmitter. The power receiver can comprise an induction receiver configured to receive the electricity from an induction transmitter that can be coupled to the strike plate. The induction receiver can comprise a first induction coil and the induction transmitter can comprise a second induction coil. Some embodiments transmit the electricity wirelessly via inductive charging and/or magnetic resonance.

In some embodiments, the lock system further comprises a solenoid coupled to the outer housing. The solenoid can be configured to control the throw distance of the bolt (e.g., by pushing the bolt in and out of the face plate). The solenoid can push the bolt into a hole in the strike plate. The solenoid can pull the bolt out of the hole in the strike plate. A spring can be arranged to act against the force generated by the solenoid. A spring can be arranged and configured to apply a force on the bolt that pushes the bolt outward relative to the face plate such that the lock is configured to remain in a locked configuration when the solenoid receives insufficient electrical power to overcome the force.

In several embodiments, the solenoid is electrically coupled to the electrical control system and the power receiver such that the lock system is capable of providing the electricity from the transformer to the power receiver that is coupled to the face plate, and then the power receiver is capable of providing the electricity to the solenoid.

In some embodiments, the lock system comprises a keyhole configured to enable a key to adjust the throw distance to unlock the lock. For example, the key can cause the bolt to slide in and out of the lock. The solenoid can be located between the keyhole and the power receiver of the face plate. The solenoid can be electrically coupled to the power receiver of the face plate such that the solenoid is configured to receive the electricity from the transformer.

Some lock embodiments include elements from security systems described in applications incorporated herein by reference. The embodiments described herein can be combined with the security system embodiments incorporated by reference. The remote computing devices described in embodiments incorporated by reference can be used with the lock embodiments described herein. Additional embodiments can be formulated by replacing the security systems described in applications incorporated by reference with lock embodiments described herein.

Locks can use the cameras, speakers, microphones, and doorbell buttons described in embodiments incorporated by reference. In several embodiments, a camera can be coupled to the outer housing of the lock. The camera can be configured to face outward from the door. A speaker and a microphone can be coupled to the outer housing. The camera can be configured to take a picture of a visitor to the lock. For example, the lock can detect when a visitor approaches the lock. The lock can take a picture of the visitor in response to detecting the visitor. The speaker can be configured to enable communication with a user of a remote computing device. For example, the speaker can emit sounds from a user of the remote computing device to enable the visitor to hear the user of the remote computing device. The microphone can be configured to record sounds from the visitor for transmission to the remote computing device. For example, the microphone can record the visitor speaking to enable the user to hear the visitor.

In several embodiments, the lock can include a wireless data transmission system configured to receive lock commands from the remote computing device and configured to wirelessly transmit the picture and the sounds to the remote computing device. The wireless data transmission system can use Wi-Fi, Bluetooth, and/or radiofrequency means of communication.

In some embodiments, a lock system comprises a lock configured to couple to a door (e.g., to hinder unauthorized entry). The lock can be configured to receive electricity from a transformer that is located remotely relative to the door. The transformer can be configured to provide electrical energy to a doorbell chime. The lock system can comprise a lock that has an outer housing, an electrical control system, a face plate, and a bolt. The bolt and the face plate can be coupled to the outer housing such that the bolt is arranged and configured to protrude from the outer housing and past the face plate to secure the door by entering a first hole in a door frame. The bolt can comprise a throw distance. The electrical control system can be configured to adjust the throw distance. The electrical control system can be located within the outer housing of the lock. The outer housing can be at least partially embedded within the door while the door is coupled to the building. The outer housing can include a first side that faces outside and a second side the faces inside the building. The first side can include a keyhole, a camera, a microphone, and/or a speaker. The second side can include a lever capable of adjusting the throw distance.

In some embodiments, the lock system comprises a power receiver coupled to the face plate of the lock. The power receiver can be electrically coupled to the electrical control system of the lock. The lock system can include a strike plate configured to be coupled to the door frame. The strike plate can face towards the face plate such that the bolt protrudes from the face plate and past the strike plate.

In several embodiments, the lock system includes a power transmitter coupled to the strike plate. The power transmitter can be integrated into the strike plate. (The power receiver can also be integrated into the face plate.) The power transmitter can be configured to be electrically coupled to the transformer to receive the electricity from the transformer while the transformer is electrically coupled to a power source of a building and while the transformer is electrically coupled to the doorbell chime. The power transmitter can be placed in sufficient proximity relative to the power receiver such that the power transmitter is capable of receiving the electricity from the transformer and then transmitting the electricity to the power receiver. If the power transmitter is not placed within sufficient proximity relative to the power receiver, then the power transmitter is not capable of transmitting the electricity to the power receiver. In some embodiments, sufficient proximity is within 30 centimeters, within 15 centimeters, and/or within 5 centimeters. The power transmitter can also be aligned with the power receiver. The power transmitter is aligned with the power receiver when the power transmitter is capable of transmitting the electricity to the power receiver.

In some embodiments, the power receiver is configured to transmit electricity to the power transmitter. Thus, the power receiver can also be a power transmitter, and the power transmitter can also be a power receiver.

In several embodiments, the power transmitter of the strike plate is electrically coupled to the power receiver of the face plate to enable the lock to receive the electricity from the transformer. Electrical coupling can be achieve wirelessly (e.g., via induction) and/or via conductive wires.

In some embodiments, the power transmitter is located within 20 centimeters and/or within 10 centimeters of the power receiver. The power transmitter can be inductively coupled with the power receiver such that the power transmitter is configured to inductively transmit the electricity to the power receiver of the face plate via electrical induction. The power transmitter can comprise a first induction conductor. The power receiver can comprise a second induction conductor. The first induction conductor can located within 10 centimeters and/or within 4 centimeters of the second induction conductor.

The first induction conductor can comprise a first induction coil. The second induction conductor can comprise a second induction coil. The face plate can be aligned with the strike plate such that the first induction coil can be inductively coupled with the second induction coil. Alignment is achieved when the first induction coil can be inductively coupled with the second induction coil. Alignment does not necessary require the face plate and the strike plate to be oriented parallel to each other. The face plate and the strike plate can be offset from each other and still be in alignment if the first induction coil can be inductively coupled with the second induction coil. Thus, alignment can be judged by inductive capability.

Some embodiments include removing a doorbell from a wall to gain access to wires that were attached to the doorbell. These wires can be coupled to the transformer and the chime. These wires can be used to provide electricity to the lock (e.g., via a strike-plate power-transmission assembly).

Some embodiments include a junction assembly (e.g., that can take the place of the removed doorbell). In some embodiments, the junction assembly is used while the doorbell is used. A first wire and a second wire can be electrically coupled to the transformer. A third wire and a fourth wire can be electrically coupled to the power transmitter. The junction assembly can electrically couple the first wire to the third wire. The junction assembly can electrically couple the second wire to the fourth wire. A doorbell can be mechanically coupled and/or electrically coupled to the junction assembly.

In several embodiments, a strike plate is coupled to the door frame and a face plate is coupled to a side of the door such that the strike plate faces towards the face plate. The side of the door to which the face plate is coupled can be opposite the side of the door to which hinges are attached. The power transmitter can comprise a first induction coil. The power receiver can comprise a second induction coil. The face plate can be oriented relative to the strike plate such that the first induction coil is capable of being inductively coupled with the second induction coil. The second induction coil can be oriented at an angle relative to the first induction coil. The angle can be less than 30 degrees and/or less than 20 degrees. The second wire can be electrically coupled to the transformer via the chime. The second wire can be electrically coupled to the transformer and the chime. The first wire and the second wire can be electrically coupled to the transformer while the transformer is located inside of the building. The first wire and the second wire can protrude into a second hole that leads to an area outside of the building. The second hole can be the hole in which wires for a doorbell are located (to enable installing a doorbell on an exterior wall of the building).

The electrical control system can be communicatively coupled to the power transmitter (e.g., such that the electrical control system is capable of sending communications to the power transmitter). The power transmitter can be communicatively coupled to a network connection module that is electrically coupled to a power outlet of the building such that the network connection module is configured to transmit data to the lock. More information regarding communicating via power lines is incorporated by reference from U.S. Provisional Patent Application No. 62/026,639.

The disclosure also includes a method of operating a door lock system coupled to a building. The door lock system can include a door lock movable between a locked state and an unlocked state. Methods can include detecting a first indication suggestive of a presence of a visitor, detecting a second indication suggestive of an identity of the visitor, and validating that the first indication and the second indication are associated with a first identity.

In response to determining that the first indication and the second indication are both associated with the first identity, methods can further include stationing the door lock in the unlocked state. As well, in response to determining that one of the first indication and the second indication is not associated with the first identity, methods can further include stationing the door lock in the locked state.

Methods can further include determining whether the door lock is in the locked state and stationing the door lock in the locked state in response to determining that the door lock is not in the locked state.

As well, methods can further include sending the first indication and the second indication to a remote computing device communicatively coupled to the door lock system. Furthermore, methods can include receiving an unlock command from the remote computing device and stationing the door lock in the unlocked state in response to receiving the unlock command. Even still, methods can include receiving a lock command from the remote computing device and stationing the door lock in the locked state in response to receiving the lock command.

In embodiments, the first indication can be one of a transmission from a remote computing device and a motion of the visitor. As well, in embodiments, the second indication can be one of an audible voice, a fingerprint pattern, and a retina scan.

In response to determining that the first indication and the second indication are both associated with the first identity, methods can further include determining whether the visitor associated with the first identity is one of granted unlimited access and granted partial access during a predetermined timeframe. In response to determining that the visitor is granted unlimited access, methods can also include stationing the door lock in the unlocked state. In response to determining that the visitor is granted partial access, methods can include determining whether a present time is within the predetermined timeframe. In response to determining that the present time is within the predetermined timeframe, methods can also include stationing the door lock in the unlocked state. In response to determining that the present time is not within the predetermined timeframe, methods can include stationing the door lock in the locked state.

The disclosure also includes a method of operating a door lock system coupled to a building. The door lock system can include a door lock movable between a locked state and an unlocked state. Methods can include detecting an indication suggestive of a presence of a visitor, receiving an audible message from the visitor, and determining whether the identity of the visitor substantially matches an identity of an authorized visitor who is permitted access to the building. The audible message can include an identity attribute suggestive of an identity of the visitor.

In response to determining that the identity of the visitor substantially matches the identity of the authorized visitor, methods can further include stationing the door lock in the unlocked state. As well, in response to determining that the identity of the visitor does not substantially match the identity of the authorized visitor, methods can further include stationing the door lock in the locked state.

In embodiments, determining whether the identity of the visitor substantially matches the identity of the authorized visitor includes determining whether a voice of the visitor substantially matches a voice of the authorized visitor. As well, in embodiments, determining whether the identity of the visitor substantially matches the identity of the authorized visitor comprises determining whether the audible message substantially matches a predetermined audible message.

Methods can include emitting, by a speaker of the door lock system, an audible question. Methods can also include receiving, by a microphone of the door lock system, an audible answer from the visitor. As well, methods can include determining whether the audible answer substantially matches a predetermined audible answer. Methods can even include stationing the door lock in the unlocked state in response to determining that the audible answer substantially matches the predetermined audible answer. Even still, methods can include stationing the door lock in the locked state in response to determining that the audible answer does not substantially match the predetermined audible answer.

The disclosure also includes a door lock system for securing a building door. In embodiments, the door lock system includes an outer housing and a door lock coupled to the outer housing. The door lock can move between a locked state and an unlocked state. In embodiments, the door lock system includes a visitor detection system coupled to the outer housing. The visitor detection system can comprise at least one of a camera assembly and a motion detector assembly. In embodiments, the door lock system includes a visitor communication system coupled to the outer housing. The visitor communication system can include at least one of a microphone and a speaker.

In embodiments, the door lock system includes a first indication suggestive of a presence of a visitor and a second indication suggestive of an identity of the visitor. As well, in embodiments, the door lock system validates that the first indication and the second indication are associated with a first identity.

In embodiments, the door lock system determines whether an identity of a visitor substantially matches an identity of an authorized visitor who is permitted access to a building. Even still, in embodiments, the visitor detection system includes the camera assembly and the motion detector assembly. Furthermore, in embodiments, the visitor communication system comprises the microphone and the speaker.

As well, in embodiments, the door lock system includes a remote computing device communicatively coupled to the visitor detection system and the visitor communication system. In embodiments, the door lock system includes an unlock command received by the remote computing device. The door lock system can station the door lock in the unlocked state in response to the remote computing device receiving the unlock command. Furthermore, in embodiments, the door lock system further includes a lock command received by the remote computing device. The door lock system can station the door lock in the locked state in response to the remote computing device receiving the lock command.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Figure 1:
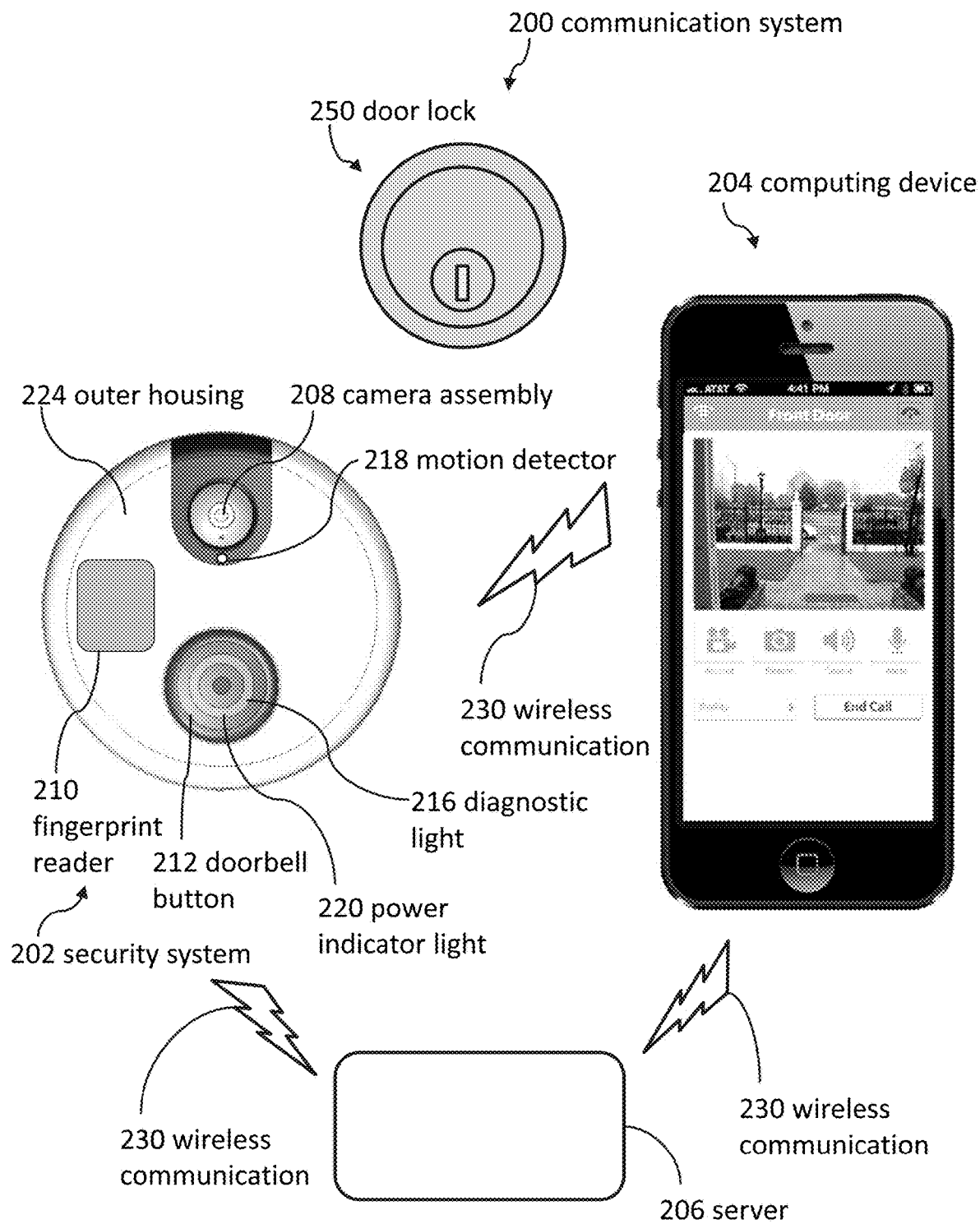
FIG. 1 illustrates a front view of a communication system, according to some embodiments.

FIG. 1 illustrates a security system 202 (e.g., a doorbell or a lock) that includes a camera assembly 208. When a visitor approaches the security system 202 (e.g., rings a doorbell 212), the security system 202 can send a wireless notification to a computing device 204 that is located remotely relative to the security system 202. For example, the owner of the building to which the security system is attached can receive the wireless notification when the owner is away from the building.

The owner (i.e., the user) can verify the identity of the visitor as explained in more detail below. For example, the owner can see the visitor on the computing device 204. Once the owner has verified the identity of the visitor, the owner can grant the visitor access to the building (e.g., by unlocking the door lock 250 to let the visitor inside the building). The security system 202 can be configured such that it can unlock the door lock 250. In some embodiments, the security system 202 wirelessly controls the door lock 250.

The door lock 250 can include a deadbolt or other locking mechanism that locks and unlocks a door in response to remote commands. For example, the security system 202 can notify the door lock 250 to lock and unlock the door. The door lock 250 can be controlled by a remote computing device 204 (e.g., a smartphone). Example door locks 250 include Lockitron made by Apigy Inc., the August Smart Lock made by Yves Behar and Jason Johnson, electronic locks made by Schlage (an Allegion company), and the Kevo lock made by Kwikset (a division of Spectrum Brands Holdings).

In some embodiments, the security system 202 takes a picture when the door lock 250 is unlocked and/or locked to document the identity of the person unlocking and/or locking the door. The user can record a picture of the visitor for security purposes.

Electronic door locks (e.g., door lock 250) typically require electricity from batteries. When the batteries run out of power, the user can be locked out of a building. Various embodiments described herein reduce occurrences of people being locked out of buildings due to electronic door locks running out of electrical power.

In some embodiments, a doorbell is attached to a wall of a building (e.g., next to a door). The lock can be attached to the door. The doorbell can be configured to receive electricity from the building. Then, the doorbell can provide electricity to the door lock via various connection systems and methods.

In several embodiments, the door lock and/or the doorbell detects that the door lock's electrical power has fallen below a predetermined threshold. The doorbell can then send a low-power notification to a remote computing device.

System Embodiments

Communication systems can provide a secure and convenient way for a remotely located individual to communicate with a person who is approaching a sensor, such as a proximity sensor or motion sensor, or with a person who rings a doorbell, which can be located in a doorway, near an entrance, or within 15 feet of a door. Some communication systems allow an individual to hear, see, and talk with visitors who approach at least a portion of the communication system and/or press a button, such as a doorbell's button. For example, communication systems can use a computing device to enable a remotely located person to see, hear, and/or talk with visitors. Computing devices can include computers, laptops, tablets, mobile devices, smartphones, cellular phones, and wireless devices (e.g., cars with wireless communication). Example computing devices include the iPhone, iPad, iMac, MacBook Air, and MacBook Pro made by Apple Inc. Communication between a remotely located person and a visitor can occur via the Internet, cellular networks, telecommunication networks, and wireless networks.

Referring now to FIG. 1, communication systems can be a portion of a smart home hub. In some embodiments, the communication system 200 forms the core of the smart home hub. For example, the various systems described herein enable complete home automation. In some embodiments, the security system 202 controls various electrical items in a home (e.g., lights, air conditioners, heaters, motion sensors, garage door openers, locks, televisions, computers, entertainment systems, pool monitors, elderly monitors). In some embodiments, the computing device 204 controls the security system 202 and other electrical items in a home (e.g., lights, air conditioners, heaters, motion sensors, garage door openers, locks, televisions, computers, entertainment systems, pool monitors, elderly monitors).

FIG. 1 illustrates a front view of a communication system embodiment. The communication system 200 can include a security system 202 (e.g., a doorbell that has a camera) and a computing device 204. Although the illustrated security system 202 includes many components in one housing, several security system embodiments include components in separate housings. The security system 202 can include a camera assembly 208 and a doorbell button 212. The camera assembly 208 can be a video camera, which in some embodiments is a webcam.

The security system 202 can include a diagnostic light 216 and a power indicator light 220. In some embodiments, the diagnostic light 216 is a first color (e.g., blue) if the security system 202 and/or the communication system 200 is connected to a wireless Internet network and is a second color (e.g., red) if the security system 202 and/or the communication system 200 is not connected to a wireless Internet network. In some embodiments, the power indicator 220 is a first color if the security system 202 is connected to a power source. The power source can be power supplied by the building to which the security system 202 is attached. In some embodiments, the power indicator 220 is a second color or does not emit light if the security system 202 is not connected to the power source.

The security system 202 (e.g., a doorbell) can include an outer housing 224, which can be water resistant and/or waterproof. The outer housing can be made from metal or plastic, such as molded plastic with a hardness of 60 Shore D. In some embodiments, the outer housing 224 is made from brushed nickel or aluminum.

Rubber seals can be used to make the outer housing 224 water resistant or waterproof. The security system 202 can be electrically coupled to a power source, such as wires electrically connected to a building's electrical power system. In some embodiments, the security system 202 includes a battery for backup and/or primary power.

Wireless communication 230 can enable the security system 202 (e.g., a doorbell) to communicate with the computing device 204. Some embodiments enable communication via cellular and/or Wi-Fi networks. Some embodiments enable communication via the Internet. Several embodiments enable wired communication between the security system 202 and the computing device 204. The wireless communication 230 can include the following communication means: radio, Wi-Fi (e.g., wireless local area network), cellular, Internet, Bluetooth, telecommunication, electromagnetic, infrared, light, sonic, and microwave. Other communication means are used by some embodiments. In some embodiments, such as embodiments that include telecommunication or cellular communication means, the security system 202 can initiate voice calls or send text messages to a computing device 204 (e.g., a smartphone, a desktop computer, a tablet computer, a laptop computer).

Several embodiments use near field communication (NFC) to communicate between the computing device 204 and the security system 202; between the security system 202 and the door lock 250; and/or between the computing device 204 and the door lock 250. The security system 202, the computing device 204, and/or the door lock 250 can include a NFC tag. Some NFC technologies include Bluetooth, radio-frequency identification, and QR codes.

Several embodiments include wireless charging (e.g., near field charging, inductive charging) to supply power to and/or from the security system 202, the door lock 250, and/or the computing device 204. Some embodiments use inductive charging (e.g., using an electromagnetic field to transfer energy between two objects).

Some embodiments include computer software (e.g., application software), which can be a mobile application designed to run on smartphones, tablet computers, and other mobile devices. Software of this nature is sometimes referred to as "app" software. Some embodiments include software designed to run on desktop computers and laptop computers.

The computing device 204 can run software with a graphical user interface. The user interface can include icons or buttons. In some embodiments, the software is configured for use with a touch-screen computing device such as a smartphone or tablet.

Figure 2:
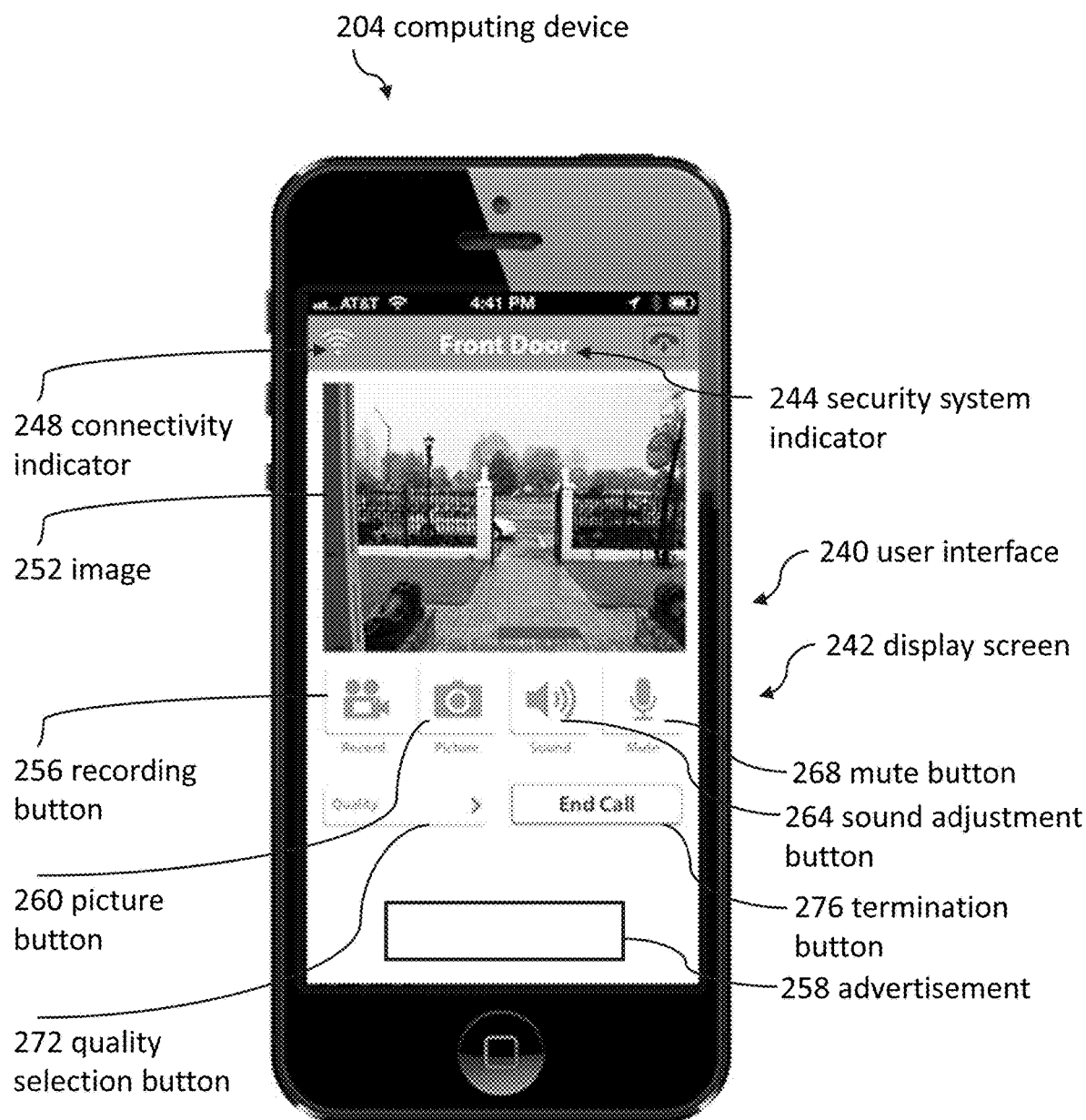
FIG. 2 illustrates a computing device running software, according to some embodiments.

FIG. 2 illustrates a computing device 204 running software. The software includes a user interface 240 displayed on a display screen 242. The user interface 240 can include a security system indicator 244, which can indicate the location of the security system that the user interface is displaying. For example, a person can use one computing device 204 to control and/or interact with multiple security systems, such as one security system located at a front door and another security system located at a back door. Selecting the security system indicator 244 can allow the user to choose another security system (e.g., the back door security system rather than the front door security system).

The user interface 240 can include a connectivity indicator 248. In some embodiments, the connectivity indicator can indicate whether the computing device is in communication with a security system, the Internet, and/or a cellular network. The connectivity indicator 248 can alert the user if the computing device 204 has lost its connection with the security system 202; the security system 202 has been damaged; the security system 202 has been stolen; the security system 202 has been removed from its mounting location; the security system 202 has lost electrical power; and/or if the computing device 204 cannot communicate with the security system 202. In some embodiments, the connectivity indicator 248 alerts the user of the computing device 204 by flashing, emitting a sound, displaying a message, and/or displaying a symbol.

In some embodiments, if the security system 202 loses power, loses connectivity to the computing device 204, loses connectivity to the Internet, and/or loses connectivity to a remote server, a remote server 206 sends an alert (e.g., phone call, text message, image on the user interface 240) regarding the power and/or connectivity issue. In several embodiments, the remote server 206 can manage communication between the security system 202 and the computing device. In some embodiments, information from the security system 202 is stored by the remote server 206. In several embodiments, information from the security system 202 is stored by the remote server 206 until the information can be sent to the computing device 204, uploaded to the computing device 204, and/or displayed to the remotely located person via the computing device 204. The remote server 206 can be a computing device that stores information from the security system 202 and/or from the computing device 204. In some embodiments, the remote server 206 is located in a data center.

In some embodiments, the computing device 204 and/or the remote server 206 attempts to communicate with the security system 202. If the computing device 204 and/or the remote server 206 is unable to communicate with the security system 202, the computing device 204 and/or the remote server 206 alerts the remotely located person via the software, phone, text, a displayed message, and/or a website. In some embodiments, the computing device 204 and/or the remote server 206 attempts to communicate with the security system 202 periodically; at least every five hours and/or less frequently than every 10 minutes; at least every 24 hours and/or less frequently than every 60 minutes; or at least every hour and/or less frequently than every second.

In some embodiments, the server 206 can initiate communication to the computer device 204 and/or to the security system 202. In several embodiments, the server 206 can initiate, control, and/or block communication between the computing device 204 and the security system 202.

In several embodiments, a user can log in to an "app," website, and/or software on a computing device (e.g., mobile computing device, smartphone, tablet, desktop computer) to adjust the security system settings discussed herein.

In some embodiments, a computing device can enable a user to watch live video and/or hear live audio from a security system due to the user's request rather than due to actions of a visitor. Some embodiments include a computing device initiating a live video feed (or a video feed that is less than five minutes old).

In some embodiments, the user interface 240 displays an image 252 such as a still image or a video of an area near and/or in front of the security system 202. The image 252 can be taken by the camera assembly 208 and stored by the security system 202, server 206, and/or computing device 204. The user interface 240 can include a recording button 256 to enable a user to record images, videos, and/or sound from the camera assembly 208, microphone of the security system 202, and/or microphone of the computing device 204.

In several embodiments, the user interface 240 includes a picture button 260 to allow the user to take still pictures and/or videos of the area near and/or in front of the security system 202. The user interface 240 can also include a sound adjustment button 264 and a mute button 268. The user interface 240 can include camera manipulation buttons such as zoom, pan, and light adjustment buttons. In some embodiments, the camera assembly 208 automatically adjusts between Day Mode and Night Mode. Some embodiments include an infrared camera and/or infrared lights to illuminate an area near the security system 202 to enable the camera assembly 208 to provide sufficient visibility (even at night).

In some embodiments, buttons include diverse means of selecting various options, features, and functions. Buttons can be selected by mouse clicks, keyboard commands, and/or touching a touch screen. Many embodiments include buttons that can be selected without touch screens.

In some embodiments, the user interface 240 includes a quality selection button, which can allow a user to select the quality and/or amount of data transmitted from the security system 202 to the computing device 204 and/or from the computing device 204 to the security system 202.

In some embodiments, video can be sent to and/or received from the computing device 204 using video chat protocols such as FaceTime (by Apple Inc.) or Skype (by Microsoft Corporation). In some embodiments, these videos are played by videoconferencing apps on the computing device 204 instead of being played by the user interface 240.

The user interface 240 can include a termination button 276 to end communication between the security system 202 and the computing device 204. In some embodiments, the termination button 276 ends the ability of the person located near the security system 202 (i.e., the visitor) to hear and/or see the user of the computing device 204, but does not end the ability of the user of the computing device 204 to hear and/or see the person located near the security system 202.

In some embodiments, a button 276 is both an answer button (to accept a communication request from a visitor) and is termination button (to end communication between the security system 202 and the computing device 204). The button 276 can include the word "Answer" when the system is attempting to establish two-way communication between the visitor and the user. Selecting the button 276 when the system is attempting to establish two-way communication between the visitor and the user can start two-way communication. The button 276 can include the words "End Call" during two-way communication between the visitor and the user. Selecting the button 276 during two-way communication between the visitor and the user can terminate two-way communication. In some embodiments, terminating two-way communication still enables the user to see and hear the visitor. In some embodiments, terminating two-way communication causes the computing device 204 to stop showing video from the security system and to stop emitting sounds recorded by the security system.

In some embodiments, the user interface 240 opens as soon as the security system detects a visitor (e.g., senses indications of a visitor). Once the user interface 240 opens, the user can see and/or hear the visitor even before "answering" or otherwise accepting two-way communication, in several embodiments.

Some method embodiments include detecting a visitor with a security system. The methods can include causing the user interface to display on a remote computing device 204 due to the detection of the visitor (e.g., with or without user interaction). The methods can include displaying video from the security system and/or audio from the security system before the user accepts two-way communication with the visitor. The methods can include displaying video from the security system and/or audio from the security system before the user accepts the visitor's communication request. The methods can include the computing device simultaneously asking the user if the user wants to accept (e.g., answer) the communication request and displaying audio and/or video of the visitor. For example, in some embodiments, the user can see and hear the visitor via the security system before opening a means of two-way communication with the visitor.

In some embodiments, the software includes means to start the video feed on demand. For example, a user of the computing device might wonder what is happening near the security system 202. The user can open the software application on the computing device 204 and instruct the application to show live video and/or audio from the security device 202 even if no event near the security system 202 has triggered the communication.

In several embodiments, the security device 202 can be configured to record when the security device 202 detects movement and/or the presence of a person. The user of the computing device 204 can later review all video and/or audio records when the security device 202 detected movement and/or the presence of a person.

Referring now to FIG. 1, in some embodiments, the server 206 controls communication between the computing device 204 and the security system 202, which can be a doorbell with a camera, a microphone, and a speaker. In several embodiments, the server 206 does not control communication between the computing device 204 and the security system 202.

In some embodiments, data captured by the security system and/or the computing device 204 (such as videos, pictures, and audio) is stored by another remote device such as the server 206. Cloud storage, enterprise storage, and/or networked enterprise storage can be used to store video, pictures, and/or audio from the communication system 200 or from any part of the communication system 200. The user can download and/or stream stored data and/or storage video, pictures, and/or audio. For example, a user can record visitors for a year and then later can review conversations with visitors from the last year. In some embodiments, remote storage, the server 206, the computing device 204, and/or the security system 202 can store information and statistics regarding visitors and usage.

Figure 3:
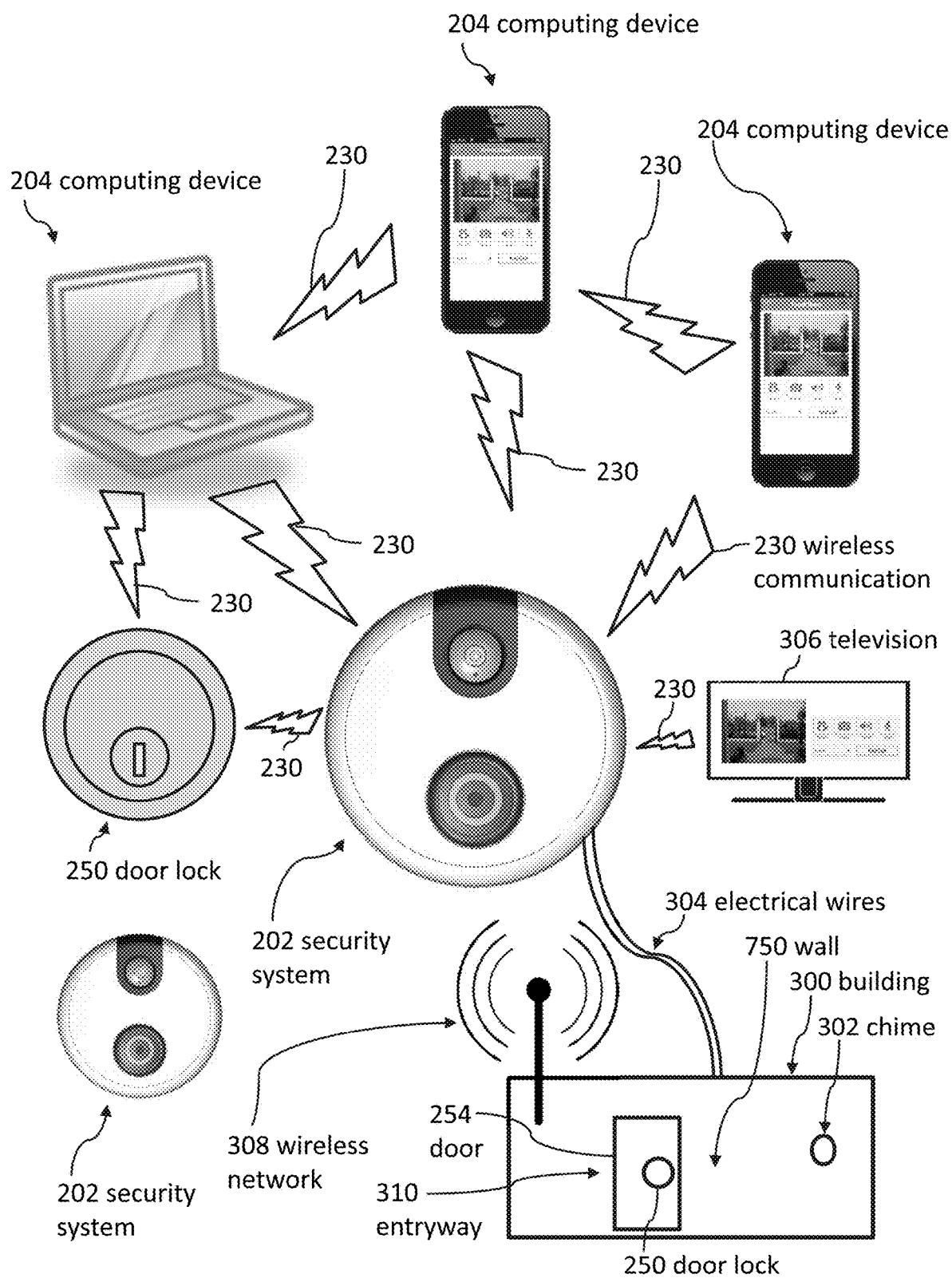
FIG. 3 illustrates an embodiment in which a security system is connected to a building, according to some embodiments.

FIG. 3 illustrates an embodiment in which a security system 202 is connected to a building 300, which can include an entryway 310 that has a door 254. A door lock 250 can be configured to lock and unlock the door 254. Electrical wires 304 can electrically couple the security system 202 to the electrical system of the building 300 such that the security system 202 can receive electrical power from the building 300.

A wireless network 308 can allow devices to wirelessly access the Internet. The security system 202 can access the Internet via the wireless network 308. The wireless network 308 can transmit data from the security system 202 to the Internet, which can transmit the data to remotely located computing devices 204. The Internet and wireless networks can transmit data from remotely located computing devices 204 to the security system 202. In some embodiments, a security system 202 connects to a home's Wi-Fi.

As illustrated in FIG. 3, one computing device 204 (e.g., a laptop, a smartphone, a mobile computing device, a television) can communicate with multiple security systems 202. In some embodiments, multiple computing devices 204 can communicate with one security system 202.

In some embodiments, the security system 202 can communicate (e.g., wirelessly 230) with a television 306, which can be a smart television. Users can view the television 306 to see a visitor and/or talk with the visitor.

Door Lock Charging Embodiments

Figure 4:
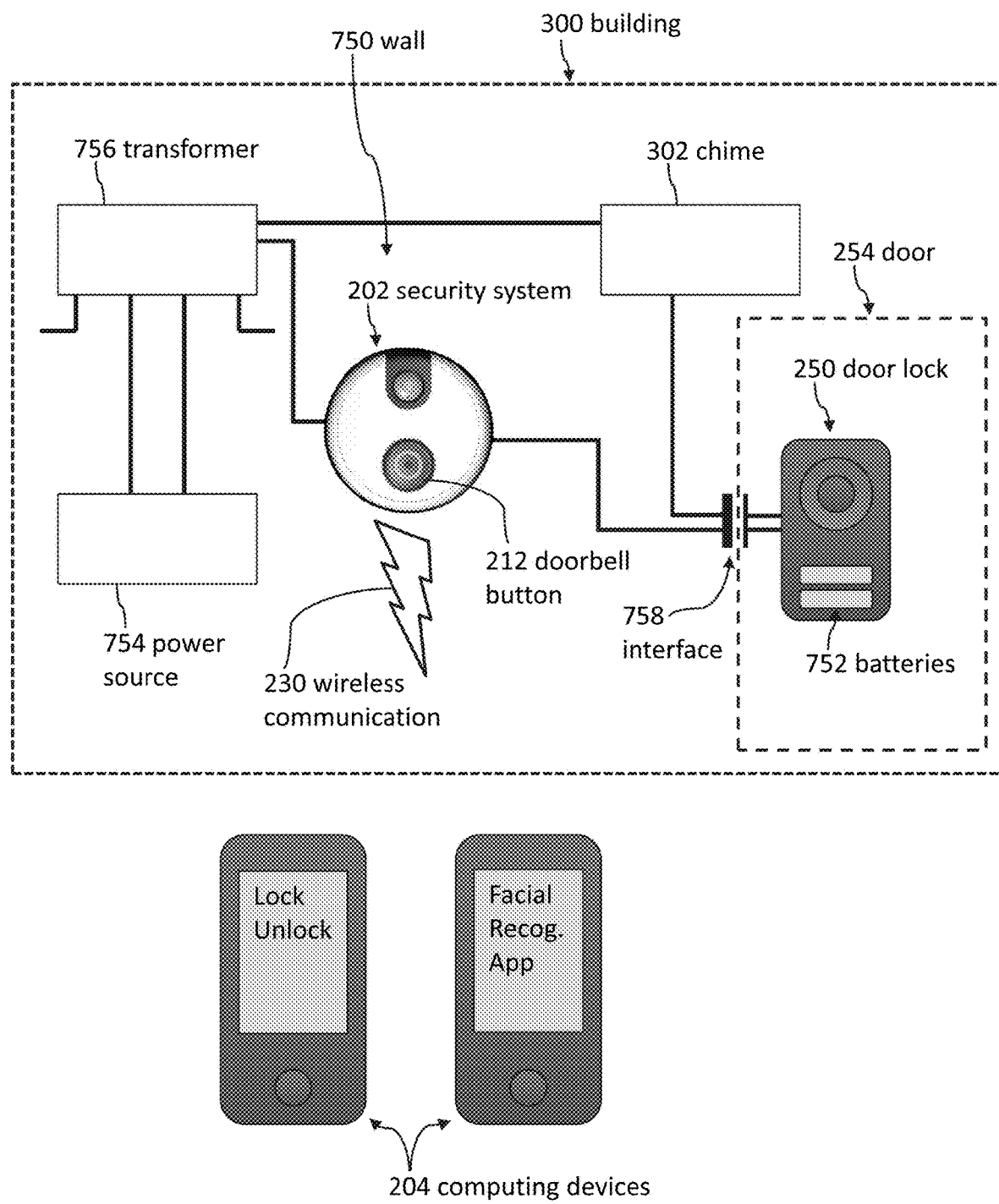
FIGS. 4-7 illustrate diagrammatic views of security systems providing electricity to a door lock, according to some embodiments.

Referring now to FIGS. 3 and 4, in some embodiments, a doorbell (e.g., a security system 202) is attached to a wall 750 of a building 300 (e.g., the doorbell is not attached to a door). The lock 250 can be attached to the door 254. The doorbell can be configured to receive electricity from the building 300 through electrical wires 304. Then, the doorbell can provide electricity to the door lock 250 via various connection systems and methods.

FIG. 4 illustrates a diagrammatic view of a security system 202 providing electricity to a door lock 250. The door lock 250 can include batteries 752. The electricity from the security system 202 (e.g., a doorbell) can charge the batteries 752 of the door lock 250.

The building 300 can be electrically coupled to a power source 754. In some embodiments, the power source 754 provides 110 volts, 120 volts, or 220 volts (plus or minus 20 volts). The power source can be electrically coupled to a transformer 756 to convert the electricity from the power source 754 to have more suitable characteristics for the security system 202 and/or for a chime 302. In some embodiments, the transformer 756 has an output of 16 volts (plus or minus 5 volts). Pressing a doorbell button 212 (labeled in FIG. 1) of the security system 202 can cause the chime 302 to emit a notification sound (e.g., a "ringing" sound).

The chime 302 can be a mechanical chime configured to emit a doorbell ringing sound. The chime 302 can also comprise a speaker attached to a wall inside of the building 300. The speaker can be configured to emit a sound to notify people inside of the building 300 that the security system 202 has detected a visitor.

The security system 202 can be electrically coupled to the chime 302 and to the transformer 756. The chime 302 can be electrically coupled to the security system 202 and to the transformer 756.

The security system 202 can wirelessly communicate 230 with remote computing devices 204 located outside of the building 300. The remote computing device 204 can control the door lock 250 (e.g., directly or via the security system 202). The computing device 204 can lock or unlock the door lock 250. The remote computing device can also run facial recognition software (e.g., an "app").

An interface 758 can enable the security system 202 to charge the door lock 250 (e.g., via electrical coupling and/or via wireless energy transmission). The interface 758 can enable near field charging from the security system 202 to the door lock 250. Some wireless energy transmission embodiments use direct induction followed by resonant magnetic induction. Several wireless energy transmission embodiments use electromagnetic radiation.

Figure 6:
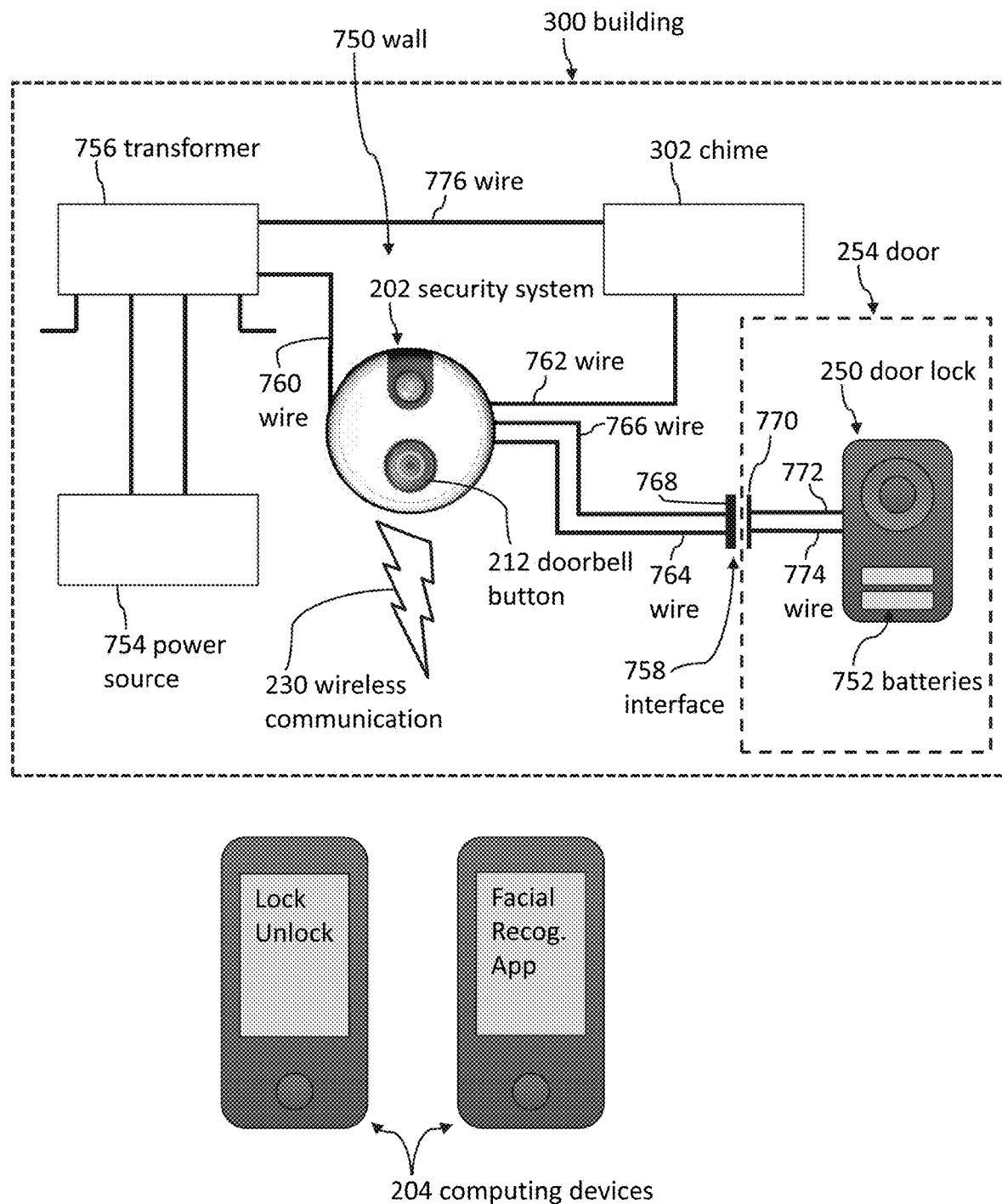

Referring now to FIG. 6, in some embodiments, the interface 758 includes a first side 768 that is electrically coupled to the security system 202 (e.g., by two wires 764, 766). The interface 758 can also include a second side 770 that is electrically coupled to the door lock 250. The first side 768 can include a conductor and the second side 770 can include a conductor. The two conductors can be mutual-inductively coupled or magnetically coupled by configuring the conductors such that change in current flow through one conductor induces a voltage across the ends of the other conductor (through electromagnetic induction). Interface 758 embodiments can include sufficient mutual inductance to enable electricity from the power source 754 to provide power to the door lock 250 and/or charge the batteries 752 (e.g., via the security system 202).

The interface 758 can enable the security system 202 to communicate with the door lock 250. The interface 758 can enable near field communication between the security system 202 and the door lock 250. In some embodiments, the interface 758 comprises a NFC system.

Several embodiments use near field communication (NFC) to communicate between the door lock 250 and the security system 202; between the computing device 204 and the door lock 250; and between the computing device 204 and the security system 202. The security system 202, the computing device 204, and/or the door lock 250 can include a NFC tag. Some NFC technologies include Bluetooth, radio-frequency identification (RFID), and QR codes.

Figure 5:
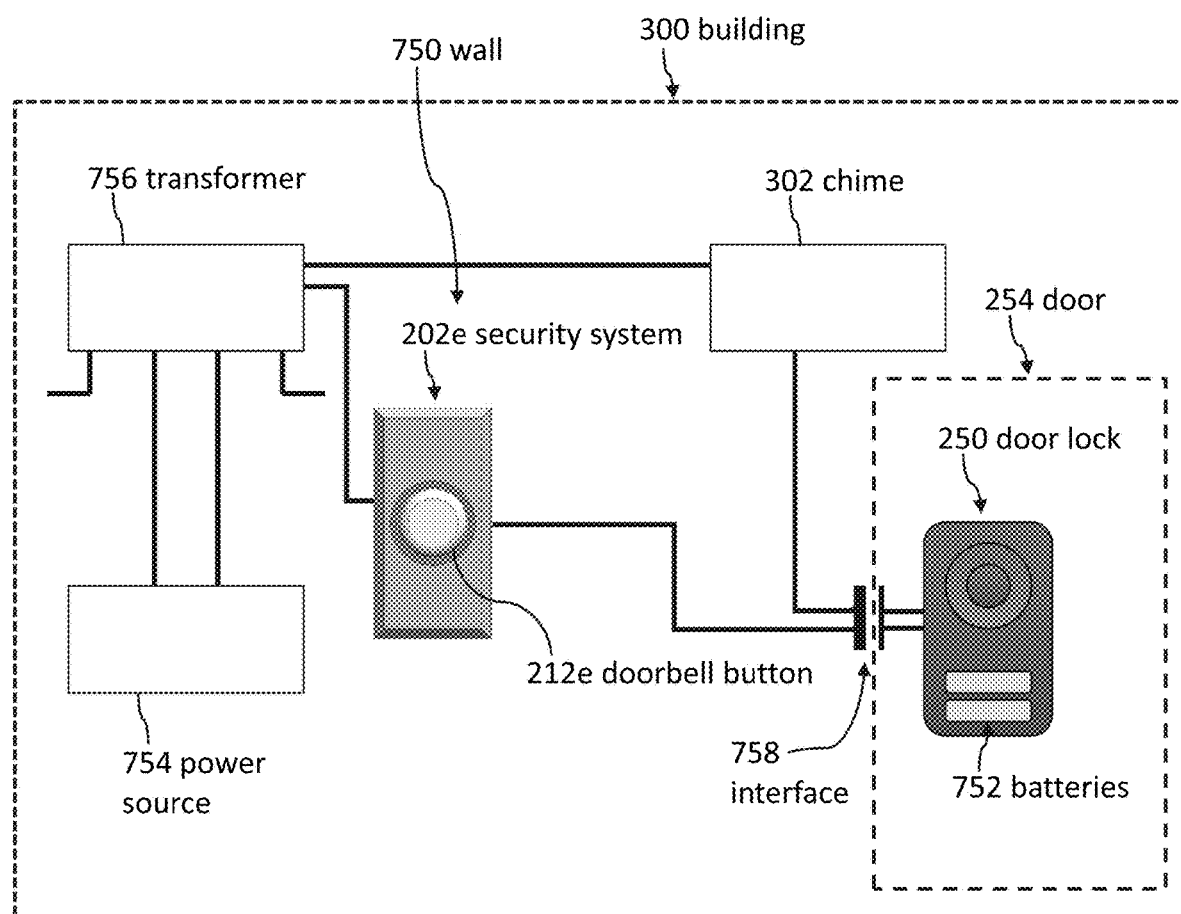

FIG. 5 illustrates a security system 202e that is simpler than the security system 202 illustrated in FIG. 4. The security system 202e has a normally open switch. Pressing the doorbell button 212e closes the switch to make the chime 302 emit a notification sound. The security system 202e can be used with the interface 758 to charge the door lock 250.

FIG. 6 illustrates a wiring embodiment that can be used with any of the embodiments. A first wire 760 electrically couples the transformer 756 to the security system 202 (which has a doorbell button 212). A second wire 762 electrically couples the security system 202 and the chime 302.

The first wire 760 and the second wire 762 can exit a hole in the wall 750 of the building 300. Some methods include decoupling a doorbell from the first wire 760 and the second wire 762, and then coupling the first wire 760 and the second wire 762 to the security system 202 (e.g., to provide electricity from the power source 754 to the security system 202).

A third wire 764 and a fourth wire 766 can electrically couple the security system 202 to a first side 768 of the interface 758. Wires 772, 774 can electrically couple the door lock 250 to the second side 770 of the interface 758. The first side 768 and the second side 770 can enable wireless electrical energy transmission from the security system 202 to the door lock 250 via the interface 758.

A fifth wire 776 can electrically couple the chime 302 to the transformer 756. Pressing the doorbell button 212 can cause the security system 202 to close the circuit from the transformer 756 to the chime 302 (e.g., to "ring" the chime).

The security system 202 can drain electricity through a wire 762 to the chime 302. The drained electricity can be below a threshold that causes the chime 302 to emit a notification sound (e.g., a "ring"). In this way, the security system 202 can receive electricity from the transformer 756 to charge the door lock 250 even when the security system 202 is not causing the chime 302 to emit a notification sound.

Figure 7:
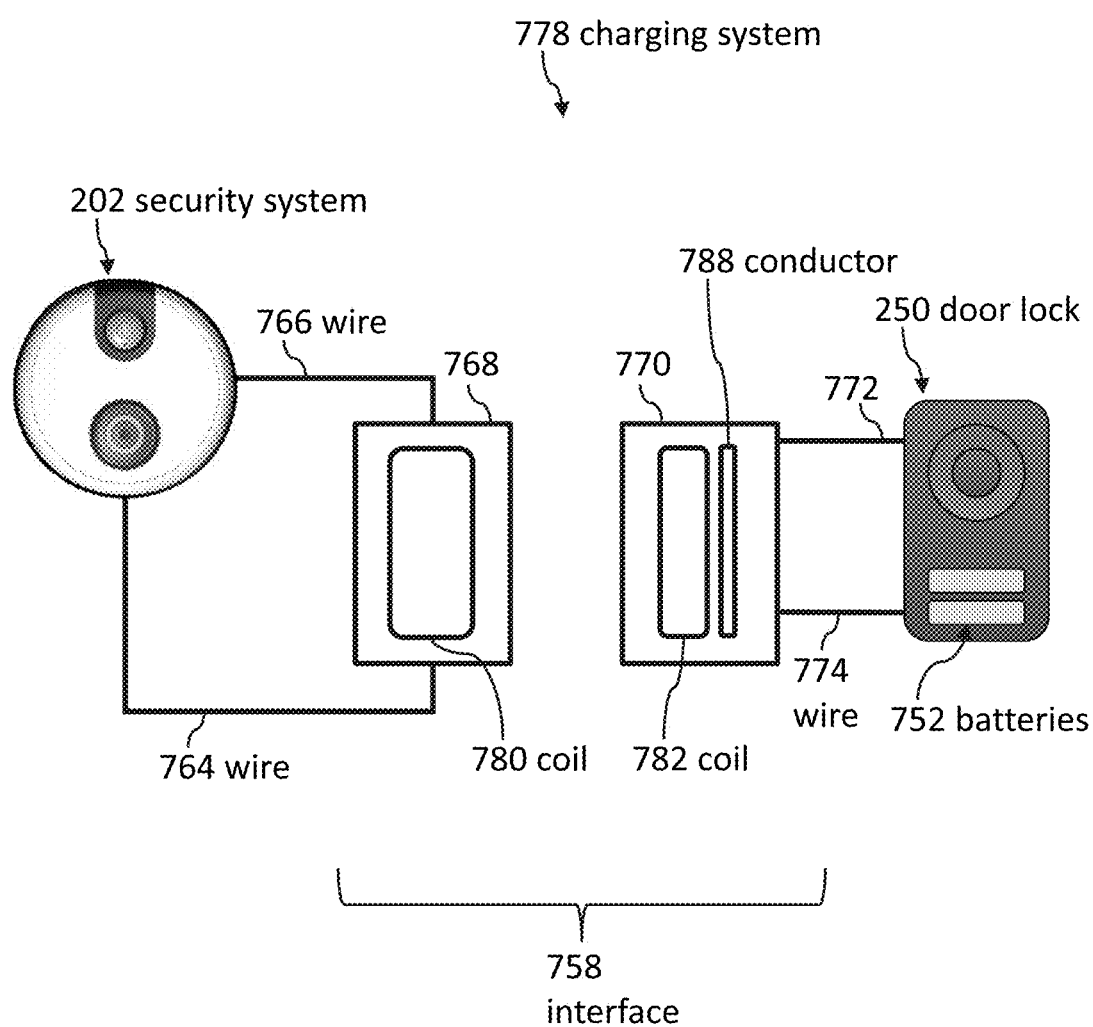

FIG. 7 illustrates a diagrammatic view of a charging system 778, which can include the interface 758. Many variations of the interface 758 are possible. The interface 758 can include a first side 768 that is electrically coupled and/or mechanically coupled to the security system 202. The interface 758 can also include a second side 770 that is electrically coupled and/or mechanically coupled to the door lock 250.

The interface 758 can comprise or be part of an induction charging system 778. The first side 768 can comprise a first induction coil 780. The induction charging system 778 can use the first induction coil 780 to create an alternating electromagnetic field from the first side 768.

The second side 770 can comprise a second induction coil 782 that gains power from the electromagnetic field generated using the first induction coil 780. The second side 770 and/or the door lock 250 can convert the power from the electromagnetic field into electrical current to charge the batteries 752. (Current can flow through the second induction coil 782 due to the magnetic flux caused by the first induction coil 780.) The first induction coil 780 and the second induction coil 782 form an electrical transformer to wirelessly charge the door lock 250.

In some embodiments, the second side 770 includes a second induction conductor 788 configured to perform the functions described herein regarding the second conduction coil 782. The second induction conductor 788 can comprise a metal portion, which can be straight.

The second side 770 can be integrated into a side of the door 254 (shown in FIG. 6). For example, the second side 770 can be coupled to the side of the door that includes the face plate (e.g., the face plate through which a deadbolt or latching mechanism can protrude). In some embodiments, the second side 770 is coupled to the face plate.

The first side 768 can be integrated into a door frame and/or door jamb. In several embodiments, the first side 768 is coupled to a strike plate that is attached to a door frame and/or door jamb. The strike plate can be configured to receive the deadbolt or latching mechanism (e.g., as the deadbolt or latching mechanism protrudes into a strike box).

Figure 8:
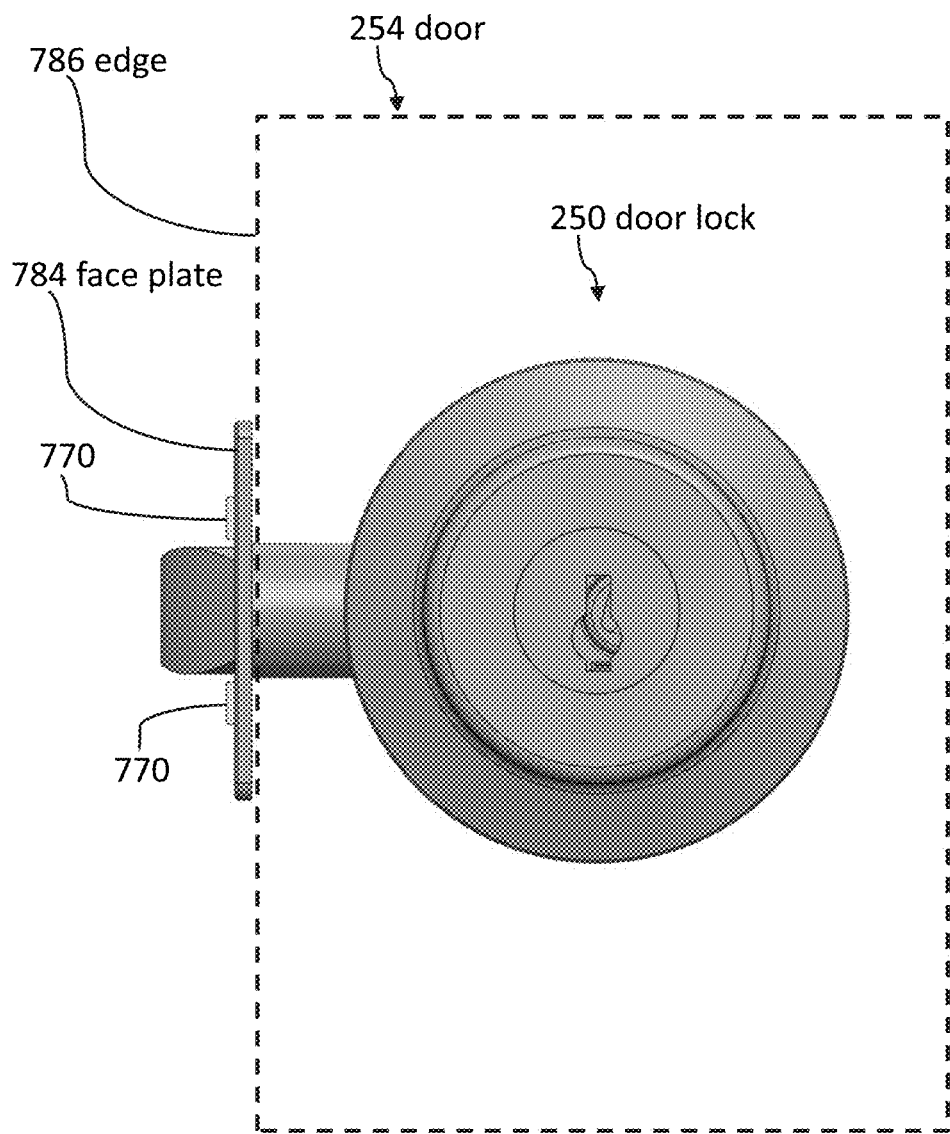
FIG. 8 illustrates a front view of a door, according to some embodiments.

FIG. 8 illustrates a front view of a door 254. A door lock 250 is configured to lock the door 254. The door lock 250 includes a face plate 784. Second sides 770 are coupled to the face plate 784 to enable the door lock 250 to receive electrical power from first sides 768 (shown in FIG. 7), which can be coupled to a door frame, a door jamb, and/or a strike plate. Second sides 770 can be coupled to the edge 786 of the door 254.

Figure 13:
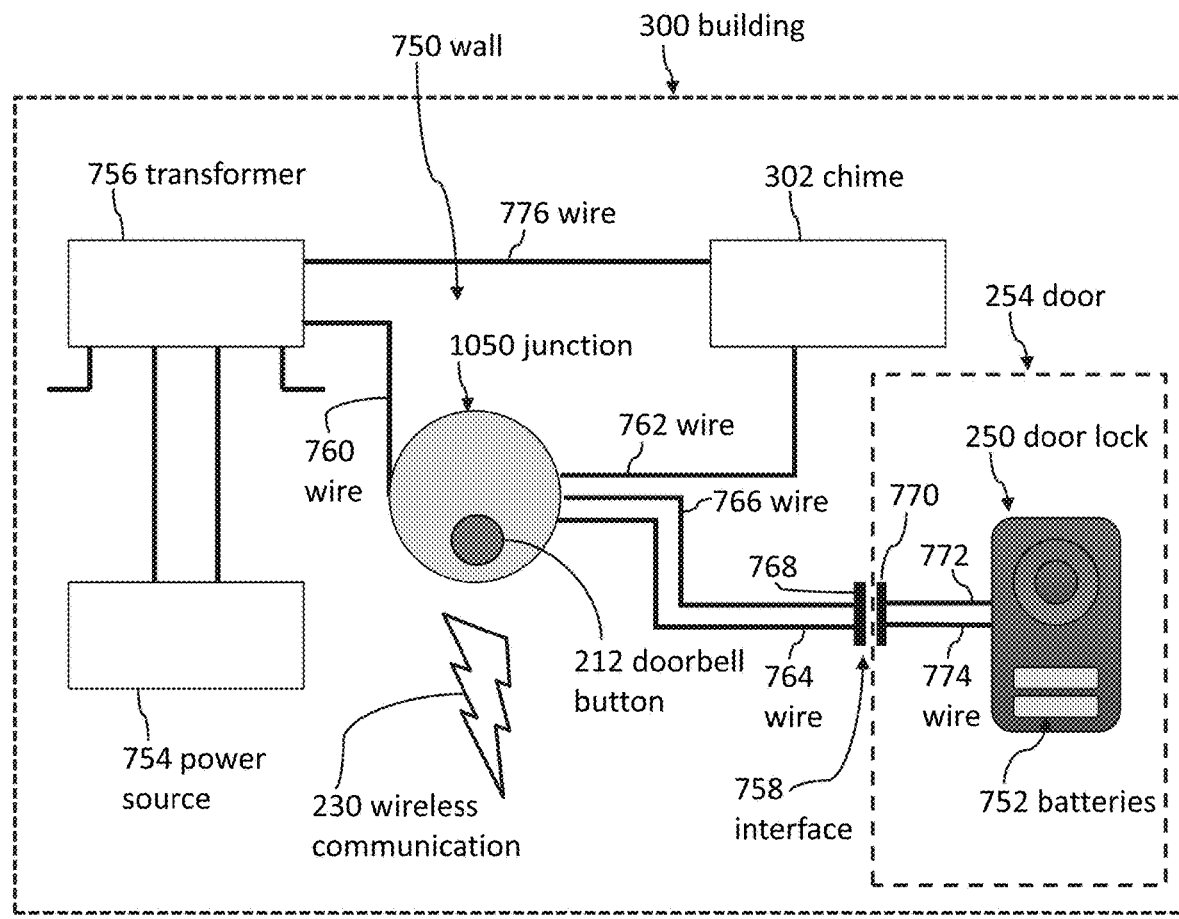
FIG. 13 illustrates a diagrammatic view of a junction providing electricity to a lock, according to some embodiments.
Figure 13:
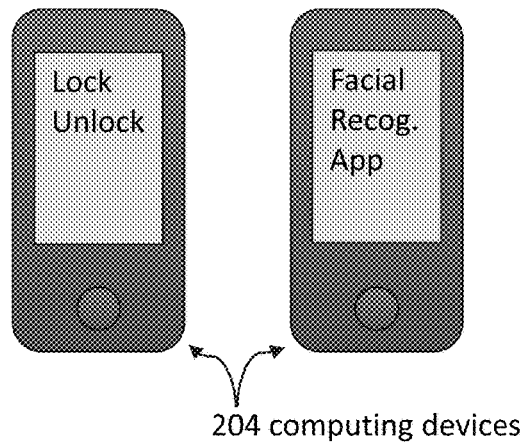

FIG. 13 illustrates a diagrammatic view of a lock 250 attached to a door 254 to help secure the door 254. The lock 250 can be configured to receive electricity from the building 300. Some embodiments include a junction 1050, which can be electrically coupled to a chime 302 and a transformer 756. The transformer 756 can be electrically coupled to a power source 754 of the building 300. The junction 1050 can be electrically coupled to wires 760, 762 that are electrically coupled to the chime 302 and the transformer 756 such that the junction 1050, the chime 302, and the transformer 756 are part of a circuit that can be opened and closed by a doorbell button 212. The transformer 756 is located remotely relative to the door 254.

Two wires 764, 766 can electrically couple the junction 1050 to the interface 758. For example, the wires 764, 766 can be electrically coupled to the first side 768 of the interface 758. The first side 768 can include a conductor configured to transmit electricity to the second side 770 of the interface 758. The second side 770 is electrically coupled to the door lock 250. Embodiments use many different means to transmit electricity from the first side 768 to the second side 770. Example means include electrical induction, inductive charging, magnetic resonance, magnetic induction, electrical contacts, and spring-loaded electrical contacts. Some electrical contacts are silver alloys and/or a suitable conductive metal.

The junction 1050 can electrically couple a first wire 760 to a third wire 764. The junction 1050 can electrically couple a second wire 762 to a fourth wire 766. The junction 1050 can include a housing in which wire connectors (e.g., a WingTwist made by Ideal Industries, Inc.) couple wires together.

Figure 14:
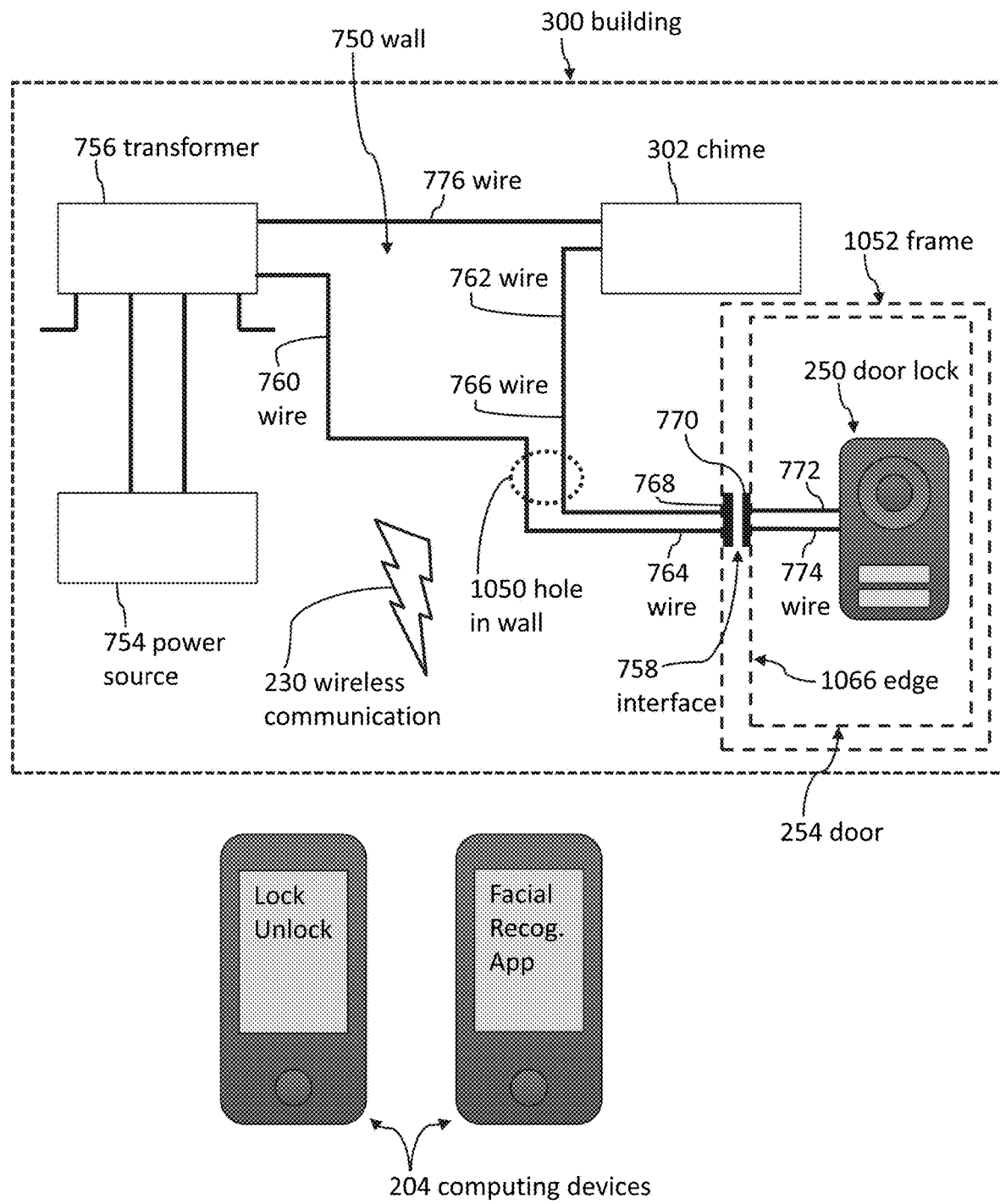
FIG. 14 illustrates a diagrammatic view of a lock attached to a door to help secure the door while the lock is configured to receive electricity from a transformer, according to some embodiments.

FIG. 14 illustrates a diagrammatic view of a lock 250 attached to a door 254 to help secure the door 254. Some embodiments include removing a doorbell (e.g., 202e in FIG. 5) to uncover wires 764, 766 that exit a hole 1050 in a wall 750 of a building 300. The junction 1050 (shown in FIG. 13) can be placed over the hole 750 and/or at least partially inside the hole 750. In FIG. 14, a first wire 760 is coupled to a third wire 764 and a second wire 762 is coupled to a fourth wire 766 such that the door lock 250 can receive electricity from the transformer 756 via the interface 758, which can include induction coils. The induction coils can be integrated into a face plate and a strike plate. The face plate can be mounted on the edge 1066 of a door 254. The edge 1066 can be the side of the door 254 that faces the strike plate when the door 254 is closed. The strike plate can be mounted on a door frame 1052. Closing the door 254 can align the strike plate and the face plate such that the interface 758 is capable of transmitting electricity via induction.

The face plate can be a small, rectangular metal piece on the edge of a door through which the bolt (e.g., a latch) protrudes. The strike plate can be a small, rectangular metal piece that receives the bolt (e.g., a latch) from the door. The bolt can extend through the strike plate.

Figure 15:
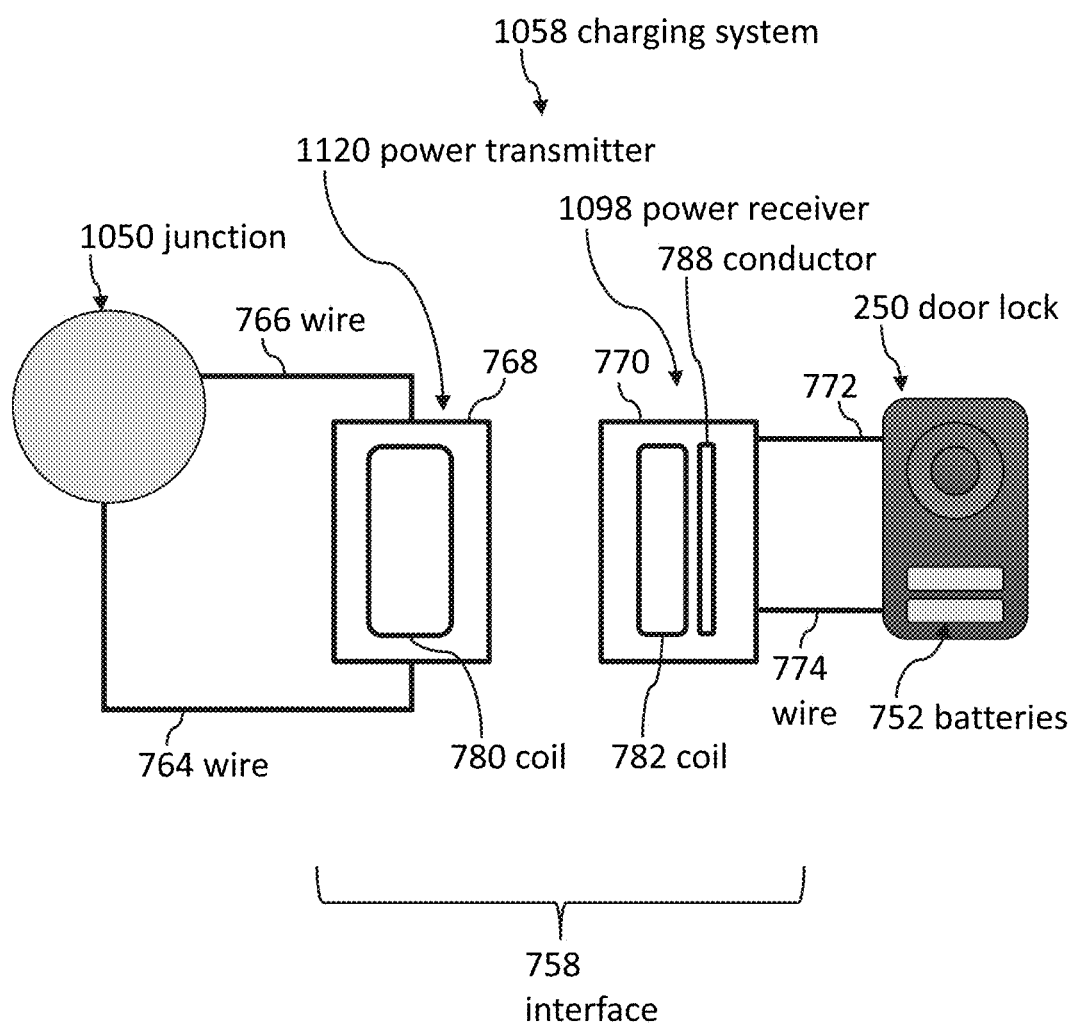
FIG. 15 illustrates a diagrammatic view of a charging interface, according to some embodiments.

FIG. 15 illustrates a diagrammatic view of a lock charging system 1058 that includes an interface 758. The interface 758 can be arranged and configured for inductive charging (e.g., near field charging and communication). The junction 1050 can electrically couple a first induction coil 780 to a power supply of a building. The door lock 250 can be electrically coupled to a second induction coil 782. The first induction coil 780 can be mechanically coupled to a strike plate. The second induction coil 782 can be mechanically coupled to a face plate. Closing the door 254 (shown in FIG. 14) can position the second induction coil 782 relative to the first induction coil 780 to enable the power supply 754 (shown in FIG. 14) to provide electricity to the lock 250 via induction.

FIG. 15 illustrates an embodiment that includes near field energy transmission and near field communication. The electricity can be transmitted via electrical induction. Direct induction and magnetic induction can be used to transmit electricity from the strike plate assembly to the lock.

Embodiments can use many different types of induction. Resonant inductive coupling, synchronized magnetic-flux phase coupling and/or electrodynamic induction can be used for near field wireless transmission of electrical energy. For example, two coils can be tuned to resonate at approximately the same frequency. A resonant and a resonance transformer can be used to wirelessly transmit electrical energy.

The Wireless Power Consortium has developed standards for wireless power transmission. One interface standard is called Qi. Qi uses resonant inductive coupling. Embodiments can use induction methods, procedures, and structures according to the Qi standards.

The Power Matters Alliance (PMA) has also developed standards and protocols for wireless power transmission. The standards are based on inductive coupling technology to enable inductive and resonant power transfer. Embodiments can use induction methods, procedures, and structures according to the PMA standards.

Wireless power transfer systems can also be used for digital transceiver communication. Some embodiments also enable cloud-based device management.

The embodiments described herein can use standards from the Wireless Power Consortium and from the Power Matters Alliance. Several embodiments use other standards and means of wireless power transmission.

Figure 16:
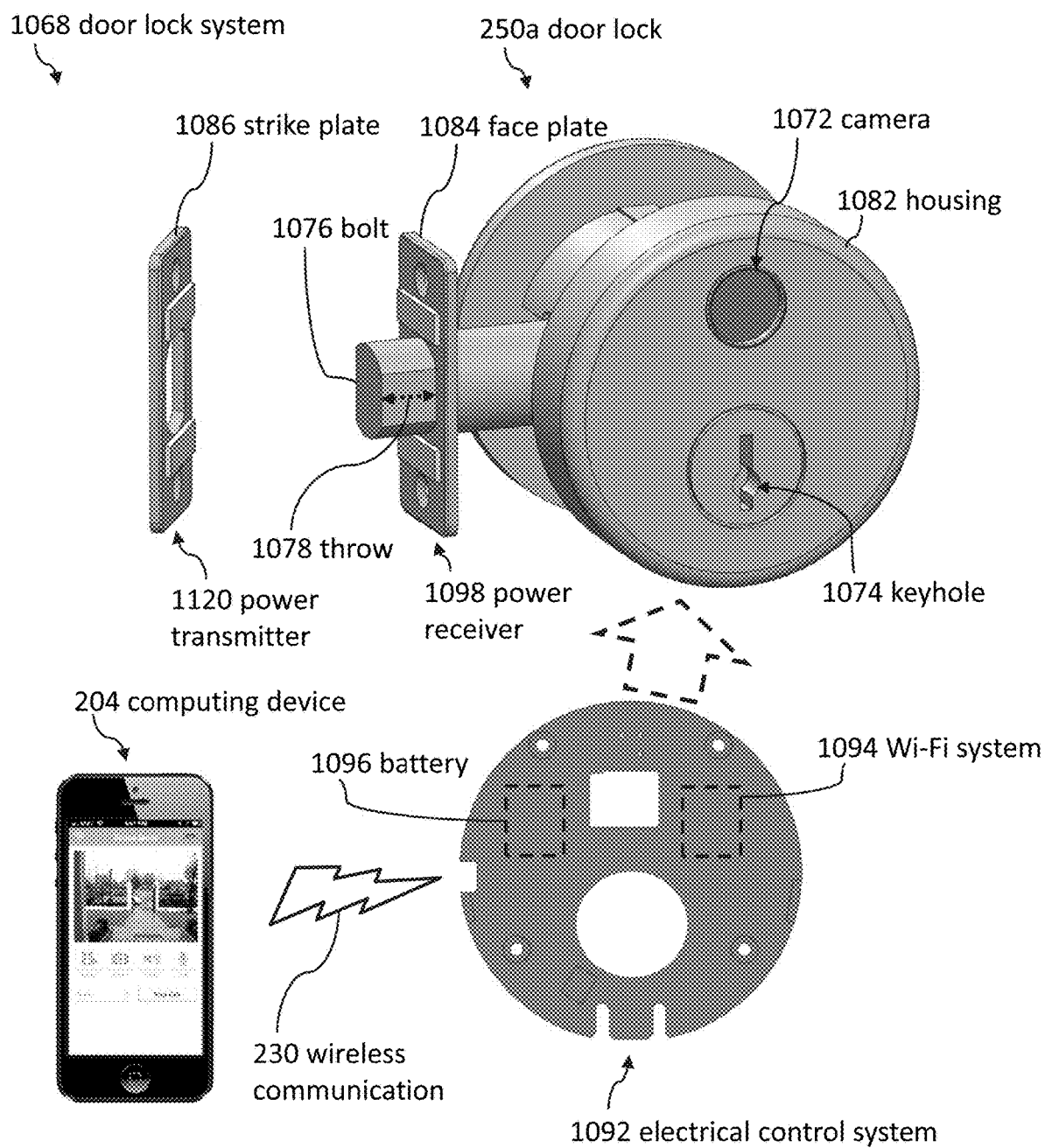
FIGS. 16 and 17 illustrate perspective views of a lock, according to some embodiments.
Figure 17:
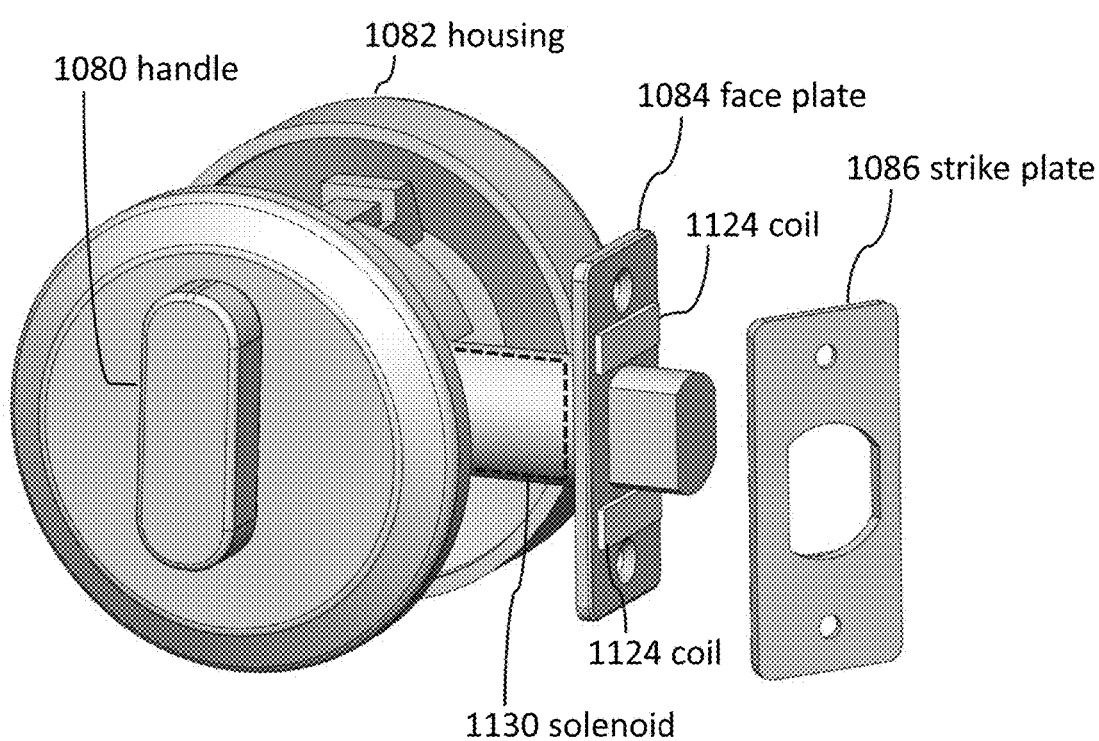

FIGS. 16 and 17 illustrate perspective views of a door lock 250a. FIG. 16 illustrates an exterior side of the door lock 250a. The exterior side can be placed on the side of the door that faces outside when the door is closed. The exterior side of the door lock 250a can include a camera assembly 1072 that faces outward relative to the door. The exterior side can also include a keyhole 1074 configured to enable a person to insert a key to adjust the throw of the bolt 1076 (to lock or unlock the door).

FIG. 17 illustrates an interior side of the door lock 250a. The interior side can be placed on the side of the door that faces inside when the door is closed. The interior side can include a handle 1080 configured to enable a person to rotate the handle 1080 to lock or unlock the door.

Figure 21:
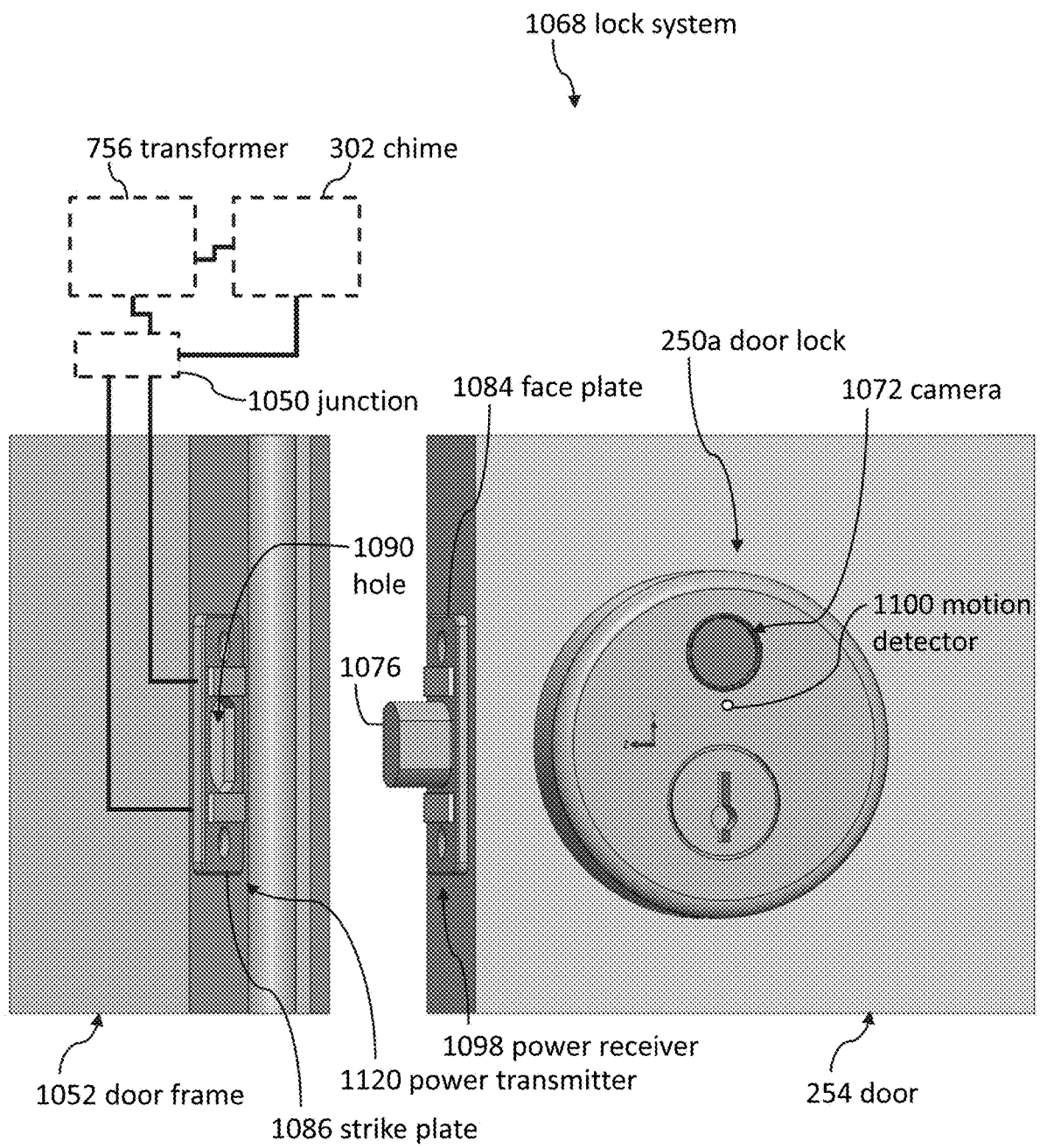
FIG. 21 illustrates a perspective view of a lock coupled to a door and a strike plate coupled to a door frame while the door is open slightly, according to some embodiments.

The door lock 250a can be a portion of the lock system 1068 illustrated in FIG. 21. The door lock 250a helps illustrate various embodiments of the door locks 250 described herein. The door lock 250a can be used in place of the door locks 250 described herein. Features described in the context of door locks 250 can be used with the embodiments described in the context of door locks 250a.

Referring now to FIGS. 16 and 17, the lock 250a can be configured to receive electricity from a transformer that is located remotely relative to the door (e.g., as illustrated in FIG. 13). The lock system can comprise an outer housing 1082. The lock system can also include a bolt 1076 configured to protrude away from the outer housing 1082 and past a face plate 1084 to secure the door 254 by entering a hole 1090 in a door frame 1052 (shown in FIG. 21). The bolt 1076 can be a metal protrusion that slides in and out of the lock 250a. The bolt 1076 comprises a throw distance 1078, which can be measured as the projection of the bolt from the side of the door that typically includes the face plate 1084. For example, in some embodiments, a bolt 1076 can extend between zero and four centimeters from a face plate 1084. The bolt 1076 can have the geometry of a deadbolt or can be angled (as is the case when a bolt is a type of latch).

Some locks include an electrical control system 1092, which can include a printed circuit board with any necessary components. The electrical control system 1092 can include a Wi-Fi communication system 1094 and a battery 1096. The electrical control system 1092 can be placed within the housing 1082 of the lock 250a. The electrical control system 1092 is configured to adjust the throw distance 1078 of the bolt 1076. For example, the electrical control system 1092 can cause the bolt 1076 to extend and retract relative to the face plate 1084.

A remote computing device 204 can control the electrical control system 1092 of the lock 250a. Example remote computing devices include cellular phones, smartphones, laptops, tablets, desktop computers, and other computing devices capable of data input (e.g., cars with computer displays and watches capable of wireless communication).

In some embodiments, locks need electricity. A power receiver can enable a lock to receive electrical power wirelessly or via wires. The power receiver can be integrated into at least a portion of the lock.

Referring now to FIGS. 15 and 16, the lock system comprises a power receiver 1098 coupled to the face plate and/or to a side of the door that faces the door frame. The power receiver 1098 can be configured to receive the electricity from a power transmitter 1120. The power transmitter 1120 can be coupled to a strike plate 1086 and/or to a door frame.

In addition to transmitting electricity between the power transmitter 1120 and the power receiver 1098, the lock system can communicate via the power receiver 1098 and the power transmitter 1120. In some embodiments, the lock 250a includes a wireless data transmitter (e.g., for Wi-Fi or Bluetooth communication). The Wi-Fi system 1094 is an embodiment of a wireless data transmitter.

Referring now to FIG. 21, the strike plate 1086 can be configured to be coupled to a door frame 1052. The power transmitter 1120 can be configured to receive the electricity from the transformer 756. The power receiver 1098 can be electrically coupled to the electrical control system 1092 (shown in FIG. 16) such that the power receiver 1098 is configured to provide the electricity to the electrical control system 1092 such that the electrical control system 1092 is capable of operating the bolt 1076. The electrical control system 1092 can govern the position of a solenoid that is mechanically coupled to the bolt 1076 such that the solenoid can move the bolt to locked and unlocked positions.

Figure 20:
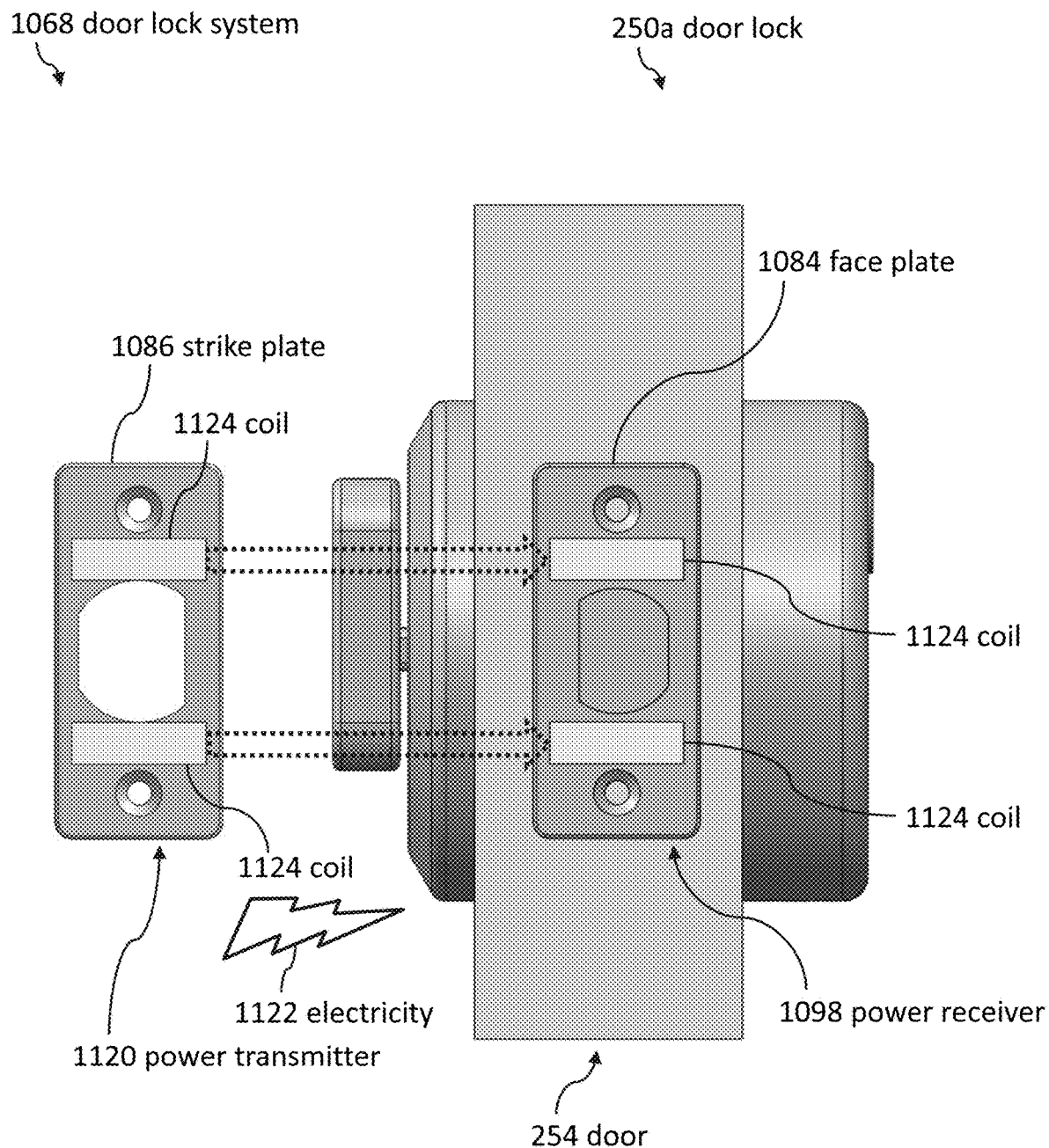
FIG. 20 illustrates a front view of a face plate and a strike plate while the face plate is attached to the side of a door, according to some embodiments.

FIG. 20 illustrates a front view of the face plate 1084 and the strike plate 1086. The door 254 is shown but the door frame 1052 is hidden. In the embodiment illustrated in FIG. 20, the power receiver 1098 is a wireless power receiver and the power transmitter 1120 is a wireless power transmitter. The power receiver 1098 is an induction receiver.

The power transmitter 1120 is an induction transmitter. Once the face plate 1084 is sufficiently proximate to the strike plate 1086, the power receiver 1098 will be arranged to receive the electricity 1122 from the induction transmitter. The power transmitter 1120 comprises at least one induction coil 1124 that is coupled to the strike plate 1086. The power receiver 1098 comprises at least one induction coil 1124 that is coupled to the face plate 1084. The door lock 250*a* enables transmitting the electricity 1122 wirelessly via inductive charging and/or magnetic resonance.

Figure 22:
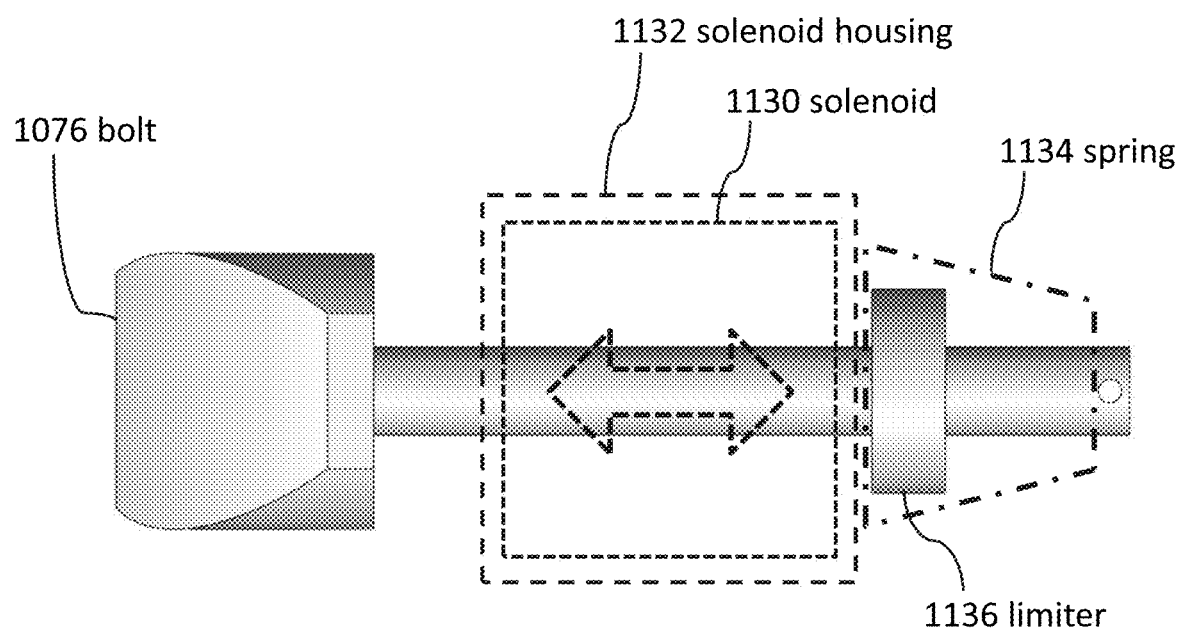
FIG. 22 illustrates a diagrammatic view of a solenoid-operated bolt, according to some embodiments.

FIG. 22 illustrates a schematic view of a solenoid 1130 that is coupled to the outer housing 1082 of the door lock 250*a* in some embodiments. (The outer housing 1082 is shown in FIG. 16.)

Referring now to FIGS. 16 and 22, the solenoid 1130 can be configured to control the throw distance 1078 of the bolt 1076 (e.g., by pushing the bolt in and out of the face plate 1084). The solenoid 1130 can push the bolt 1076 into a hole 1090 in the strike plate 1086 (shown in FIG. 21). The solenoid 1130 can pull the bolt 1076 out of the hole 1090 in the strike plate 1086. A spring can be arranged to act against the force generated by the solenoid. A spring 1134 can be arranged and configured to apply a force on the bolt 1076 that pushes the bolt 1076 outward relative to the face plate 1084 such that the lock 250*a* is configured to remain in a locked configuration when the solenoid 1130 receives insufficient electrical power to overcome the force of the spring 1134.

In several embodiments, the solenoid 1130 is electrically coupled to the electrical control system 1092 and the power receiver 1098 (shown in FIG. 21) such that the lock system is capable of providing the electricity from the transformer to the power receiver that is coupled to the face plate 1084, and then the power receiver 1098 is capable of providing the electricity to the solenoid 1130.

The solenoid 1130 can be placed at least partially inside a solenoid housing 1132, which can be coupled to the housing 1082 of the lock 250*a* such that the solenoid is arranged to retract the bolt 1076 when sufficient electrical power is applied to the solenoid 1130 (to overcome the force of the spring 1134). A travel limiter 1136 can prevent the bolt 1076 from extending too far. The travel limiter 1136 can be arranged to collide with the solenoid housing 1132 to prevent the bolt 1076 from extending too far.

The solenoid 1130 can be located between the keyhole 1074 and the power receiver 1098 of the face plate 1084. The solenoid 1130 can be electrically coupled to the power receiver 1098 of the face plate 1084 such that the solenoid 1130 is configured to receive the electricity from the transformer.

Some lock embodiments include elements from security systems described in applications incorporated herein by reference. The embodiments described herein can be combined with the security system embodiments incorporated by reference. The remote computing devices described in embodiments incorporated by reference can be used with the lock embodiments described herein. Additional embodiments can be formulated by replacing the security systems described in applications incorporated by reference with lock embodiments described herein.

Locks can use the cameras, speakers, microphones, and doorbell buttons described in embodiments incorporated by reference. In several embodiments, a camera can be coupled to the outer housing of the lock. The camera can be configured to face outward from the door. A speaker and a microphone can be coupled to the outer housing. The camera can be configured to take a picture of a visitor to the lock. For example, the lock can detect when a visitor approaches the lock.

The lock can take a picture of the visitor in response to detecting the visitor. The speaker can be configured to enable communication with a user of a remote computing device. For example, the speaker can emit sounds from a user of the remote computing device to enable the visitor to hear the user of the remote computing device. The microphone can be configured to record sounds from the visitor for transmission to the remote computing device. For example, the microphone can record the visitor speaking to enable the user to hear the visitor.

Figure 18:
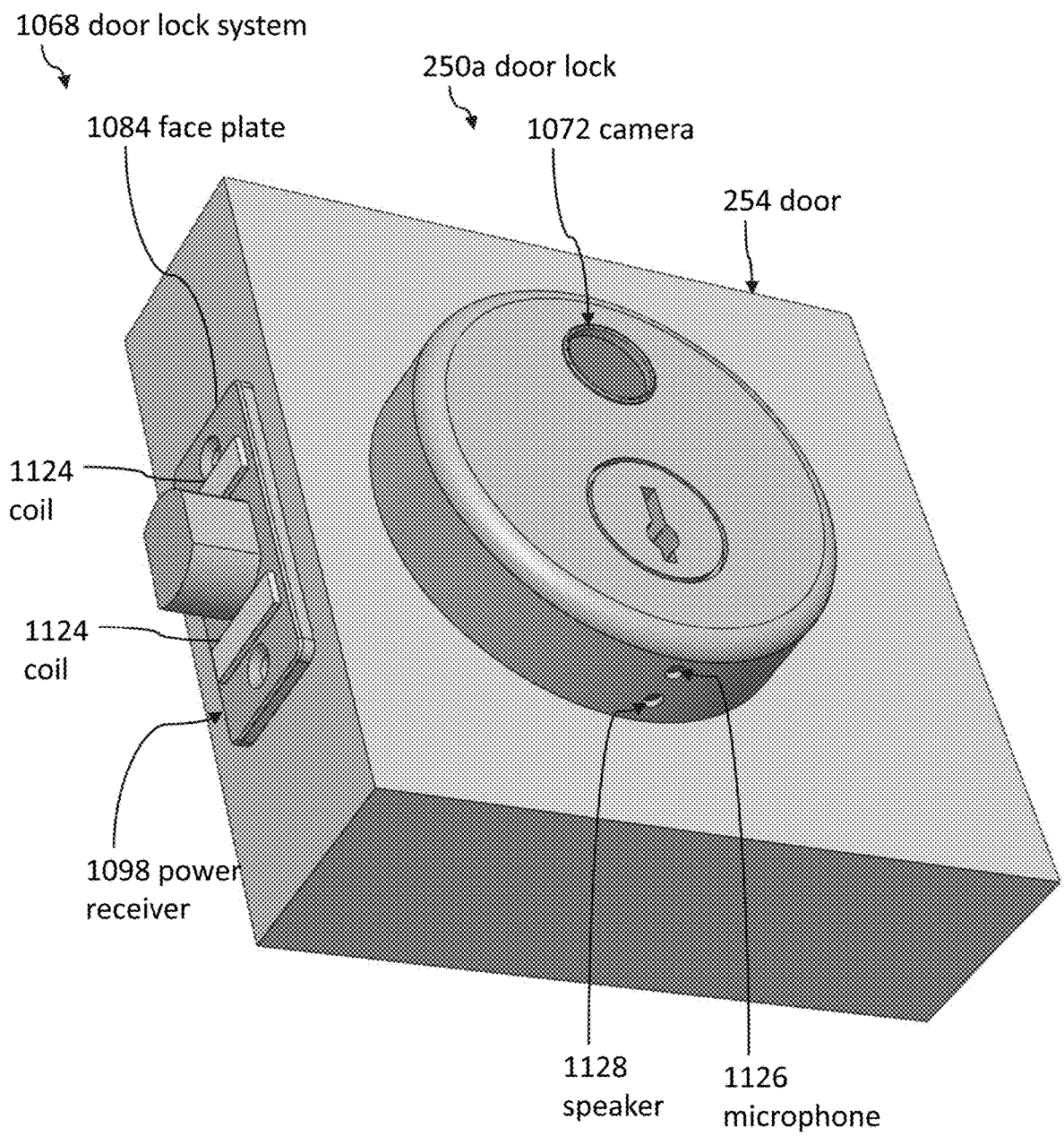
FIGS. 18 and 19 illustrate perspective views of a lock coupled to a door, according to some embodiments.
Figure 19:
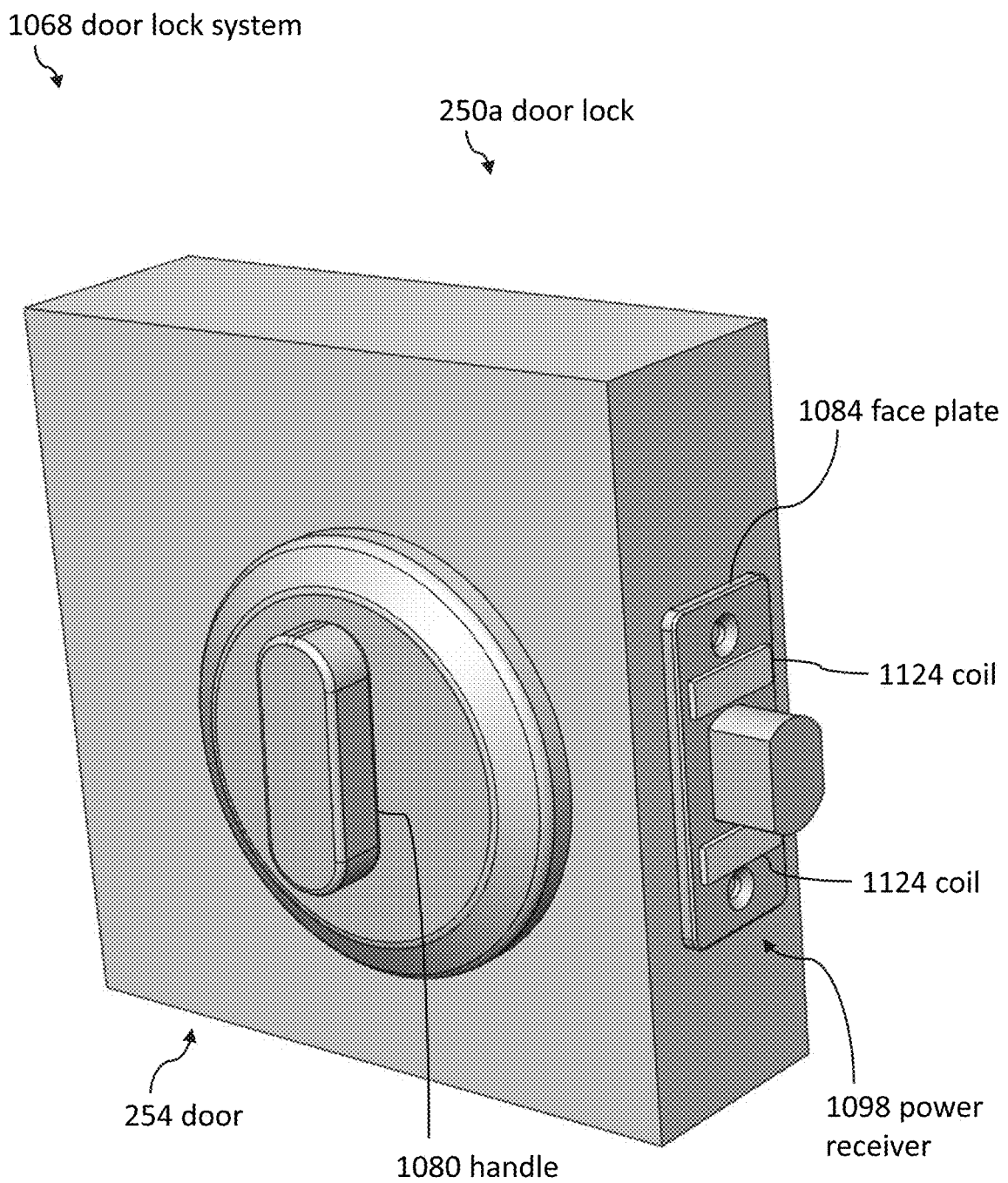

FIG. 18 illustrates a perspective view of a door lock 250*a* integrated into a door 254. From the perspective illustrated in FIG. 18, the right side of the door is configured to be attached to hinges and the left side of the door is configured to face towards a strike plate of a door frame. The door lock 250*a* includes a camera 1072, a speaker 1128, and a microphone 1126.

Referring now to FIG. 16, the lock 250*a* can include a wireless data transmission system (e.g., the Wi-Fi system 1094) configured to receive lock commands from the remote computing device 204 and configured to wirelessly transmit pictures and sounds from the visitor to the remote computing device 204. The wireless data transmission system can use Wi-Fi, Bluetooth, and/or radiofrequency means of communication. The power transmitter 1120 is integrated into the strike plate 1086. The power receiver 1098 is integrated into the face plate 1084.

In some embodiments, the power transmitter is located within 20 centimeters and/or within 10 centimeters of the power receiver. The power transmitter can be inductively coupled with the power receiver such that the power transmitter is configured to inductively transmit the electricity to the power receiver of the face plate via electrical induction.

Referring now to FIG. 20, the power transmitter 1120 can comprise a first induction conductor (e.g., a coil 1124). The power receiver 1098 can comprise a second induction conductor (e.g., a coil 1124). The first induction conductor can located within 10 centimeters and/or within 4 centimeters of the second induction conductor.

The face plate 1084 can be aligned with the strike plate 1086 such that the first induction coil can be inductively coupled with the second induction coil. Alignment is achieved when the first induction coil can be inductively coupled with the second induction coil. Alignment does not necessary require the face plate and the strike plate to be oriented parallel to each other. The face plate and the strike plate can be offset from each other and still be in alignment if the first induction coil can be inductively coupled with the second induction coil. Thus, alignment can be judged by inductive capability.

Some embodiments include removing a doorbell from a wall to gain access to wires that were attached to the doorbell. These wires can be coupled to the transformer and the chime. These wires can be used to provide electricity to the lock (e.g., via a strike-plate power-transmission assembly).

In several embodiments, a strike plate is coupled to the door frame and a face plate is coupled to a side of the door such that the strike plate faces towards the face plate. The side of the door to which the face plate is coupled can be opposite the side of the door to which hinges are attached. The power transmitter can comprise a first induction coil. The power receiver can comprise a second induction coil. The face plate can be oriented relative to the strike plate such that the first induction coil is capable of being inductively coupled with the second induction coil. The second induction coil can be oriented at an angle relative to the first induction coil. The angle can be less than 30 degrees and/or less than 20 degrees. The second wire can be electrically coupled to the transformer via the chime. The second wire can be electrically coupled to the transformer and the chime. The first wire and the second wire can be electrically coupled to the transformer while the transformer is located inside of the building. The first wire and the second wire can protrude into a second hole that leads to an area outside of the building. The second hole can be the hole in which wires for a doorbell are located (to enable installing a doorbell on an exterior wall of the building).

In several embodiments, the power transmitter of the strike plate is electrically coupled to the power receiver of the face plate to enable the lock to receive the electricity from the transformer. Electrical coupling can be achieve wirelessly (e.g., via induction) and/or via conductive wires.

Figure 23:
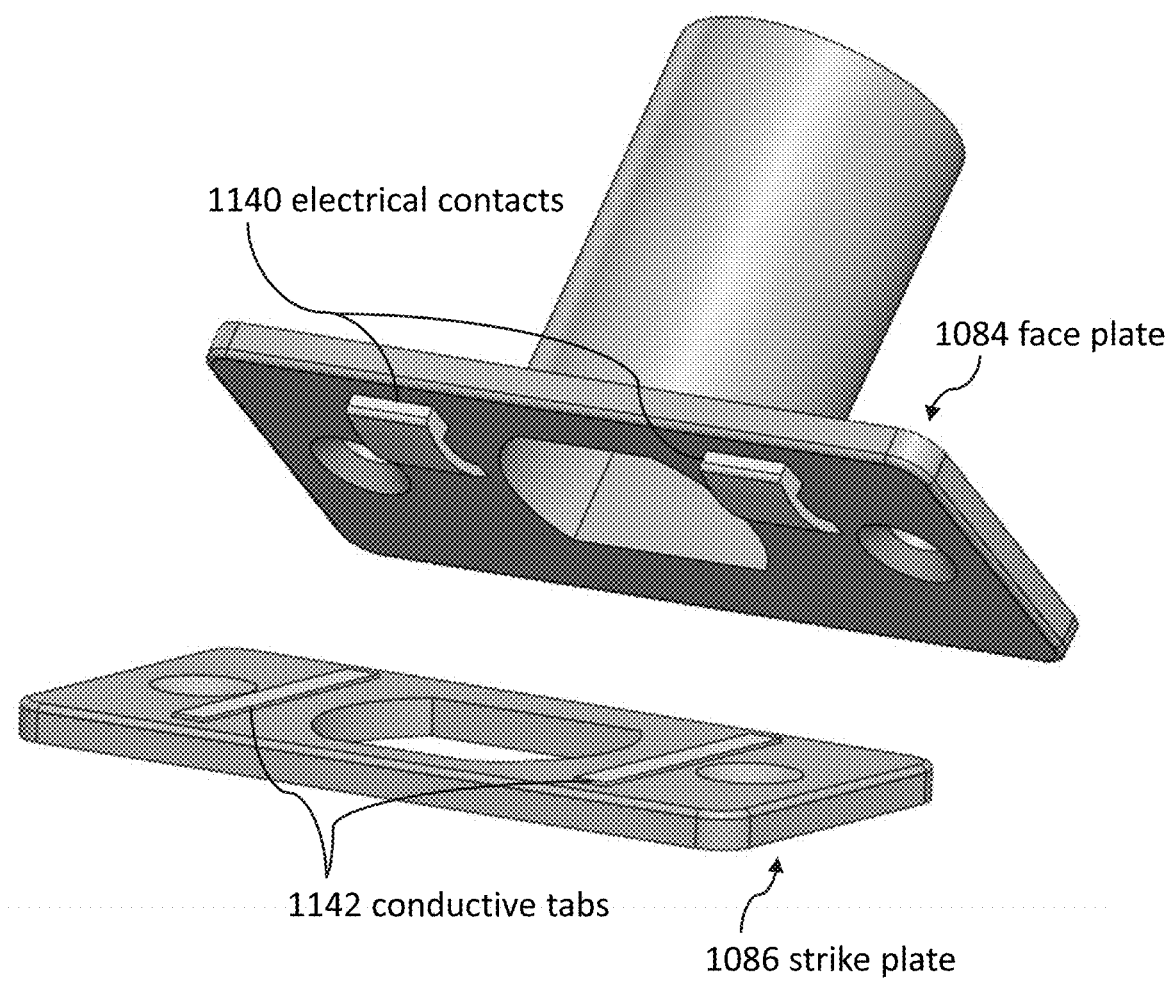
FIG. 23 illustrates a perspective view of a face plate and a strike plate, according to some embodiments.
Figure 24:
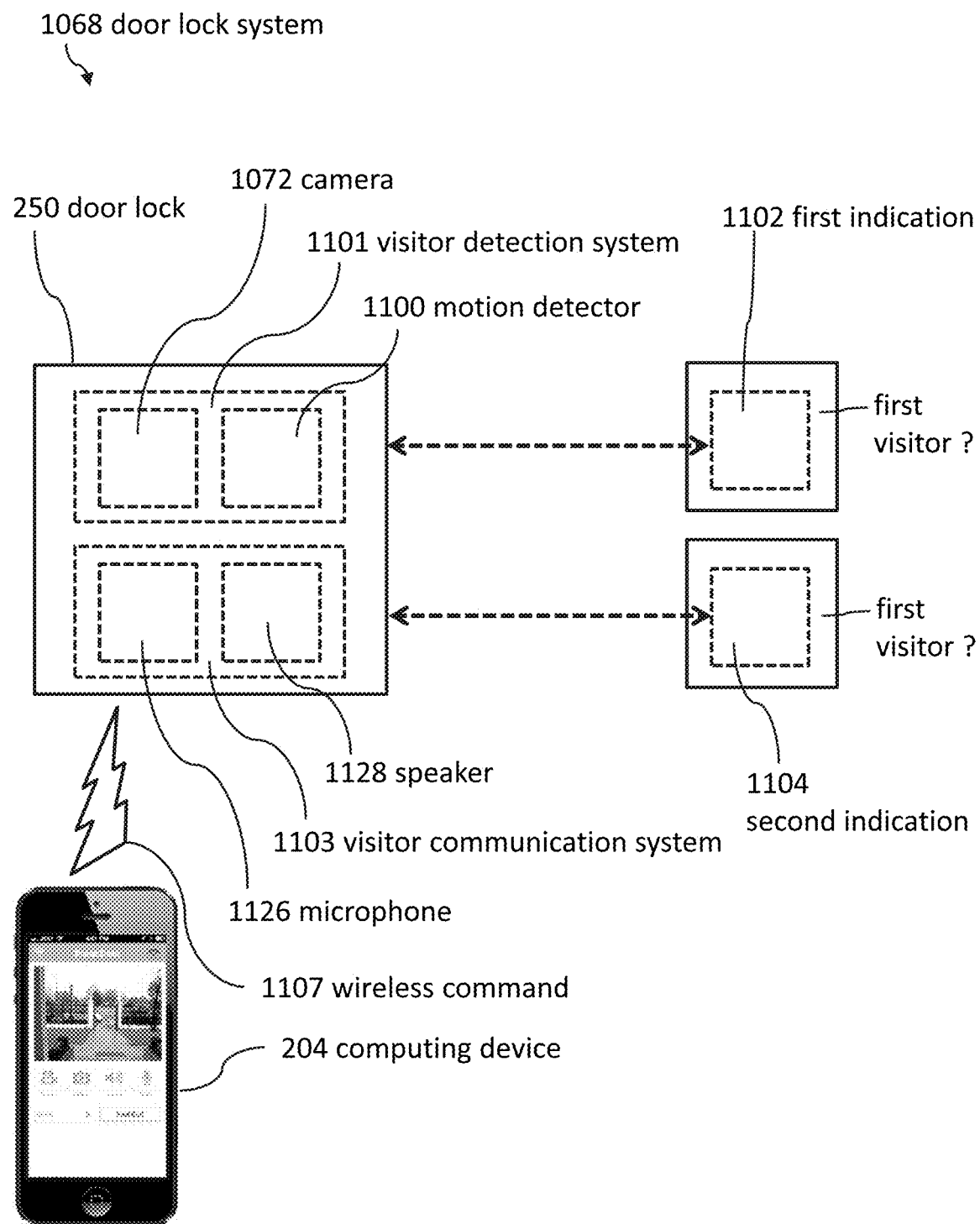
FIG. 24 illustrates a door lock system, according to some embodiments.

FIG. 23 illustrates an embodiment that enables electric coupling via conductive wires (rather than via induction). In the face plate 1084, the coils are replaced with spring-loaded electrical contacts 1140. In the strike plate 1086, the coils are replaced with conductive tabs 1142 configured to form an electrical connection with the electrical contacts 1140 when the door is closed.

The electrical control system can be communicatively coupled to the power transmitter (e.g., such that the electrical control system is capable of sending communications to the power transmitter). The power transmitter can be communicatively coupled to a network connection module that is electrically coupled to a power outlet of the building such that the network connection module is configured to transmit data to the lock. More information regarding communicating via power lines is incorporated by reference from U.S. Provisional Patent Application No. 62/026,639.

Lock History Embodiments

Figure 9:
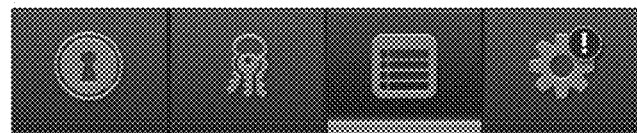
FIG. 9 illustrates a history of lock-related events displayed on a user interface, according to some embodiments.

FIG. 9 illustrates a history 570 of lock-related events displayed on a user interface (e.g., of a smartphone, tablet, laptop, desktop computer, or television). The history can include when a door was locked and unlocked. The history can also include when the lock was set up and/or "paired" with the computing device 204 (show in FIG. 1).

Several embodiments comprise taking at least one image of the visitor on each occasion the visitor unlocks the lock 250; associating a time and a date with each additional image; and recording the additional images, the times, and the dates in the remote database 436. Methods can further comprise enabling the remote computing device 204 to display the images, the times, and the dates. For example, a user of the remote computing device 204 can search through the images to see the visitor who entered the building at a particular entry time (as captured in the history).

Watch Embodiments

Figure 10:
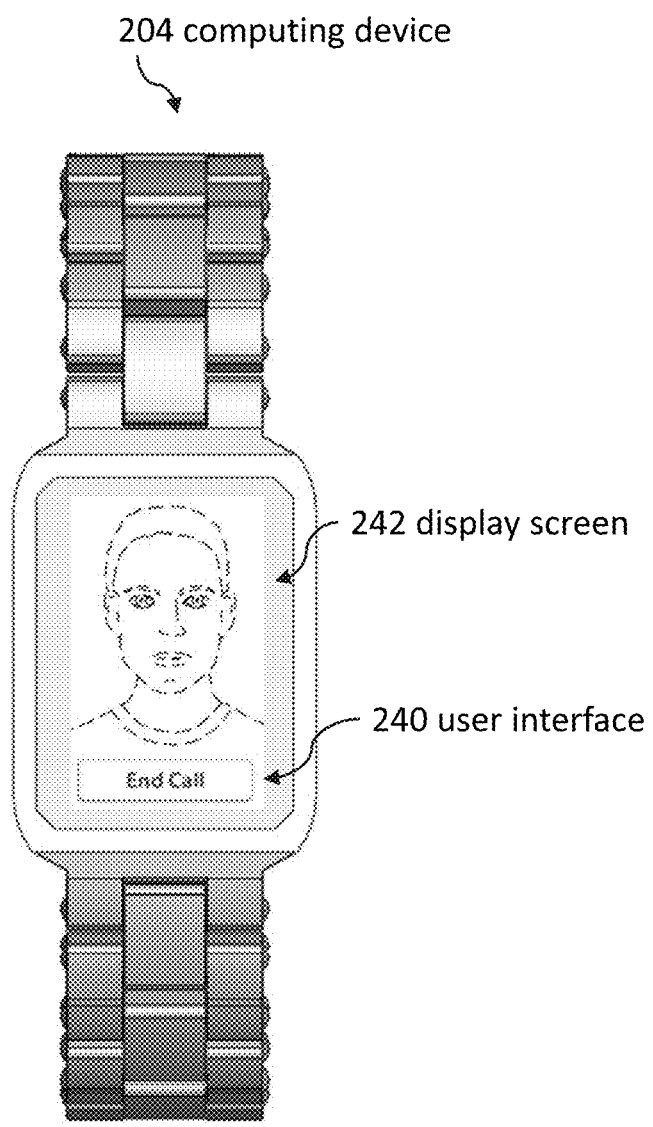
FIG. 10 illustrates a front view of a watch, according to some embodiments.

FIG. 10 illustrates a front view of a computing device 204, which can be a watch that a user can wear around a wrist. The watch can include a display screen 242, which can show a user interface 240. The user interface 240 can include all of the features described in the context of FIG. 2.

A user can receive visitor notifications via the watch. The watch can enable a user to "answer" her door. The user can see video of the visitor that is recorded by the security system 202 (shown in FIG. 1) via the display screen 242. The watch can include a microphone and a speaker to enable the user to talk with the visitor.

Figure 11:
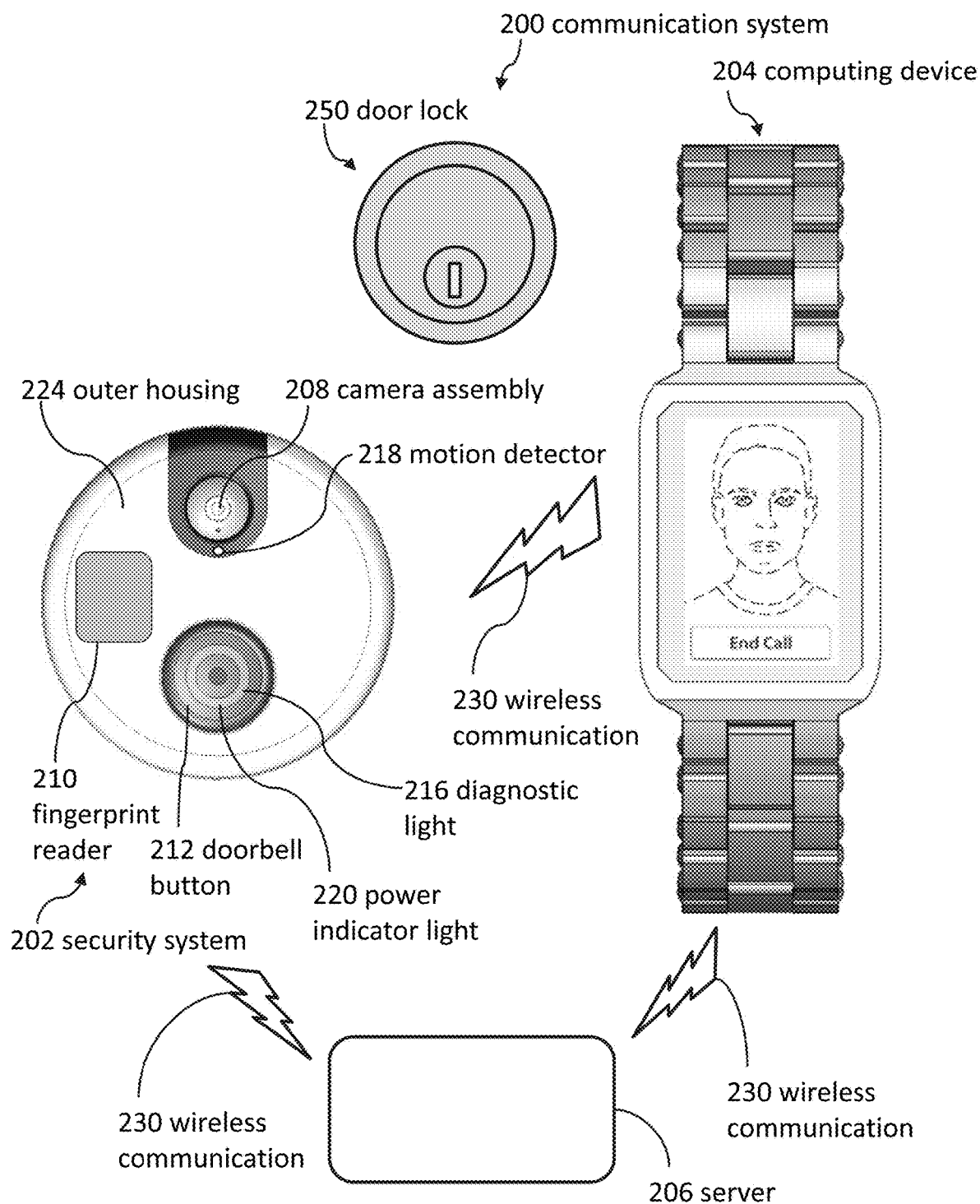
FIG. 11 illustrates the watch interacting with a security system, according to some embodiments.

FIG. 11 illustrates the watch interacting with the security system 202, the server 206, and the door lock 250. The watch can connect to a wireless network 308 (shown in FIG. 3). The watch can also communicate with the security system 202 via short range communication protocols such as Bluetooth. The watch can be a "smart watch" with all the features of smartphones. In several embodiments, the watch comprises a cellular phone.

Figure 12:
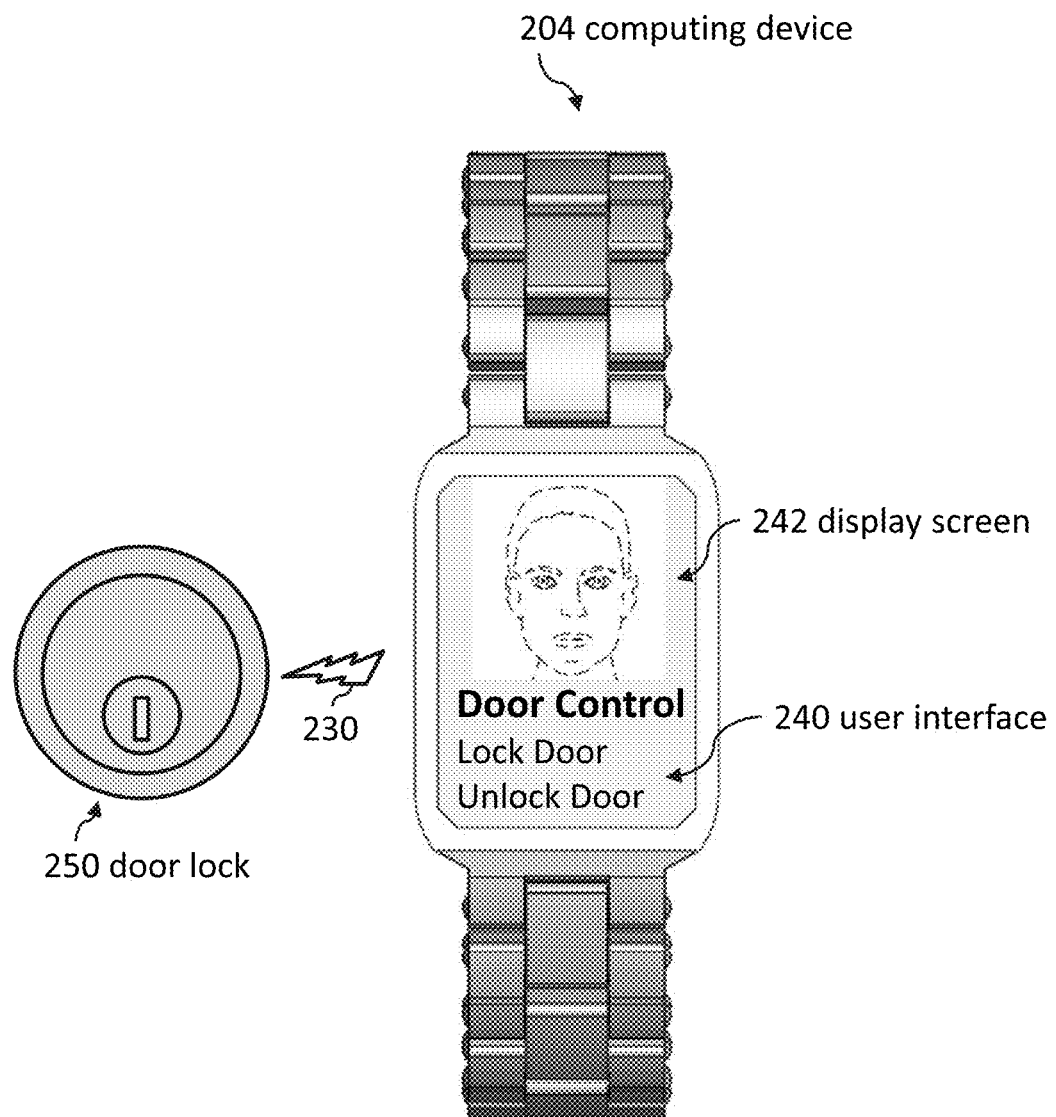
FIG. 12 illustrates an embodiment in which the watch wirelessly communicates with a door lock, according to some embodiments.

FIG. 12 illustrates an embodiment in which the watch is a computing device 204 that wirelessly communicates with a door lock 250. The watch can include a user interface 240 that enables a user to lock and unlock the door lock 250 remotely.

Mechanical Doorbell and Digital Doorbell Embodiments

Some embodiments combine a digital doorbell operating system with a mechanical doorbell operating system. In some embodiments, the security system 202 in FIG. 1 can comprise a digital doorbell in which the doorbell closes the circuit to ring a chime due to software rather than due to a mechanical switch that is directly activated by a person pushing a doorbell button. In several embodiments, the security system 202e in FIG. 5 can be a mechanical doorbell. With a mechanical doorbell, a person physically closes the circuit to ring the chime by pressing the doorbell button 212e.

Referring now to FIG. 5, several security system embodiments include a system that runs software with a mechanical doorbell in one rigid housing. These embodiments can receive electricity from a power source 754 to run software configured to detect visitors and to enable sending visitor notifications to remote computing devices 204 (shown in FIG. 1). These embodiments can also include a doorbell button 212e (shown in FIG. 1) configured such that pressing the doorbell button 212e physically closes a circuit between the transformer 756 and the chime 302.

In some embodiments, a digital doorbell operating system and a mechanical doorbell operating system run on the same platform utilizing one power source 754. This power source 754 can be coupled to the two operating systems via wires that protrude out of a doorbell hole of a building.

Visitor Identification Embodiments

Many embodiments utilize the visitor identification abilities of the person using the remote computing device 204

(shown in FIG. 1). Various technologies, however, can be used to help the user of the remote computing device 204 to identify the visitor. Some embodiments use automated visitor identification that does not rely on the user, some embodiments use various technologies to help the user identify the visitor, and some embodiments display images and information (e.g., a guest name) to the user, but otherwise do not help the user identify the visitor.

Referring now to FIG. 1, the camera assembly 208 can be configured to visually identify visitors through machine vision and/or image recognition. For example, the camera assembly 208 can take an image of the visitor. Software run by any portion of the system can then compare select facial features from the image to a facial database. In some embodiments, the select facial features include dimensions based on facial landmarks. For example, the distance between a visitor's eyes; the triangular shape between the eyes and nose; and the width of the mouth can be used to characterize a visitor and then to compare the visitor's characterization to a database of characterization information to match the visitor's characterization to an identity (e.g., an individual's name, authorization status, and classification). Some embodiments use three-dimensional visitor identification methods.

Some embodiments include facial recognition such that the camera assembly 208 waits until the camera assembly 208 has a good view of the person located near the security system 202 and then captures an image of the person's face.

Some embodiments include fingerprint matching to verify the identity of the visitor. A visitor can place her finger over the camera assembly 208 to enable the system 200 to detect her fingerprint. Some security system 202 embodiments include a fingerprint reader 210.

The fingerprint reader 210 can enable the system to compare the fingerprint of the visitor to a database of fingerprints to identify and/or classify the visitor. The database of fingerprints can be created by the user and/or can include a database of fingerprints from a law enforcement agency (e.g., a database of criminals).

The fingerprint reader 210 can use any suitable algorithm including minutia and pattern algorithms. The fingerprint reader 210 can analyze fingerprint patterns including arch patterns, loop patterns, and whorl patterns. The fingerprint reader 210 can include any suitable fingerprint sensor including optical, ultrasonic, passive capacitance, and active capacitance sensors.

The fingerprint reader 210 can be integrated into the outer housing 224 of the security system 202, which can be mounted within seven feet of a door or entryway of rental lodging, such as a hotel room or an apartment for short-term rent. In some embodiments, the security system 202 can be configured to be mounted in an entryway. Some methods include mounting a security system in an entryway of a building.

The fingerprint reader 210 can be integrated into the doorbell button 212. Pressing the doorbell button 212 can enable the fingerprint reader 210 to analyze the fingerprint of the visitor.

Several embodiments can establish a visitor's identity by detecting a signal from a device associated with the visitor (e.g., detecting the visitor's smartphone). Examples of such a signal include Bluetooth, Wi-Fi, RFID, NFC, and/or cellular telephone transmissions.

Some embodiments include using a doorbell to detect the visitor after the visitor has approached the doorbell while the visitor is located outside of a building (e.g., the building 300 in FIG. 3) to which the doorbell is attached. The building can comprise a door having a lock 250. The lock 250 can be configured to fasten the door to inhibit unauthorized entry into the building (without breaking down the door).

Identity Validation Embodiments

Criminals often illegally gain access to buildings to commit crimes such as property theft and assault on building occupants. In order to secure a building, visitors may be screened at entryways prior to entering a building. For example, some visitors may be required to present an access card at a secure entryway of the building. Unfortunately, criminals may illegally apprehend the access card and thereby gain access to the building. Accordingly, the door lock system 1068 may double validate a visitor's identity before granting the visitor access to the building.

Figure 25A:
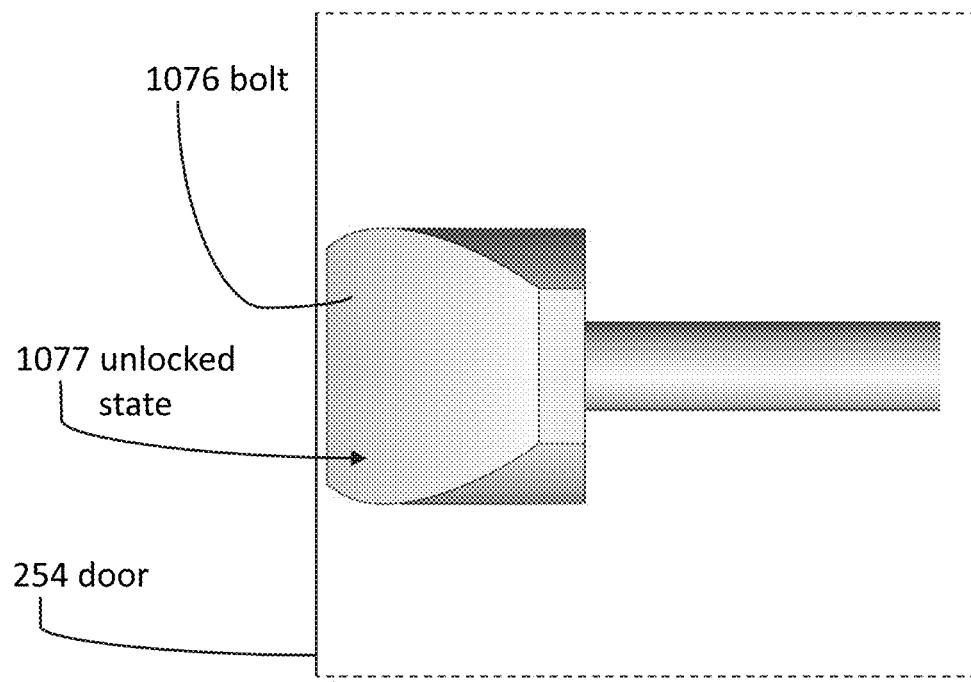
FIGS. 25a and 25b illustrate a door lock in an unlocked state and a locked state, according to some embodiments.
Figure 25B:
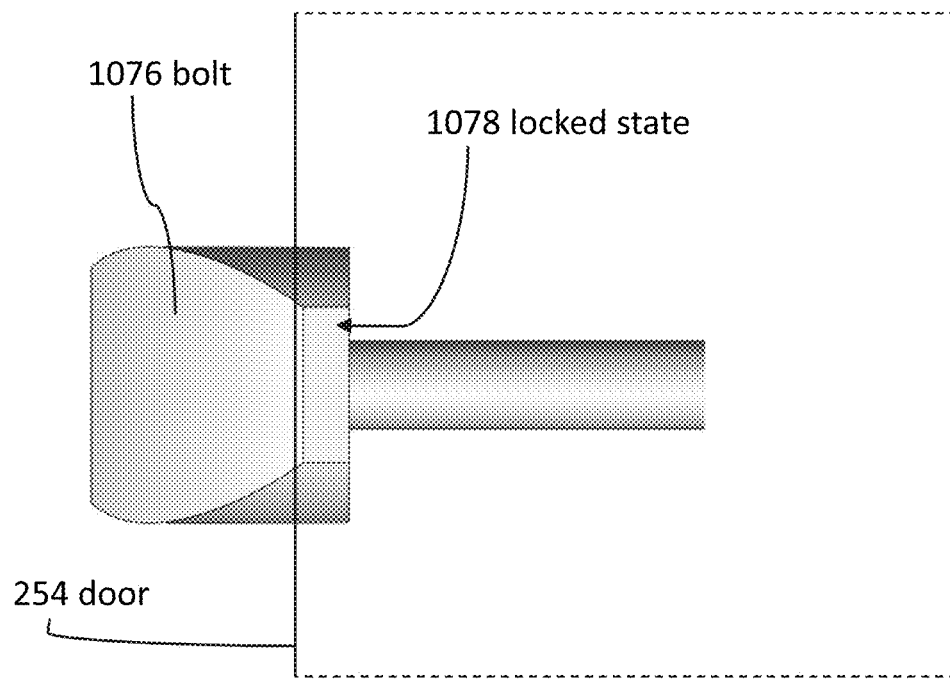

With reference to FIGS. 16-24, 25a, and 25b, the door lock system 1068 may include an outer housing 1082 and a door lock coupled to the outer housing 1082. As shown in FIGS. 25a and 25b, the bolt 1076 of the door lock 250 may be movable between an unlocked state 1077 and a locked state 1078. FIGS. 25a and 25b specifically illustrate a side view of a door 254 and the position of the bolt 1076 in both the unlocked state 1077 and the locked state 1078. In the unlocked state 1077 the bolt 1076 does not protrude from the side of the door 254. In this manner, the door 254 is free to open and close and thereby allow visitors to enter the building 300. Contra, when the door 254 is located in a closed position and the bolt 1076 protrudes from the door 254 (in the locked state 1078), the door 254 may prevent visitors from entering the building 300.

The door lock system 1068 may include a visitor detection system 1101 coupled to the outer housing 1082 and a visitor communication system 1103 coupled to the outer housing 1082. In some embodiments, the visitor detection system 1101 includes a camera assembly 1072 and/or a motion detector assembly 1100. In some embodiments, the visitor communication system 1103 includes a microphone 1126 and/or a speaker 1128.

The door lock system 1068 can implement the components of the visitor detection system 1101 and the visitor communication system 1103 to validate that a visitor's identity is actually the true identity of the visitor who is present. In this regard, the door lock system 1068 can also include a first indication 1102 suggestive of a presence of a visitor; and a second indication 1104 suggestive of an identity of the visitor. The door lock system 1068 can be configured to validate that the first indication 1102 and the second indication 1104 are associated with a first identity of a visitor. In other words, the door lock system 1068 can be configured to determine whether the first and second indications 1102 and 1104 are associated with the identity of the same visitor. If the door lock system 1068 determines that the first and second indications 1102 and 1104 are associated with the identity of the same visitor, and the identity matches an identity of an authorized visitor who is permitted access to the building, then the door lock system 1068 can move the bolt 1076 to the unlocked state to grant the visitor access to the building.

As well, the door lock system 1068 can include a remote computing device 204 communicatively coupled to the visitor detection system 1101 and/or the visitor communication system 1103. The door lock system 1068 can thereby receive wireless commands 1107 from the remote computing device 204 to move the bolt 1076 to a locked state and/or unlocked state.

Figure 26:
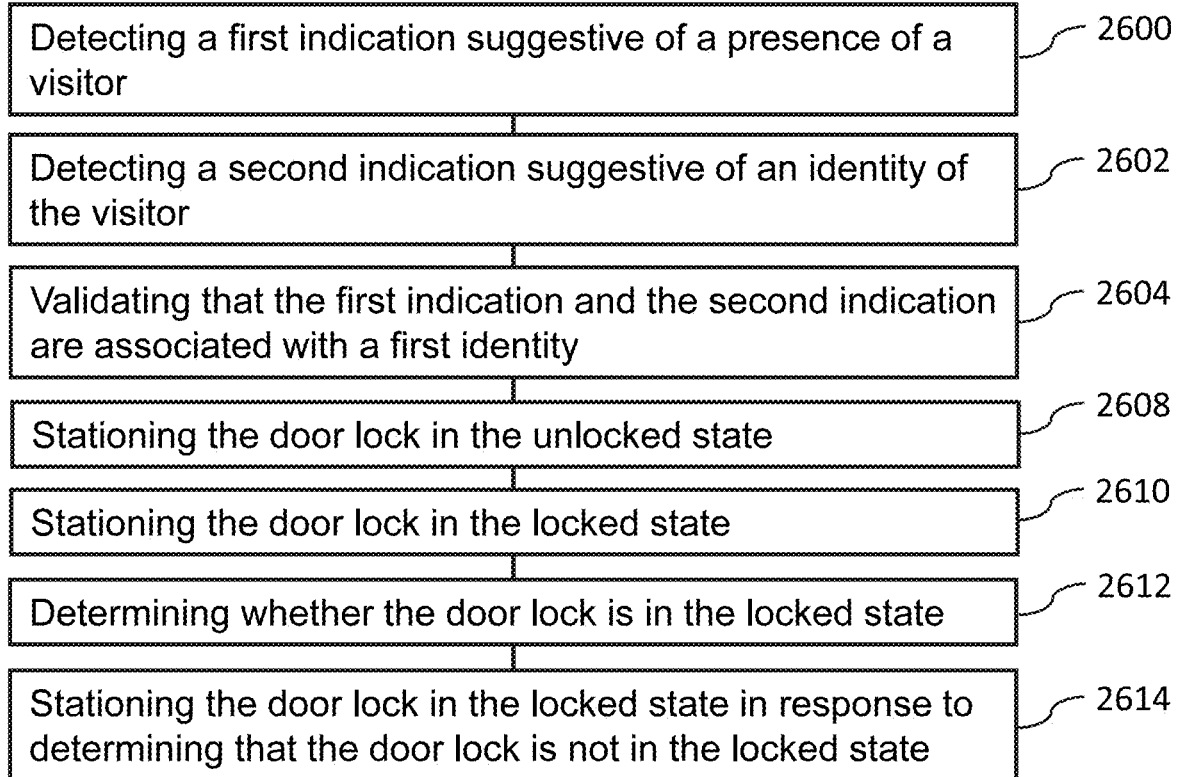
FIGS. 26, 27, 28, 29 and 30 illustrate methods of using door lock systems, according to various embodiments.

As illustrated in FIG. 26, the door lock system 1068 can also operate various operations to determine a visitor's identity and thereby grant or deny the visitor access to the building. Step 2600 can include detecting a first indication suggestive of a presence of a visitor. As well, step 2602 can include detecting a second indication suggestive of an identity of the visitor. Furthermore, step 2604 can include validating that the first indication and the second indication are associated with a first identity.

In some embodiments, some steps can be performed in response to the occurrence of other steps or conditions. For example, in response to determining that the first indication and the second indication are both associated with the first identity, step 2608 can include stationing the door lock in the unlocked state. As well, in response to determining that one of the first indication and the second indication is not associated with the first identity, step 2610 can include stationing the door lock in the locked state.

It should be appreciated that the term "stationing" can mean moving the door lock (e.g. the bolt 1076) to the unlocked state or the locked state. As well, stationing can mean determining if the door lock is already in the unlocked state and then leaving the door lock in the unlocked state. Even still, stationing can be mean determining if the door lock is already in the locked state and then leaving the door lock in the locked state. Accordingly, methods can include determining whether the door lock (e.g. the bolt 1076) is in the locked state (at step 2612) and thereby stationing the door lock in the locked state in response to determining that the door lock is not in the locked state (at step 2614). As well, methods can include determining whether the door lock (e.g. the bolt 1076) is in the unlocked state and thereby stationing the door lock in the unlocked state in response to determining that the door lock is not in the unlocked state. Generally, the door lock can be positioned in a locked or unlocked state in response to determining the door lock is in the locked or unlocked state.

Figure 27:
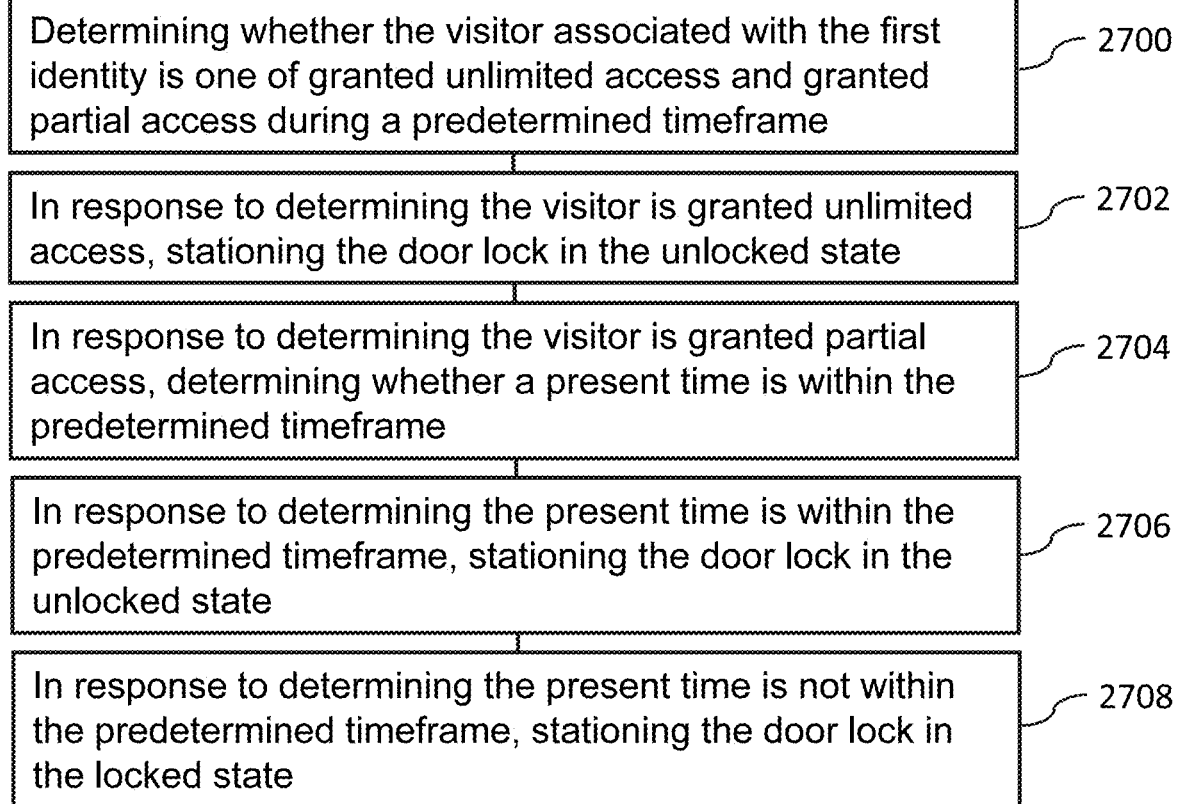

In response to determining that the first indication and the second indication are both associated with the first identity (i.e. both indications are associated with the same identity), the door lock system 1068 may interpret this occurrence as the visitor having been positively identified. As shown in FIG. 27, in such occurrences, the method may further include determining whether the visitor associated with the first identity is one of granted unlimited access and granted partial access during a predetermined timeframe (at step 2700). Accordingly, in response to determining that the visitor is granted unlimited access, step 2702 can include stationing the door lock in the unlocked state. In response to determining that the visitor is granted partial access, step 2704 can include determining whether a present time is within the predetermined timeframe. As such, in response to determining that the present time is within the predetermined timeframe, step 2706 can include stationing the door lock 250 (e.g. the bolt 1076) in the unlocked state so that the visitor may gain access to the building 300. In response to determining that the present time is not within the predetermined timeframe, step 2708 can include stationing the door lock in the locked state so that the visitor may not gain access to the building 300.

Figure 28:
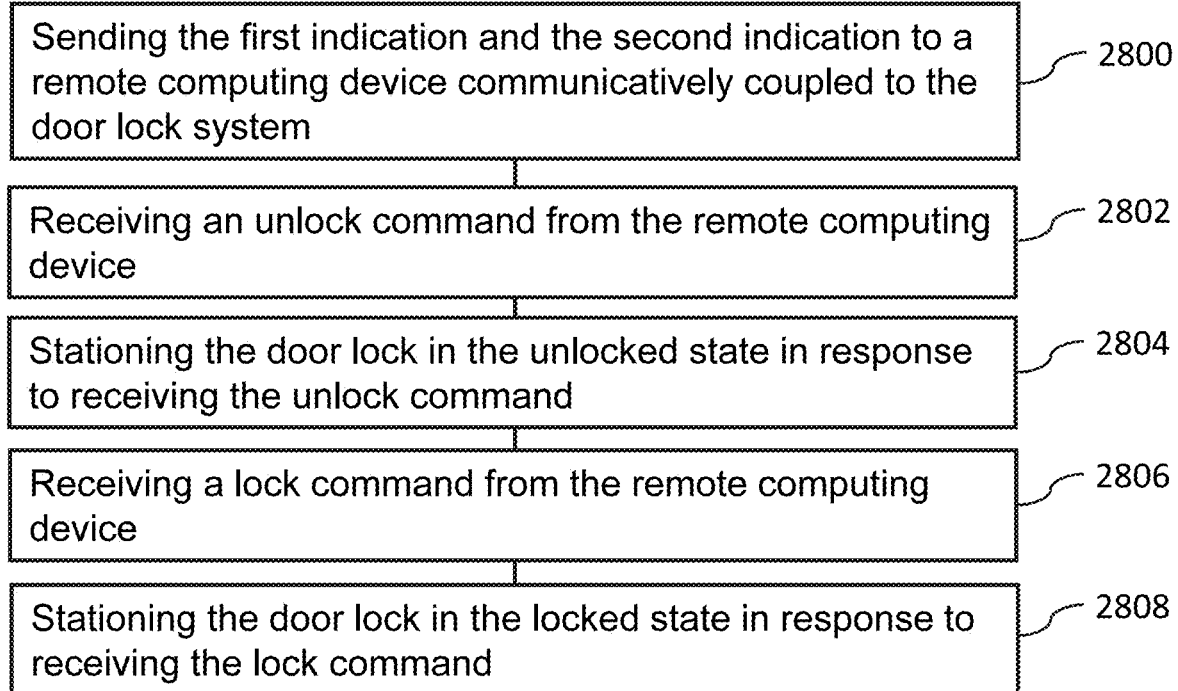

Now with reference to FIG. 28, embodiments of the door lock system 1068 can be configured to communicate with a remote computing device 204 that is communicatively coupled with the door lock system 1068. This can allow remote users to determine whether visitors are present and whether events are occurring at the door lock system 1068. For example, step 2700 can include sending the first indication and the second indication to the remote computing 204 (at step 2800). In some embodiments, the first indication is one of a transmission from a remote computing device and a motion of the visitor. In some embodiments, the second indication is one of an audible voice, a fingerprint pattern, and a retina scan.

As well, the door lock system 1068 can be configured to receive commands from the remote computing device 204 and thereby station the door lock in the unlocked or locked state as per the command. For example, methods can include receiving an unlock command from the remote computing device (at step 2802) and thereby stationing the door lock in the unlocked state in response to receiving the unlock command (at step 2804). As well, methods can include receiving a lock command from the remote computing device (at step 2806) and thereby stationing the door lock in the locked state in response to receiving the lock command (at step 2808).

Figure 29:
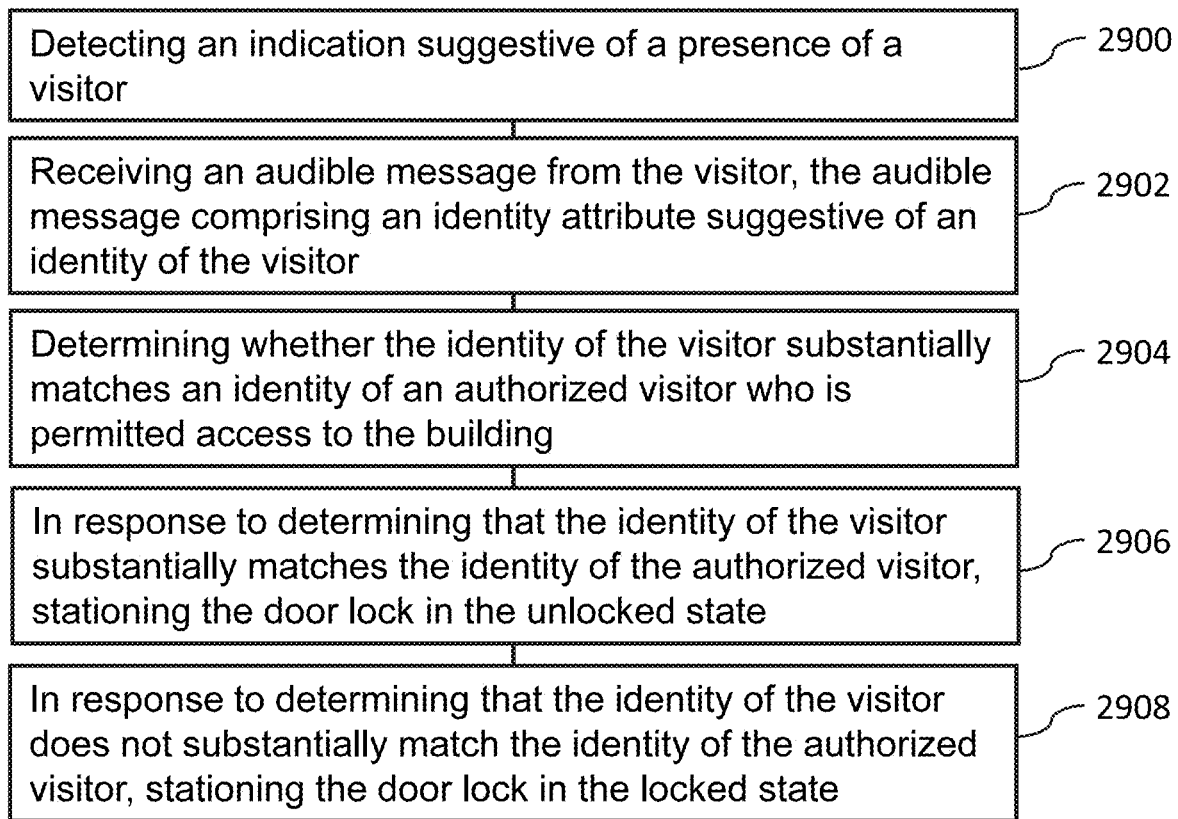

As shown in FIG. 29, embodiments may include methods of validating a visitor's identity by receiving an audible input from the visitor. Accordingly, step 2900 can include detecting an indication suggestive of a presence of a visitor. As well, step 2902 can include receiving an audible message from the visitor. The audible message can include an identity attribute suggestive of an identity of the visitor. Methods can thereby include determining whether the identity of the visitor substantially matches an identity of an authorized visitor who is permitted access to the building (at step 2904).

In response to determining that the identity of the visitor substantially matches the identity of the authorized visitor, methods can further include stationing the door lock 250 (e.g. the bolt 1076) in the unlocked state (at step 2906). In response to determining that the identity of the visitor does not substantially match the identity of the authorized visitor, methods can further include stationing the door lock 250 in the locked state (at step 2908).

Figure 30:
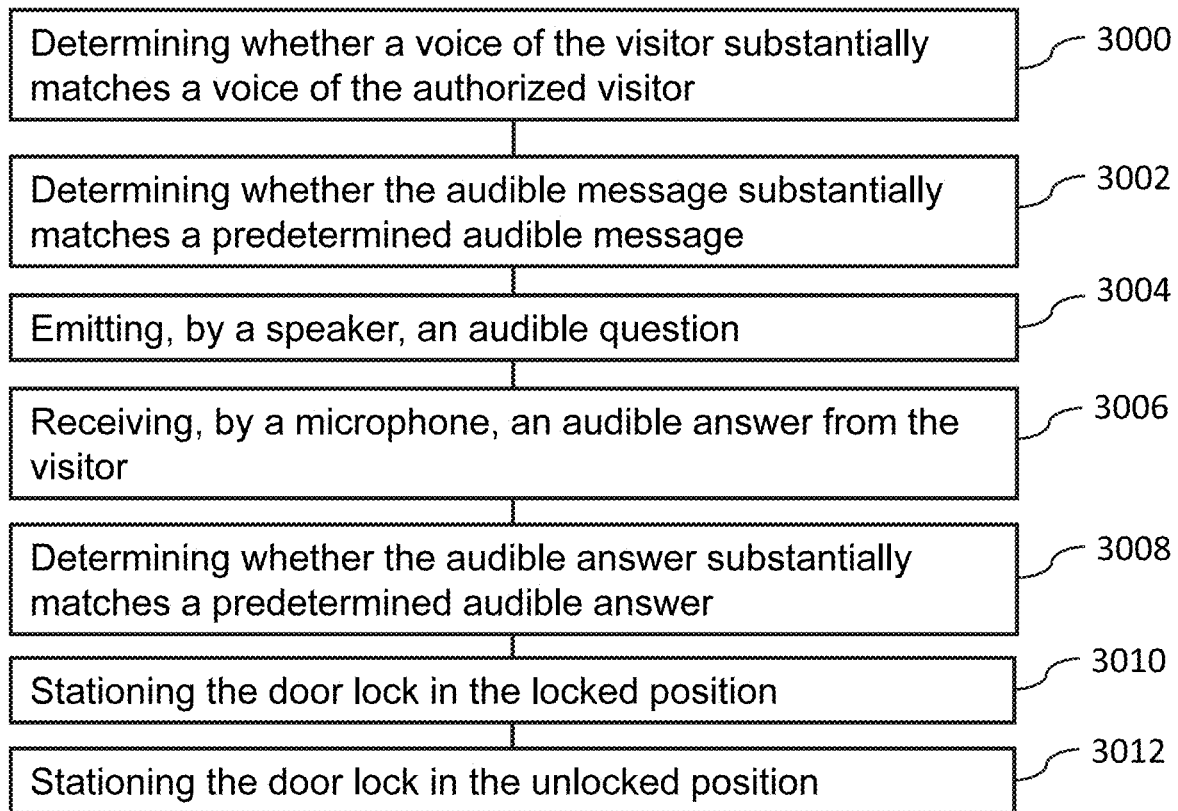

As shown in FIG. 30, in some embodiments, determining whether the identity of the visitor substantially matches the identity of the authorized visitor can include determining whether a voice of the visitor substantially matches a voice of the authorized visitor (at step 3000). As well, in some embodiments, determining whether the identity of the visitor substantially matches the identity of the authorized visitor can include determining whether the audible message substantially matches a predetermined audible message (at step 3002).

The door lock system 1068 can also be configured to communicate with the visitor and determine the visitor's identity from the communication. For example, step 3004 can include emitting, by a speaker 1128 of the door lock system 1068, an audible question. Accordingly, step 3006 can include receiving, by a microphone 1126 of the door lock system, an audible answer from the visitor. As well, step 3008 can include determining whether the audible answer substantially matches a predetermined audible answer. In response to determining that the audible answer substantially matches the predetermined audible answer, step 3010 can include stationing the door lock in the unlocked state. In response to determining that the audible answer does not substantially match the predetermined audible answer, step 3012 can include stationing the door lock in the locked state.

Combinations with Embodiments Incorporated by Reference

The embodiments described herein can be combined with any of the embodiments included in the applications incorporated by reference. In various embodiments, the security systems described herein can include features and methods described in the context of security systems from applications incorporated by reference.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A method of operating a door lock system coupled to a building, the door lock system comprising a door lock movable between a locked state and an unlocked state, and an electronic doorbell having a housing, a microphone, a speaker, a camera, a motion detector, a transmitter, and a button, the method comprising:
   taking, via the camera, an image of a visitor in connection with moving the door lock to at least one of the locked state and the unlocked state;
   transmitting, via the door lock system, the image to a remote computing device communicatively coupled to the door lock system;
   determining, via the door lock system, whether the visitor is granted unlimited access or partial access during a predetermined time frame;
   in response to determining that the visitor is granted unlimited access, stationing the door lock in the unlocked state; and
   in response to determining that the visitor is granted partial access, determining whether the visitor is visiting at a present time is within the predetermined time frame, and stationing the door lock in the unlocked state in response to the present time being within the predetermined time frame.

2. The method of claim 1, further comprising detecting, via the door lock system, a first indication suggestive of a presence of the visitor.

3. The method of claim 1, wherein moving the door lock to at least one of the locked state and the unlocked state occurs in response to the electronic doorbell verifying an identity of the visitor.

4. The method of claim 1, further comprising transmitting, via the door lock system, the image to a secondary computing device communicatively coupled to the door lock system, and wherein the secondary computing device comprises a remote server.

5. The method of claim 1, further comprising taking, via the camera, a second image of the visitor in response to moving the door lock to at least one of the locked state and the unlocked state.

6. The method of claim 1, wherein taking the image of the visitor comprises taking, via the camera, a video of the visitor in response to moving the door lock to at least one of the locked state and the unlocked state.

7. A door lock system, comprising:
a lock housing;
a door lock coupled to the lock housing,
wherein the door lock is arranged and configured to move from a locked state to an unlocked state in response to determining whether a visitor is granted unlimited access, and
wherein the door lock is arranged and configured to move from a locked state to an unlocked state in response to determining whether a visitor is granted or partial access during a predetermined time frame, and the visitor is visiting at a present time that is within the predetermined time frame;
a doorbell housing; and
an electronic doorbell coupled to the doorbell housing and communicatively coupled to the door lock, wherein the electronic doorbell comprises a camera, a motion detector, a microphone, a speaker, a transmitter, and a button,
wherein the camera is arranged and configured to take an image of a visitor when the door lock moves to at least one of the locked state and the unlocked state, and
wherein the door lock system is arranged and configured to transmit the image to a remote computing device communicatively coupled to the door lock system.

8. The door lock system of claim 7, wherein the door lock is further arranged and configured to move between the locked state and the unlocked state in response to an input from the remote computing device.

9. The door lock system of claim 7, wherein the doorbell housing is physically separate from the lock housing.

10. The door lock system of claim 9, wherein the doorbell housing is located within 2 feet of the lock housing.

11. The door lock system of claim 7, wherein the door lock system is arranged and configured to detect a first indication suggestive of a presence of the visitor, and wherein the camera is arranged and configured to take the image of the visitor when the door lock system detects the first indication suggestive of the presence of the visitor.

12. The door lock system of claim 7, further comprising a secondary computing device communicatively coupled to the door lock system, wherein the door lock system is arranged and configured to transmit the image to the secondary computing device.

13. The door lock system of claim 12, wherein the secondary computing device is a remote server.

14. The door lock system of claim 7, wherein the electronic doorbell is further arranged and configured to scan a retina of the visitor and determine the visitor's identity.

15. The door lock system of claim 7, wherein the electronic doorbell is further arranged and configured to scan a fingerprint of the visitor and determine the visitor's identity.

16. The method of claim 2, further comprising taking, via the camera, the image of the visitor in response to detecting the first indication suggestive of the presence of the visitor.

17. The method of claim 1, further comprising stationing the door lock in the locked state in response to the present time being outside the predetermined time frame.

18. The door lock system of claim 7, wherein the door lock is arranged and configured to refrain from moving from a locked state to an unlocked state in response to determining whether a visitor is granted partial access during a predetermined time frame, and the visitor is visiting at a present time that is outside the predetermined time frame.

19. The method of claim 16, further comprising:
detecting, via the door lock system, a second indication suggestive of the presence of the visitor; and
taking, via the camera, the image of the visitor in response to detecting the second indication suggestive of the presence of the visitor.

20. The method of claim 19, wherein the first indication comprises a movement of the visitor that is detected by the motion detector, and
wherein the second indication comprises one of an audible voice, a fingerprint pattern, and a retina scan.

* * * * *